United States Patent [19]
Muramatsu et al.

[11] Patent Number: 5,768,625
[45] Date of Patent: Jun. 16, 1998

[54] VEHICLE BASED LAN A COMMUNICATION BUFFER MEMORY HAVING AT LEAST ONE MORE NUMBER OF STORAGE AREAS FOR RECEIVE STATUS AND SOURCE ADDRESS THAN THE NUMBER OF AREAS FOR RECEIVE DATA

[75] Inventors: Kikuo Muramatsu; Yasushi Okamoto; Akiya Arimoto; Shinji Suda, all of Itami; Etsuya Yokoyama, Himeji; Takeshi Nita, Sanda; Yuichiro Yamaguchi; Yoshikazu Satou, both of Itami; Norio Matsumoto, Himeji, all of Japan

[73] Assignee: Mitsubishi Denki Kabushiki Kaisha, Tokyo, Japan

[21] Appl. No.: 495,335

[22] Filed: Jun. 27, 1995

Related U.S. Application Data

[63] Continuation of Ser. No. 859,565, Mar. 27, 1992, abandoned.

[30] Foreign Application Priority Data

| Mar. 29, 1991 | [JP] | Japan | 3-066410 |
| Mar. 29, 1991 | [JP] | Japan | 3-066636 |
| Mar. 29, 1991 | [JP] | Japan | 3-066637 |

[51] Int. Cl.$^6$ ................................. G06F 13/00
[52] U.S. Cl. ................. 395/876; 395/200.64; 395/200.8; 701/1
[58] Field of Search ................. 395/250, 872–876, 395/200.6, 200.62, 200.64, 200.8

[56] References Cited

U.S. PATENT DOCUMENTS

| 4,435,762 | 3/1984 | Milligan et al. | 395/250 |
| 4,800,524 | 1/1989 | Roesgen | 395/421.07 |

(List continued on next page.)

FOREIGN PATENT DOCUMENTS

| A-0239937 | 7/1987 | European Pat. Off. . |
| 272939 A2 | 6/1988 | European Pat. Off. . |
| 61-74442 | 4/1986 | Japan . |
| 62-289033 | 12/1987 | Japan . |
| 1-174042 | 7/1989 | Japan . |
| WO 84/03192 | 8/1994 | WIPO . |

OTHER PUBLICATIONS

WPINI et al. "Class 2: General Motors Vession of SAE J1850" 8th Conf. on Automotive Electronics, 1991 pp. 74–78.

(List continued on next page.)

*Primary Examiner*—Dinh C. Dung
*Attorney, Agent, or Firm*—McDermott, Will & Emery

[57] ABSTRACT

A primary object is to provide a communication apparatus, in particular, its buffer memory which conforms mainly to specifications of SAE-J1850 or ISO-9141. In the buffer memory, there are provided: at least, one more status registers storing information associated with the state of respective information to be transmitted and received, than the number of buffers storing information to be transmitted and received; at least, the same number of transmission error registers storing information associated with the transmitting state of information to be transmitted, as the buffers storing information to be transmitted; at least, one more receiving error registers storing information associated with the receiving state of information to be received, than the buffers storing information to be received; at least, one more source address registers storing information associated with the other communication apparatus which has transmitted respective information to be received, than the buffers storing information to be received; and at least, the same number of response information registers storing information responded from the communication apparatus which is to receive information when the information to be transmitted is transmitted, as the buffers storing information to be transmitted.

11 Claims, 41 Drawing Sheets

U.S. PATENT DOCUMENTS

| | | | |
|---|---|---|---|
| 4,878,197 | 10/1989 | Nay et al. | 395/250 |
| 4,881,167 | 11/1989 | Sasaki et al. | 711/201 |
| 4,922,503 | 5/1990 | Leone | 370/85.13 |
| 4,942,515 | 7/1990 | Marzucco et al. | 395/842 |
| 5,050,066 | 9/1991 | Myers et al. | 395/250 |
| 5,133,062 | 7/1992 | Joshi et al. | 395/500 |
| 5,175,732 | 12/1992 | Hendel et al. | 370/94.1 |

OTHER PUBLICATIONS

SAE (Society Of Automotive Engineer) Recommended Practice J1850 Class B Data Communication Network Interface, Jun. 12, 1991.

ISO (International Organization for Standardization) 9141.

Hemant Kanakia et al., "The VMP Network Adapter Board (NAB): High Performance Network Communication for Multiprocessors", SIGCOMM, 1988, vol. 18, No. 4, pp. 175–187.

R.W. Dobinson et al., "Interfacing to Ethernet Using VLSI Protocol Chips", Interfaces in Computing, vol. 3, 1985, Sep.–Dec., No. 3/4, pp. 173–185.

Interfaces in Computing (R.W. Dobinson et al.) vol. 3, No. 3/4, pp. 173–187.

"Interfacing with Ethernet Using VLSI Protocol Chips".

Fig. 8

| | | | |
|---|---|---|---|
| 1WA → 00H | TX BUFFER | MESSAGE LENGTH | 00H ← 1RA |
| 01H | | PRIORITY CODE | 01H |
| 02H | | DESTINATION ADD. | 02H |
| 03H | | SOURCE ADD. | 03H |
| 04H | | TYPE FORMAT/DIAGNOSTIC MODE | 04H |
| 05H | | DATA(MAX=10BYTE) | 05H |
| ⋮ | | ⋮ | ⋮ } 1 |
| 0FH | | RESERVED | 0FH |
| 2aRA → 10H | RX BUFFER 1 | MESSAGE LENGTH | 10H ← 2aWA |
| 11H | | PRIORITY CODE | 11H |
| 12H | | DESTINATION ADD. | 12H |
| 13H | | SOURCE ADD. | 13H |
| 14H | | TYPE FORMAT/DIAGNOSTIC MODE | 14H |
| 15H | | DATA(MAX=10BYTE) | 15H |
| ⋮ | | ⋮ | ⋮ } 2a |
| 1FH | | CRC | 1FH |
| 2bRA → 20H | RX BUFFER 2 | MESSAGE LENGTH | 20H ← 2bWA |
| 21H | | PRIORITY CODE | 21H |
| 22H | | DESTINATION ADD. | 22H |
| 23H | | SOURCE ADD. | 23H |
| 24H | | TYPE FORMAT/DIAGNOSTIC MODE | 24H |
| 25H | | DATA(MAX=10BYTE) | 25H |
| ⋮ | | ⋮ | ⋮ } 2b |
| 2FH | | CRC | 2FH |

Fig. 9

| | | |
|---|---|---|
| 30H | 1st STATUS REGISTER | 30H |
| 31H | 2nd STATUS REGISTER | 31H |
| 32H | 3rd STATUS REGISTER | 32H |
| 33H | 4th STATUS REGISTER | 33H |
| 34H | RESERVED | 34H |
| 35H | RESERVED | 35H |
| 36H | TRANSMISSION ERROR REG. | 36H |
| 37H | RESERVED | 37H |
| 38H | 1st RECEIVING ERROR REG. | 38H |
| 39H | 2nd RECEIVING ERROR REG. | 39H |
| 3AH | 3rd RECEIVING ERROR REG. | 3AH |
| 3BH | RESERVED | 3BH |
| 3CH | 1st SOURCE ADD. REG. | 3CH |
| 3DH | 2nd SOURCE ADD. REG. | 3DH |
| 3EH | 3rd SOURCE ADD. REG. | 3EH |
| 3FH | RESERVED | 3FH |
| 40H | RESPONSE RSP REG. | 40H |
| 41H ⋮ | RESERVED ⋮ | 41H ⋮ |
| 7EH | TX REG. WRITING COMPLETION REG. | 7EH |
| 7FH | RX REG. READING COMPLETION REG. | 7FH |

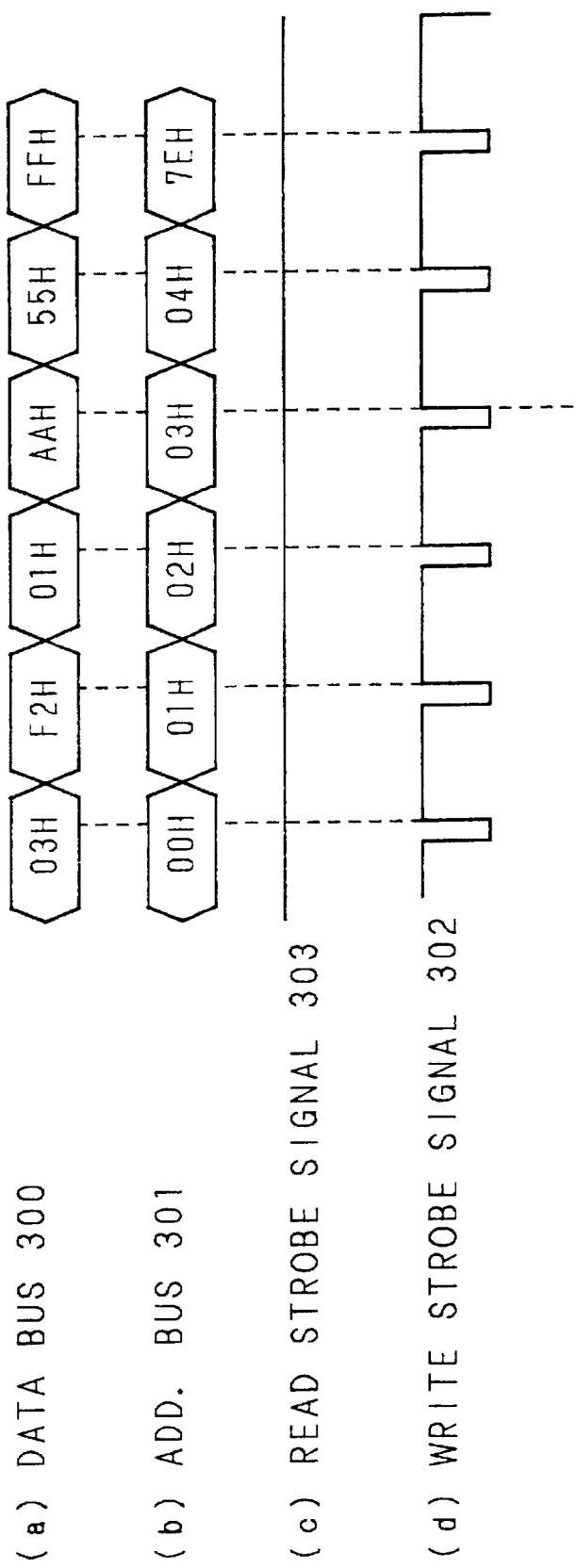

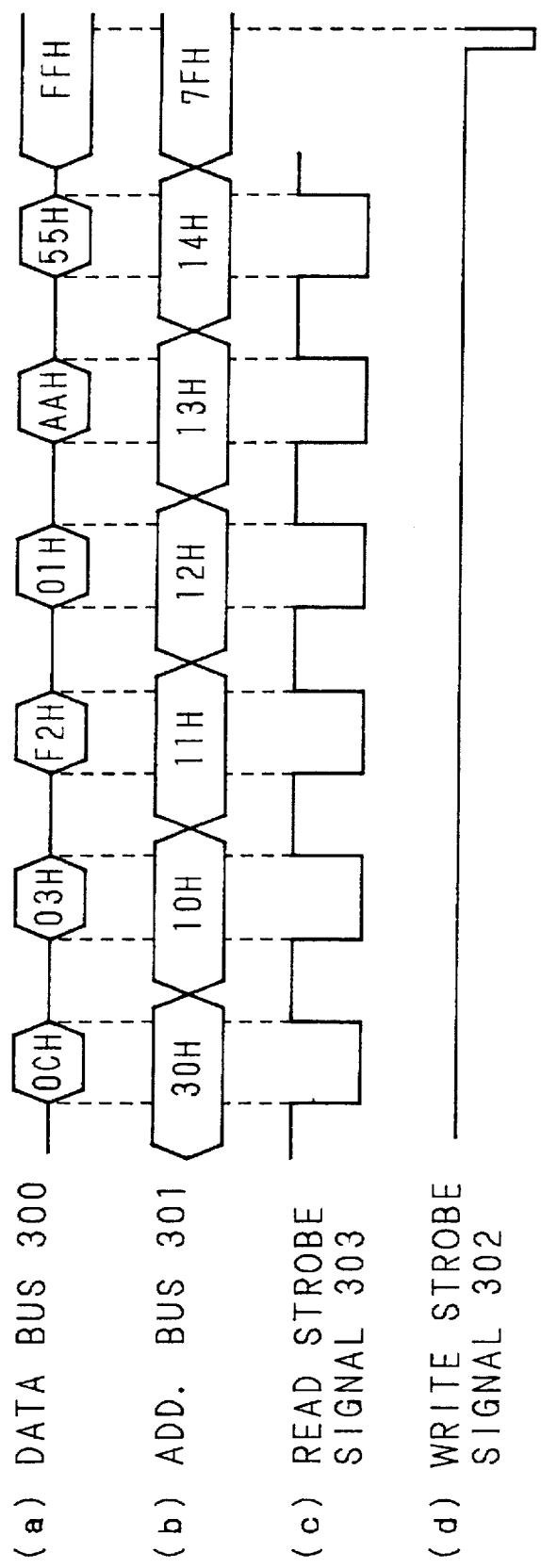

5,768,625

1

VEHICLE BASED LAN A COMMUNICATION BUFFER MEMORY HAVING AT LEAST ONE MORE NUMBER OF STORAGE AREAS FOR RECEIVE STATUS AND SOURCE ADDRESS THAN THE NUMBER OF AREAS FOR RECEIVE DATA

This application is a continuation of application Ser. No. 07/859,565 filed Mar. 27, 1992 now abandoned.

BACKGROUND OF THE INVENTION

1. Field of the Invention

The present invention relates to a communication apparatus, more particularly, to a buffer memory especially for buffering communication data for the purpose of transmission and receiving.

2. Description of the Related Art

In the United States of America, from 1995 onward, enforcement of regulations on passenger cars by a Bryan Bill is expected.

In this Bill, sales of the passenger cars in the U.S. will be permitted on condition that, fuel consumption should be improved by 20% as of 1995 as compared with 1988, and should be improved by 40% as of 2000. In order to improve the fuel consumption of the passenger cars, it is most effective to cut down the weight of a car body. For achieving this end, it is effective to introduce an on-board LAN capable of simplifying wirings by reducing wire harnesses.

By the CARB (California Air Resources Board) of the U.S., for the purpose of the air resources reservation, regulations on exhaust fumes are expected for the passenger cars of a 1994 model onward. In this regulations, it is not only necessary to reduce harmful exhaust substances such as NOx, HC and CO, but also it is requested that a motor control unit on the passenger cars should have a self-diagnostic function called an on-board diagnosis for detecting and informing a user a deterioration and failure of various sensors and exhaust fumes control parts (catalyser etc.) connected to the unit. Specifications for failure diagnosis data and data transfer formats for this end are already published as SAE-J1850 or ISO-9141.

Meanwhile, regardless of the above-mentioned regulations, with a recent trend in high functional control unit of the passenger cars and diversification of the functions, techniques for monitoring the operation of various control units by stretching networks for self-diagnostic functions in the cars are already introduced. More networks are employed not only on the control units, but also on the operation and display of various systems such as a navigation system, and audio system, an air conditioner and a telephone. From such point of view, it is becoming indispensable to introduce the on-board LAN for the passenger cars.

As described heretofore, it is indispensable to introduce the on-board LAN capable of reducing the wire harnesses and simplifying the wirings in the passenger cars for reducing weight and enhancing the performances of the passenger cars in the future. It is necessary, therefore, to use a communication apparatus which conforms to the aforesaid specifications of SAE-J1850 or ISO-9141.

Conventional communication apparatus also has following problem.

FIG. 1 is a schematic diagram showing allocation of addresses of a transmission buffer and a receiving buffer of the conventional communication apparatus.

2

The transmission buffer 1 includes a memory area capable of storing 15 bytes (there is an additional unused area of 1 byte) of data string in which 8 bits are constituted as one byte. The receiving buffers 2 includes memory areas capable of storing 14 bytes of data string in which 8 bits are constituted as one byte.

A write address 1WA and a read address 1RA of the transmission buffer 1 are commonly allocated with addresses from "00" to "0D" in a hexadecimal notation. A write address 2WA and a read address 2RA of the receiving buffer 2 are commonly allocated from "0E" to "1B" in the hexadecimal notation.

Here, data and their order constituting the transmission frame stored in the transmission buffer 1 are described with reference to a schematic diagram of FIG. 2.

In FIG. 2, an area designated by reference numeral 102 is a transmission data group stored in the transmission buffer 1. This data group is constituted by the transmission frame which is a message field 102.

The message field 102 is constituted by a 4-byte communication control data group field 110, and a communication data group field 120 of maximum 10 bytes which is an original field storing the communication data. Each of the 1-byte fields of the communication control data group field 110 is constituted by fields 111, 112, 113 and 114 in which respective data of the priority code, destination address, source address and type format/diagnostic mode are stored.

The number of bytes of a communication data group field length 120 of the transmission frame differs with the transmission frames, thus a message length of the overall transmission frame is not fixed. However, the maximum number of bytes is 14.

Though the transmission data group 102 as above-mentioned is stored in the transmission buffer 1, specifically, it is stored in the following manner.

In a 4-byte area of addresses "00" to "03", 4-byte data constituting the communication control data group 110 are stored respectively. That is, respective data of the communication control data group 110 are respectively stored such that, the priority code field 111 is stored in the fist byte of the address "00", the destination address field 112 is stored in the second byte of the address "01", the source address field 113 is stored in the third byte of the address "02", and the type format/diagnostic mode field 114 is stored in the fourth byte of the address "03". Respective fields of the communication data group field 120 constituted by n-communication data groups (n ranges from 1 to 10) are stored in a 10-byte area of the addresses from "05" to "0G".

Next, data and their order of the receiving frames stored in the receiving buffer 2 are described with reference to a schematic diagram of FIG. 3 showing its configuration.

In FIG. 3, range designated by reference numeral 202 is a data group which are to be stored in the receiving buffer 2. This data group is constituted by the message field 102 and a CRC field 203 in which CRC byte data are stored.

The message field 102 is constituted by the 4-byte communication control data group field 110 and the communication data group field 120 of maximum 10 bytes which is an original field storing the communication data. Each of the 1-byte fields of the communication control data group-field 110 is constituted by fields 111, 112, 113 and 114 in which respective data of the priority code, destination address, source address and type format/diagnostic mode are stored.

The number of bytes of the communication data group field 120 of the receiving frame differs with the receiving frames, thus a message length of the overall transmission frame is not fixed. However, different from the message length field 101 of the transmission data group, the maximum number of bytes is 15, because the CRC field 203 is added in the receiving frame.

Though such receiving data group are stored in the receiving buffers 2, they are stored in the following manner.

In a 4-byte area of "0E" to "11" of the addresses 2WA and 2RA of the receiving buffer 2, 4-byte data constituting the communication control data group 110 are stored respectively. That is, respective data of the communication control data group 110 respectively stored such that, the priority code field 111 is stored in the first byte of the address "0E", the destination address field 112 is stored in the second byte of the address "0F", the source address field 113 is stored in the third byte of the address "10", and the type format/ diagnostic mode field 114 is stored in the fourth byte of the address "11". Respective fields of the communication data group field 120 constituted by n-communication data groups (n ranges from 1 to 10) are stored in a 10-byte area of the addresses from "12" to "1B". And the CRC field 203 is stored in a 1-byte area of the address "1C".

In the conventional communication apparatus, since address of the transmission buffer and the receiving buffer are allocated as abovementioned, for example, in the case where receiving data group stored in the receiving buffer are read out, it is necessary to recognize number of bytes of the data of the receiving data group by read out a data from the predetermined area located on and after the fourth byte and in which number of data is stored. Thereafter, the data row corresponding to the read out number of data from address "0E" is read out with changing address in order as "0E", "0F", "10", "11" ... In the transmission buffer, as same as procedure is necessary.

In view of this, at constructing a communication system, area in which number of data of transmitting data group is necessary in the data to be transmitted. In address designation at data reading out, such complicated procedure is necessary that data in the area in which number of data is stored is read out, read out data is recognized, addresses are designated, and data are read out.

SUMMARY OF THE INVENTION

The present invention has been devised in view of the circumstances as mentioned above. It is, therefore, a primary object thereof to provide a communication apparatus, in particular, its buffer memory which conforms mainly to specifications of SAE-J1850 or ISO-9141.

Also, the present invention objects to provide a communication apparatus having address allocation and address designation mechanism by which area in which number of data is stored is not necessary in the data to be transmitted, and procedure of address designation at data reading out from each transmission buffer and receiving buffer is simplified.

A first invention of the communication apparatus of the present invention is provided with: in the buffer memory having a plurality of buffers storing information being transmitted and received, at least, one more status registers storing information associated with the states of respective information being transmitted and received, than all the buffers; at least, the same member of transmission error registers storing information associated with the transmitting state of information being transmitted, as the buffers storing information being transmitted; at least, one more receiving error registers storing information associated with the receiving state of information being received, than the buffers storing information being received; at least, one more source address registers storing information associated with the other communication apparatus which has transmitted respective information being received, than the buffers storing information being received; and at least, the same number of response information registers storing information which are responded from the communication apparatus which is to receive information in the case where the information being transmitted is transmitted, as the buffers storing information being transmitted.

The first invention of the communication apparatus of the present invention is that, respective transmission buffers are made correspondence with one of the status registers, one of the transmission error registers and one of the response information registers.

Furthermore, the first invention of the communication apparatus of the present invention is that, respective receiving buffers are made correspondence with one of the status registers, one of the receiving error registers and one of the source address registers.

A second invention of the communication apparatus of the present invention is that, the address of the buffer memory is allocated such that either the plural transmission buffers or the receiving buffers are designated by the higher bits, and respective memory areas in the respective buffers are designated in order by the lower bits.

The second invention of the communication apparatus of the present invention includes, address generating means capable of accessing the memory areas of a buffer of the aforesaid address allocating buffer memory, by having a counter which automatically generates the lower bits in order, and outputting the higher bits given from the outside and the lower bits generated by the counter, in the case where the higher bits of the address are given.

Furthermore, the second invention of the communication apparatus of the present invention is constituted such that, in the case where information being transmitted or received are stored in the buffers, the number of memory areas used in storing the information is stored in the head memory area.

Still further, the second invention of the communication apparatus of the present invention is constituted such that, in the case where information being received are stored in the buffers, CRC check data of the information is stored in the next memory area of the end memory area being used.

A third invention of the communication apparatus of the present invention is provided with: at least one more status registers storing information associated with the states of respective information to be transmitted and received, than all the buffers; at least, the same number of transmission error registers storing information associated with the transmitting state of information being transmitted, as the buffers storing information being transmitted; at least, one more receiving error registers storing information associated with the receiving state of information to be received, than the buffers storing information being received; at least, one more source address registers storing information associated with the other communication apparatus which has transmitted respective information being received, than the buffers storing information to be received, than the buffers storing information to be received; and at least, the same number of response information registers storing information which are responded from the communication apparatus which is to receive the information in the case where information to be transmitted is transmitted; in the buffer memory having a plurality of buffers storing information to be transmitted and received, and further, in the case where information are stored in the transmission buffer or the receiving buffer, means for designating a buffer which can be used and register designating means for designating each one register, which is made correspondence with the buffers when various information associated with the information are stored in the above-mentioned various registers are included.

The third invention of the communication apparatus of the present invention includes, a counter which counts the number of buffers used in the transmission buffer and receiving buffer and a counter which counts the number of status registers used, and is constituted so as to detect disorder of the register designating means according to the count value and the designated value of the register designating means.

Furthermore, the third invention of the communication apparatus of the present invention includes, a transmission information writing completion register to which the address which is not allocated to the transmission buffer is allocated, and a receiving information reading completion register to which the address which is not allocated to the receiving buffer is allocated, and is constituted such that, when writing transmission information, after data to be written is written, a predetermined data is outputted and the address allocated to the transmission information writing completion register is outputted to store the predetermined data in the transmission information writing completion register, and when reading receiving information, after reading data to be read is read, a predetermined data is outputted and the address allocated to the receiving information reading completion register is outputted to store the predetermined data in the receiving information reading completion register.

In the first invention of the communication apparatus of the present invention, there are provided: at least, one more status registers storing information associated with the states of respective information to be transmitted and received, than the number of buffers storing information to be transmitted and received; at least, the same number of transmission error registers storing information associated with the transmitting state of information to be transmitted, as the buffers storing information to be transmitted; at least, one more receiving error register storing information associated with the receiving state of information to be received, than the buffers storing information to be received; at least, one more source address registers storing information associated with the other communication apparatus which has transmitted respective information to be received, than the buffers storing information to be received; and at least, the same number of response information registers storing information responded from the communication apparatus which is to receive the information in the case where information to be transmitted is transmitted, as the buffers storing information to be transmitted. And hence, in the case where information to be received are further present in the state where information to be transmitted and received are stored in all of the receiving buffers, it is possible to store information associated with the state of information to be received, information associated with the receiving state of the information, and information associated with the other communication apparatus which has transmitted the information, and it is possible to receive again immediately when there is space in the buffers.

In the first invention of the communication apparatus of the present invention, since respective transmission buffers are made correspondence with one of status registers, one of transmission error registers and one of response information registers, a set of information associated with information to be transmitted and being stored in the respective transmission buffers, or information of the identical attribute can be operated simply.

Furthermore, in the first invention of the communication apparatus of the present invention, since respective receiving buffers are made correspondence with one of the status registers, one of the receiving error registers and one of the source address registers, a set of information associated with information to be received and being stored in the respective receiving buffers, or information of the identical attribute can be operated simply.

In the second invention of the communication apparatus of the present invention, the address of its buffer memory is allocated so as to designate either of the plural transmission buffers and receiving buffers by the higher bits, and to designate the memory areas in the respective buffers by the lower bits in order, and since address generating means, capable of accessing the memory areas of a buffer in the above-mentioned address allocating buffer memory, by having a counter which automatically generates the lower bits in order when the higher bits of the address are given, and by outputting the higher bits given from the outside and the lower bits generated by the counter, is included, just by giving the higher bits of the address from the outside, respective buffers are designated and the memory areas in the buffers are accessed.

Furthermore, in the second invention of the communication apparatus of the present invention, in the case where information to be transmitted or received are stored in the buffers, since the number of memory areas used in storing the information is stored in the head memory area, when reading information from the buffers, the number of memory areas which are to be read actually becomes clear at the time point when the first data of the information is read, and by comparing this value with the output value of the above-mentioned counter which outputs the lower bit address signal every time when information are read, reading of information is stopped when they are coincided.

Still further, in the second invention of the communication apparatus of the present invention, since CRC check data is stored in the next memory area of the end memory area used in storing the information when storing information to be received in the buffers, it is possible to compare the CRC data generated at transmission of the information with CRC data generated again for the receiving data on the receiving side.

In the third invention of the communication apparatus of the present invention, since various information corresponding to information stored in the transmission buffer or the receiving buffer are stored in the registers which are mutually associated with the buffers in which respective original information are stored, these information are managed as information of the identical attribute.

In the third invention of the communication apparatus of the present invention, since it is possible to detect disorder of register designating means, management of the registers is simple.

Meanwhile, in the third invention of the communication apparatus of the present invention, since a predetermined data is stored in the transmission information writing completion register, after data to be written is written when writing transmission information, and a predetermined data is stored in the receiving information reading completion register, after data to be read is read when reading receiving information, completion of writing the transmission information and reading the receiving information can be detected reliably by a simple configuration.

The above and further objects and features of the invention will more fully be apparent from the following detailed description with accompanying drawings.

BRIEF DESCRIPTION OF THE DRAWINGS

FIG. 8 is a schematic chart showing an address configuration of a transmission buffer and a receiving buffer group of a buffer memory of a communication apparatus of the present invention.

FIG. 9 is a schematic chart showing an address configuration of the portion except a transmission buffer and a receiving buffer group of a buffer memory of a communication apparatus of the present invention.

FIG. 21 is a block diagram showing a specific configuration of a first control unit.

FIG. 40 is a timing chart showing the state of data and signals in the case where the data are written to a buffer memory block from a microcomputer.

FIG. 41 is a timing chart showing the state of data and signals in the case where a receiving data group stored in a buffer memory block is read out to a microcomputer.

DETAILED DESCRIPTION OF THE EMBODIMENTS

Figure 1:
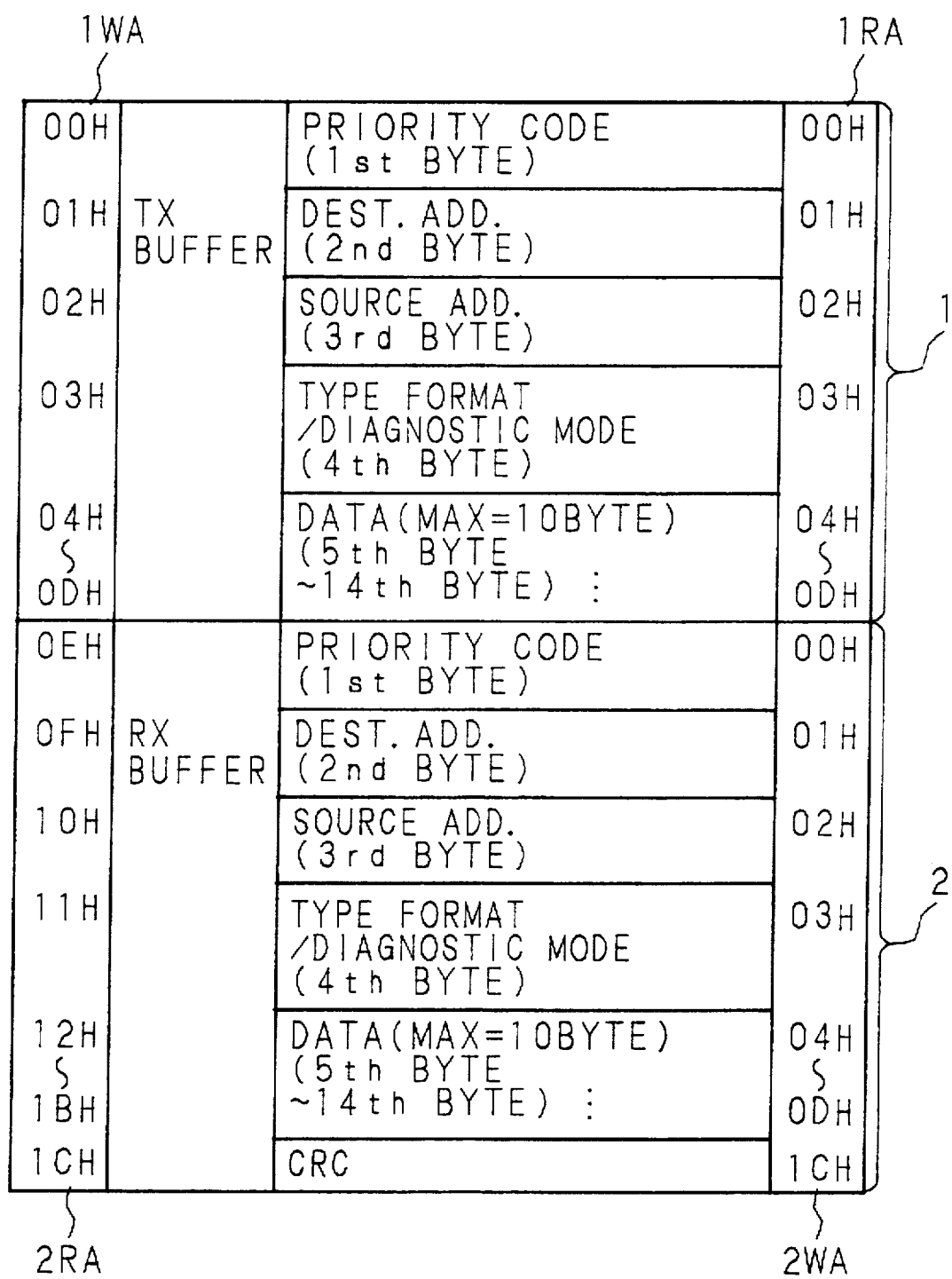
FIG. 1 is a schematic diagram showing allocation of addresses of a transmission buffer and a receiving buffer of the conventional communication apparatus.
Figure 2:
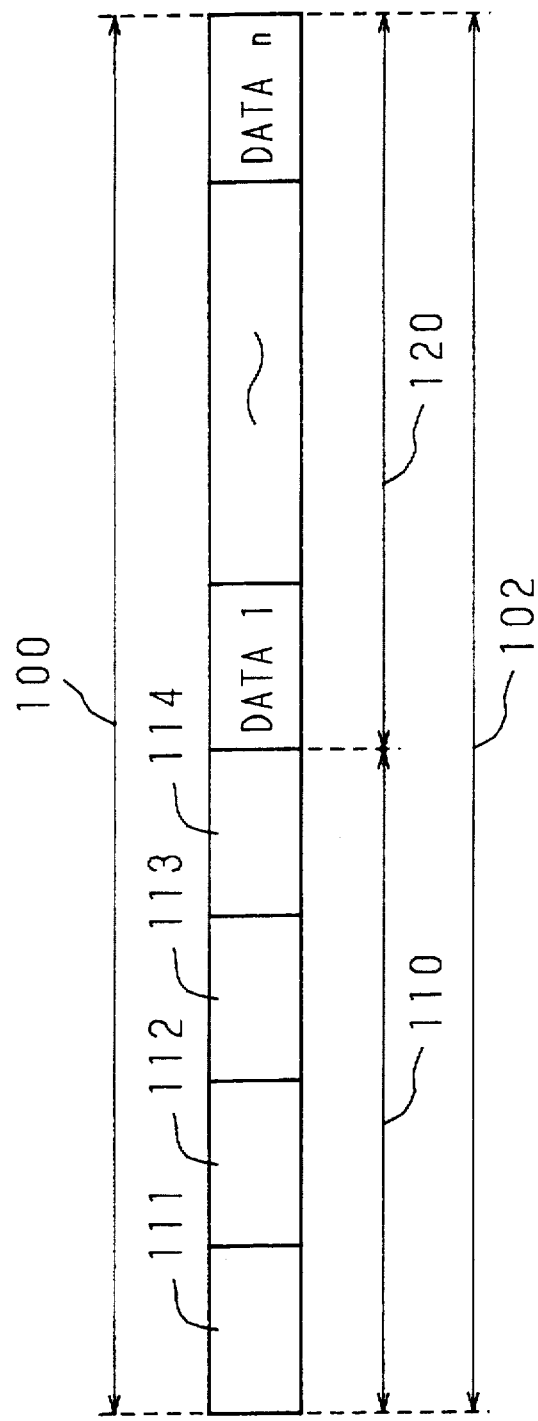
FIG. 2 is a schematic diagram showing data and their order constituting the transmission frame stored in the transmission buffer.
Figure 3:
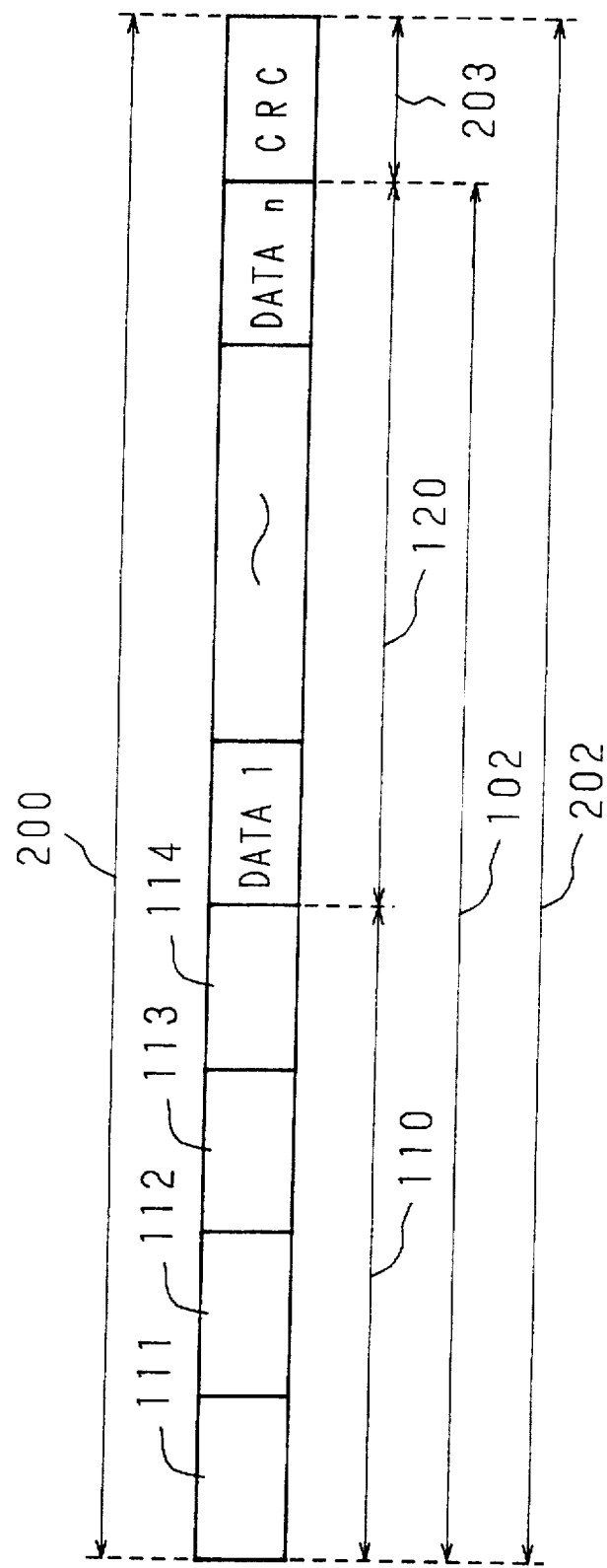
FIG. 3 is a schematic diagram showing data and their order of the receiving frames stored in the receiving buffer.
Figure 4:
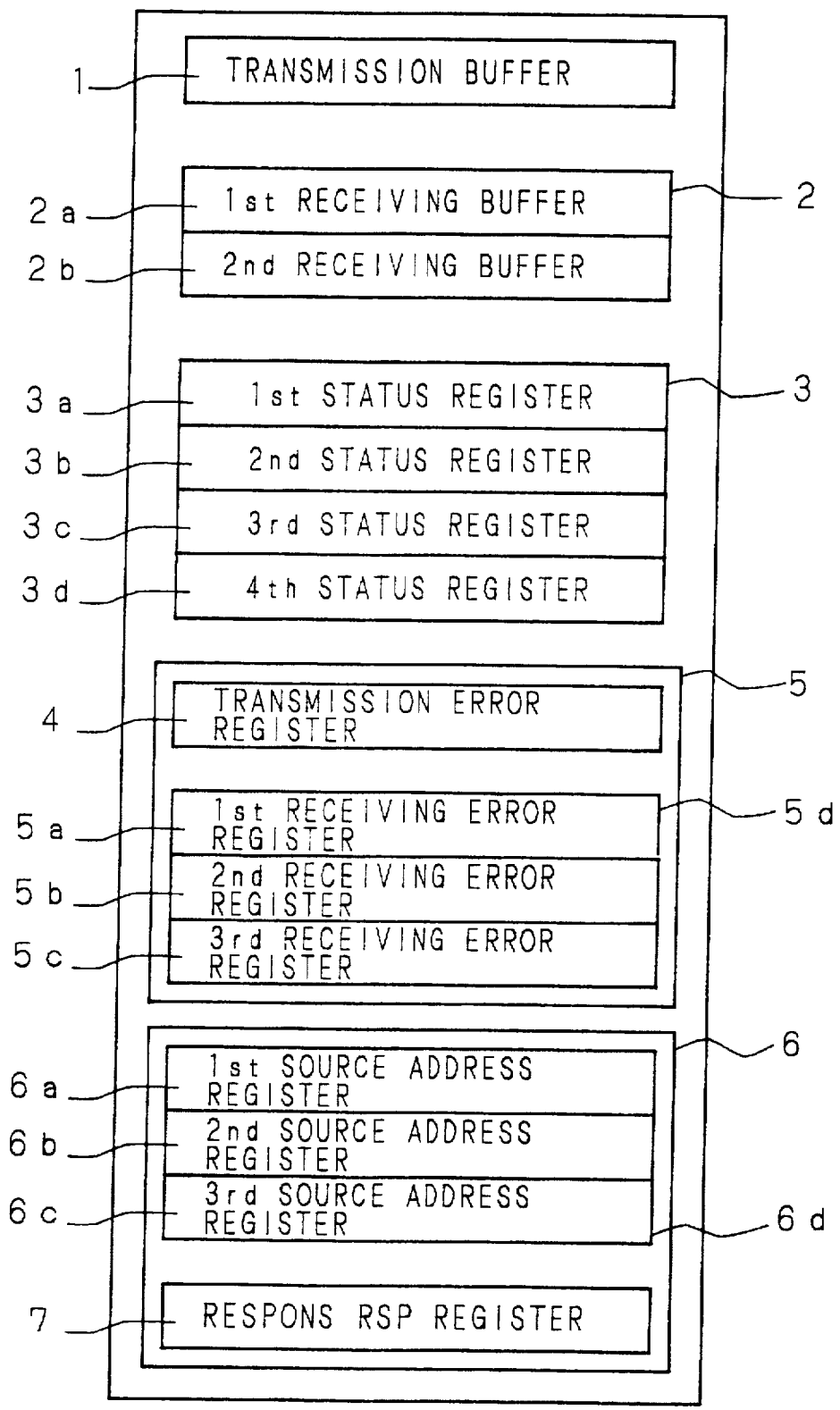
FIG. 4 is a block diagram showing a configuration of a buffer memory of a communication apparatus of the present invention.

FIG. 4 is a block diagram showing a schematic configuration of a buffer memory of a communication apparatus of the present invention.

Figure 5:
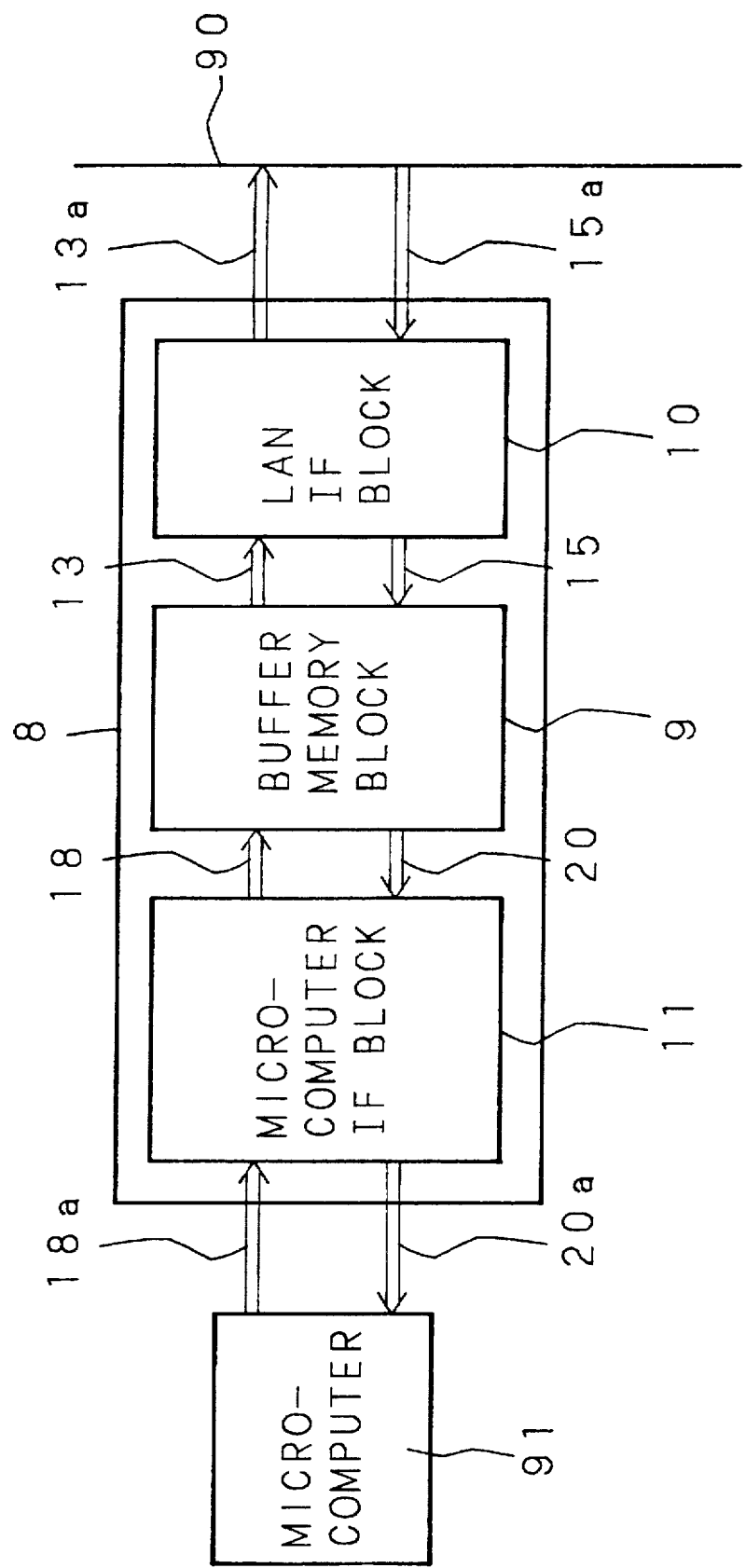
FIG. 5 is a block diagram showing an overall configuration of a communication apparatus of the present invention.

Here, before explaining the configuration of the communication apparatus of the present invention, first, a concept on overall data flow when transmitting and receiving the data is described, with reference to a block diagram showing an overall configuration of the communication apparatus of the present invention of FIG. 5.

In FIG. 5, the communication apparatus 8 of the present invention is located between a microcomputer 91 and a LAN transmission line 90, and is constituted by a microcomputer interface block (hereinafter, referred to as a microcomputer IF block) 11, a buffer memory block 9 and a LAN interface block (hereinafter, referred to as a LAN IF block) 10.

A data string transfer in the case of transmitting data to the LAN transmission line 90 from the microcomputer 91 is performed such that, the data string is transferred from the microcomputer 91 through the microcomputer IF block 11, buffer memory block 9 and LAN IF block 10 in order as indicated by reference numerals 18a, 18, 13 and 13a, and sent out to the LAN transmission line 90.

Specifically, as indicated by the reference numeral 18a, a transmission data string is transferred to the microcomputer IF block 11 in the communication apparatus 8 from the microcomputer 91, and then, as indicated by the reference numeral 18, transferred to the buffer memory block 9, and further, as indicated by the reference numeral 13, transferred to the LAN IF block 10, and finally, as indicated by the reference numeral 13a, sent out to the LAN transmission line 90 from the LAN IF block 10 to complete the transmission.

Meanwhile, such a series of control of the transferring timing of the transmission data string as abovementioned is conducted by the respective blocks of microcomputer IF block 11, buffer memory block 9 and LAN IF block 10.

Next, a transmitting direction of a receiving data string in the case of receiving the data string in the microcomputer 91 from the LAN transmission line 90 is described.

The data string received from the LAN transmission line 90 is transferred from the LAN IF block 10 through the LAN IF block 10, buffer memory block 9 and microcomputer IF block 11 in order as indicated by reference numerals 15a, 15, 20 and 20a, and inputted to the microcomputer 91.

Specifically, as indicated by the reference numeral 15a, the receiving data string is transferred to the LAN IF block 10 in the communication apparatus 8 from the LAN transmission line 90, and as indicated by the reference numeral 15, transferred to the buffer memory block 9. Then, as indicated by the reference numeral 20, the receiving data string and data having the identical attribute associated with the receiving data string are transferred to the microcomputer IF block 11, and as indicated by reference numeral 20a, the data string is transferred to the microcomputer 91.

A series of control of the transmission timing of the receiving data string as stated above is conducted by respective blocks of microcomputer IF block 11, buffer memory block 9 and LAN IF block 10 as same as the case of transmission.

Figure 6:
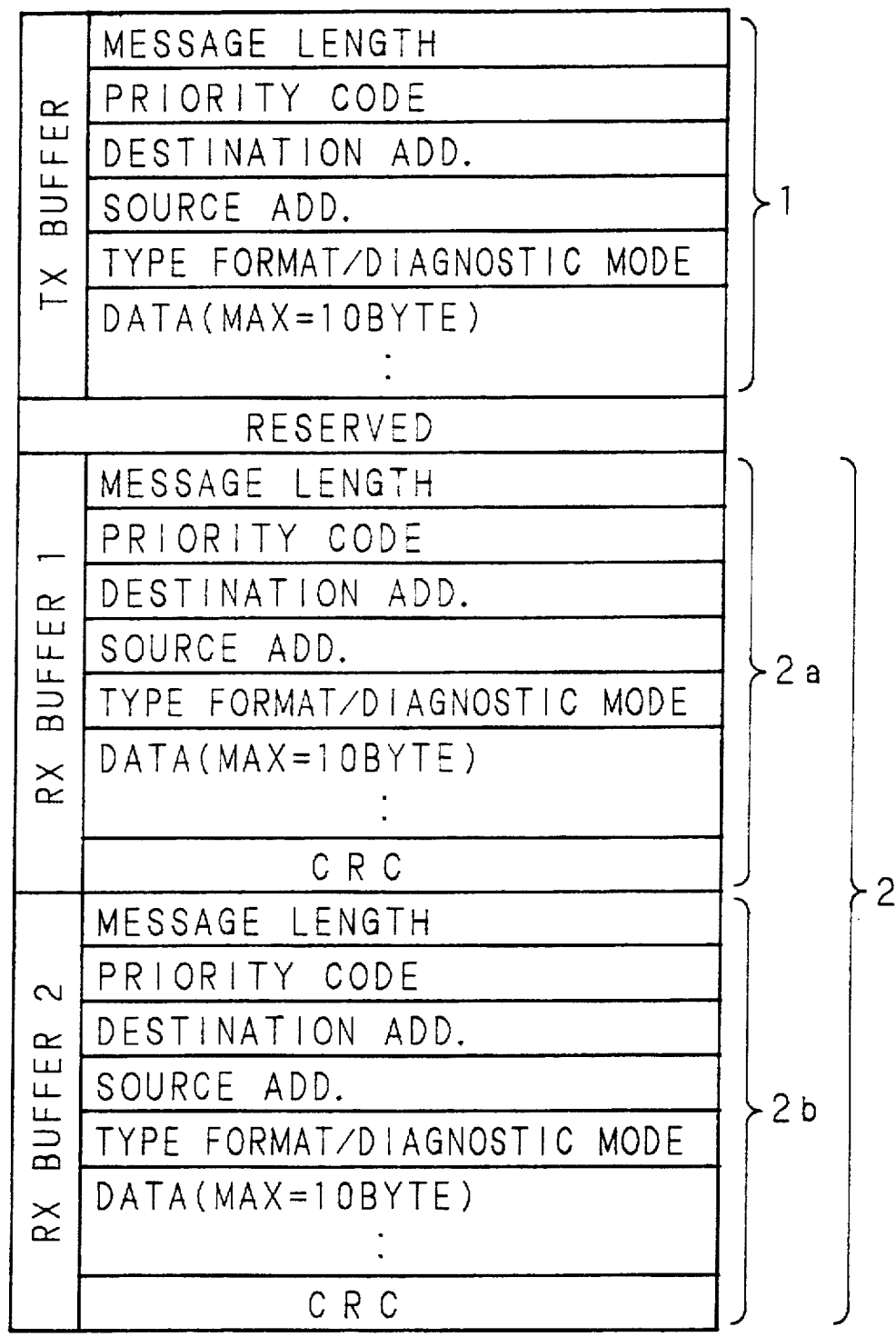
FIG. 6 is a schematic chart showing a specific configuration of a buffer memory of a communication apparatus of the present invention.

A buffer memory shown in FIG. 4 is disposed in the buffer memory block 9 in the communication apparatus 8 shown in FIG. 6 as stated above.

Next, an example of configuration of the buffer memory is described with reference to FIG. 4 which is a block diagram showing its schematic configuration.

The buffer memory is, when roughly divided, constituted by a transmission buffer 1, a receiving buffer group 2, a register group (hereinafter, referred to as a status register group) 3 in which data for managing a state (a status) of the transmission data string and the receiving data string (hereinafter the data string is represented by a frame, the transmission data string is called a transmission frame and the receiving data string is called a receiving frame), a register group 5 consisting of a plurality of registers respectively storing the data transferring state of one frame, and a register group 6 consisting of a plurality of registers respectively storing specific data in one frame.

The transmission buffer 1 is constituted by a plurality of registers storing the transmission data strings, and one set is included.

The receiving buffer group 2 is consisting of two sets of first and second receiving buffers 2a and 2b. Respective receiving buffers 2a and 2b are constituted by a plurality of registers respectively storing one frame of the receiving frame.

The status register group 3 is constituted by first, second, third and fourth status registers 3a, 3b, 3c and 3d respectively storing one of the data for managing the states of transmission frame and receiving frame.

The register group 5 is constituted by a transmission error register 4 and a receiving error register group 5d.

The transmission error register 4 is the register in which data associated with the transmitting state of a set of transmission frames are stored. The receiving error register group 5d is constituted by first, second and third receiving error registers 5a, 5b and 5c in which data associated with the receiving state of a set of receiving frames are stored respectively.

The register group 6 is constituted by a source address register group 6d and a response RSP register 7.

The source address register group 6d is constituted by first, second and third source address registers 6a, 6b and 6c respectively storing specific data in a set of receiving frames. The response RSP register 7 is the register storing specific data associated with a set of transmission frames.

Figure 7:
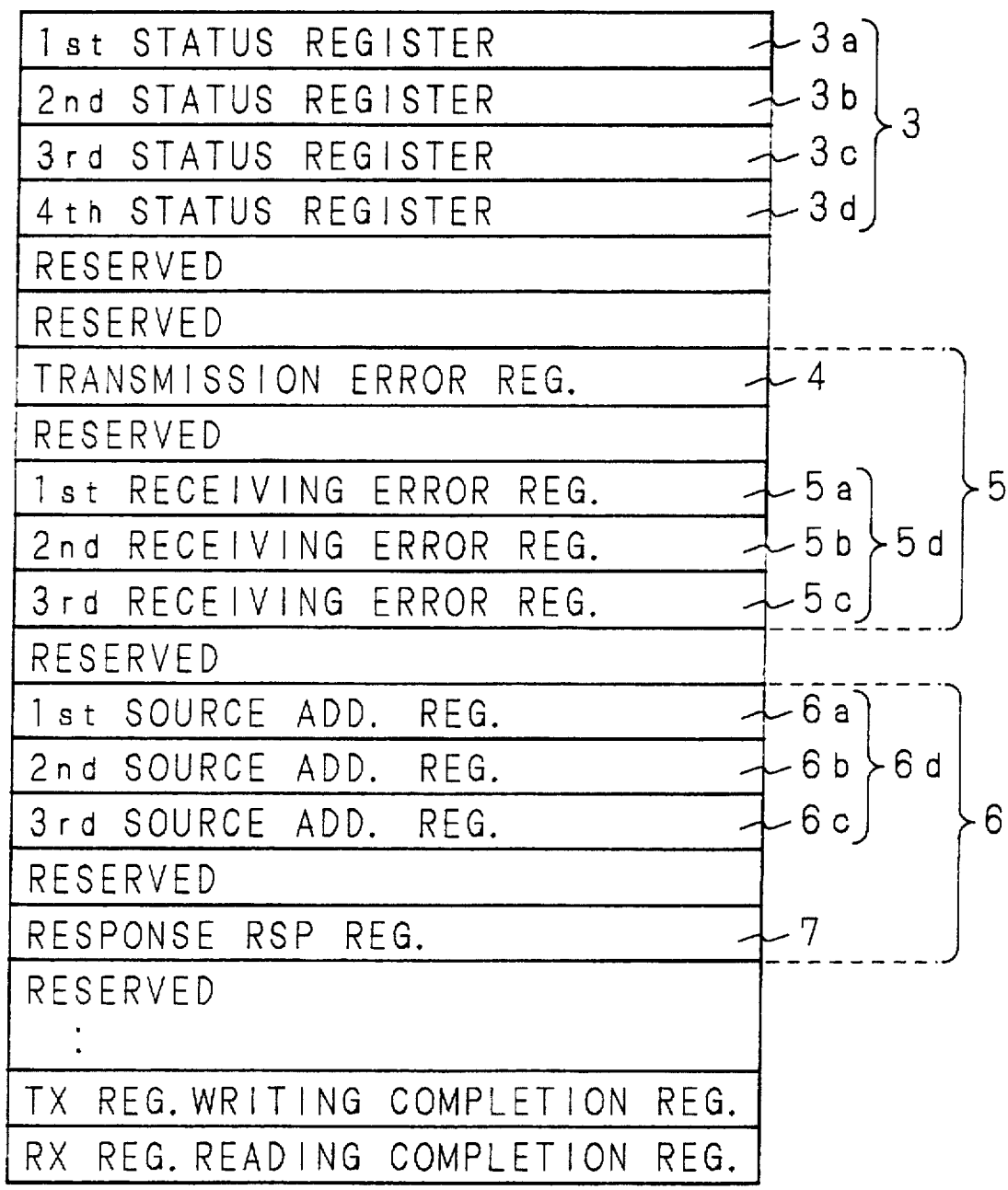
FIG. 7 is a schematic chart showing a specific configuration of a buffer memory of a communication apparatus of the present invention.

Next, a configuration of the buffer memory of the communication apparatus of the present invention is described more specifically, with reference to FIG. 6 and FIG. 7 showing the specific configuration of the buffer memory of the communication apparatus of the present invention.

The transmission buffer 1 is constituted by 15 registers for respectively storing a plurality of data constituting the transmission frame for one frame. Respective registers of the transmission buffer 1 have a data capacity of 8 bits (1 byte), and in order from the head address side, data of a message length, a priority code, a destination address, a source address and a type format/diagnostic mode and communication data up to 10 bytes are stored respectively.

The receiving buffer group 2 is capable of storing the received frame for 2 frames. And hence, the first and second receiving buffers 2a and 2b having the same configuration are included in the receiving buffer group 2. Each of the receiving buffers 2a and 2b is constituted by 16 registers for respectively storing a plurality of data respectively constituting the receiving frames for one frame. Each register of the first and second receiving buffers 2a and 2b has a data capacity of 8 bits (1 byte), and in order from the head address, data of message length, a priority code, a destination address, a source address, a type format/diagnostic mode, communication data up to 10 bytes and CRC data are stored respectively.

The first, second, third and fourth status registers 3a, 3b, 3c and 3d store one transmission frame stored in the above-mentioned transmission buffer 1, two receiving frames stored in the receiving buffers 2a and 2b, and further, data for managing the states when requested to receive the third frame in the case where the receiving frames are stored respectively in the receiving buffers 2a and 2b by one data for respective frames.

The transmission error register 4 stores data of the transmitting state of the transmission frame stored in the transmission buffer 1, or data showing whether or not there is occurrence of errors.

The first, second and third receiving error registers 5a, 5b and 5c of the receiving error register group 5d store two receiving frames stored in the above-mentioned receiving buffers 2a and 2b, and data of the receiving states when requested to receive the third frame in the case where the receiving frames are stored already in the receiving buffers 2a and 2b, or data showing whether or not there is occurrence of errors.

The first, second the third source address registers 6a, 6b and 6c of the source address register group 6d respectively store the receiving frames stored in the above-mentioned receiving buffers 2a and 2b, and the source address which is data of the fourth byte in the above-mentioned third frame.

The response RSP register 7 stores a response (hereinafter, referred to as the response RSP) returned from the receiving side in the case where the transmission frame is transmitted.

Next, an address configuration of the transmission buffer 1 and the receiving buffers 2a and 2b of the receiving group 2 is described with reference to a schematic chart of FIG. 8.

The transmission buffer 1 includes a memory area capable of storing 15 bytes (there is an additional unused area of 1 byte) of data string in which 8 bits are constituted as one byte. The receiving buffers 2a and 2b include memory areas capable of storing 16 bytes of data string in which 8 bits are constituted as one byte.

A write address 1WA and a read address 1RA of the transmission buffer 1 are commonly allocated with addresses from "00" to "0F" in a hexadecimal notation. A write address 2aWA and a read address 2aRA of the first receiving buffer 2a are commonly allocated from "10" to "1F" in the hexadecimal notation. Moreover, a write address 2bWA and a read address 2bRA of the second receiving buffer 2b are also commonly allocated from "20" to "2F" in the hexadecimal notation.

Other registers besides the transmission buffer 1 and the receiving buffer group 2, are allocated with addresses as shown in FIG. 9. Here, a TX register writing completion register 64 and an RX register reading completion register 67 of the addresses "7E" and "7F" are described later.

Here, data and their order constituting the transmission frame stored in the transmission buffer 1 are described with reference to a schematic chart of FIG. 10.

Figure 10:
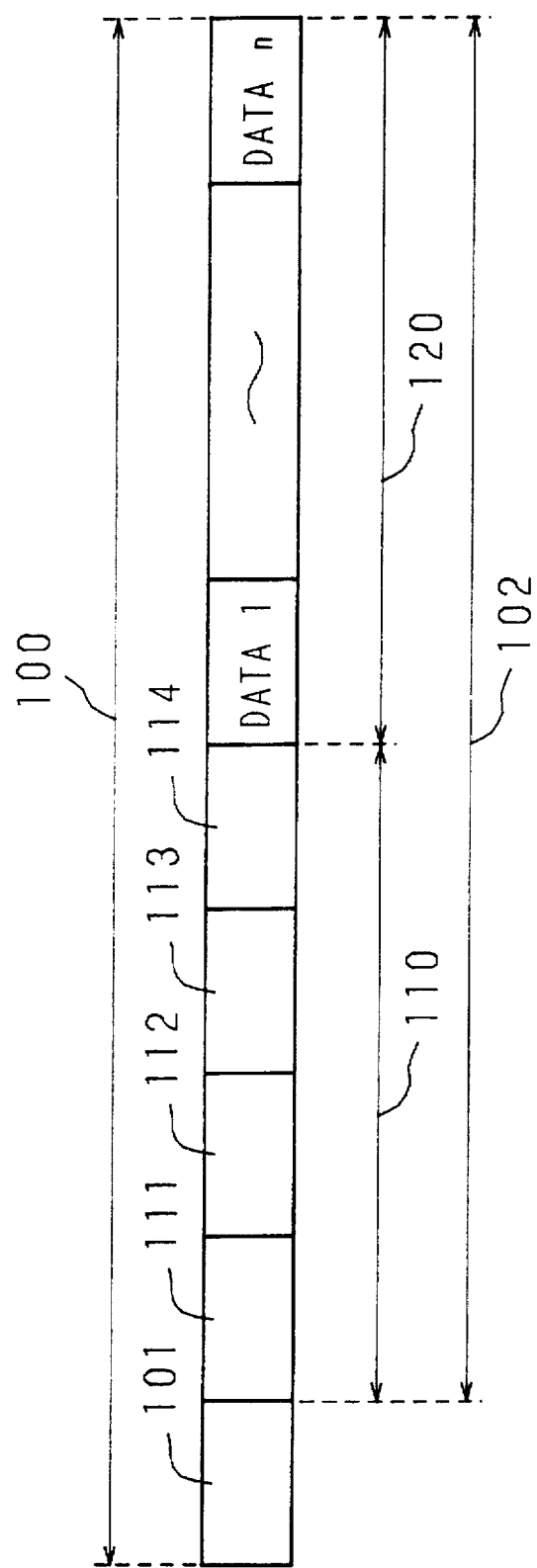
FIG. 10 is a schematic chart showing data and its order constituting a transmission frame stored in a transmission buffer.

In FIG. 10, an area designated by reference numeral 100 is a transmission data group stored in the transmission buffer 1. This data group is constituted by the transmission frame which is a message field 102 and a message-length field 101, in which data indicating a message length (number of bytes) of the message field 102 are stored.

The message field 102 is constituted by a 4-byte communication control data group field 110, and a communication data group field 120 of maximum 10 bytes which is an original field storing the communication data. Each of the 1-byte fields of the communication control data group field 110 is constituted by fields 111, 112, 113 and 114 in which respective data of the priority code, destination address, source address and type format/diagnostic mode are stored.

The number of bytes of a communication data group field 120 of the transmission frame differs with the transmission frames, thus a message length of the overall transmission frame is not fixed. Therefore, the number of bytes of the message field 102 is stored in the message length field 101 of the transmission data group 100. However, the maximum number of bytes is 14.

Though the transmission data group 100 as above-mentioned is stored in the transmission buffer 1, specifically, it is stored in the following manner.

In a 1-byte area of "00" of the addresses 1WA and 1RA of the transmission buffer 1, the message length field 101 is stored. In a 4-byte area of addresses "01" to "04", 4-byte data constituting the communication control data group 110 are stored respectively. That is, respective data of the communication control data group 110 are respectively stored such that, the priority code field 111 is stored in the fist byte of the address "01", the destination address field 112 is stored in the second byte of the address "02", the source address field 113 is stored in the third byte of the address "03", and the type format/diagnostic mode field 114 is stored in the fourth byte of the address "04". Respective fields of the communication data group field 120 constituted by n-communication data groups (n ranges from 1 to 10) are stored in a 10-byte area of the addresses from "05" to "0G".

Figure 11:
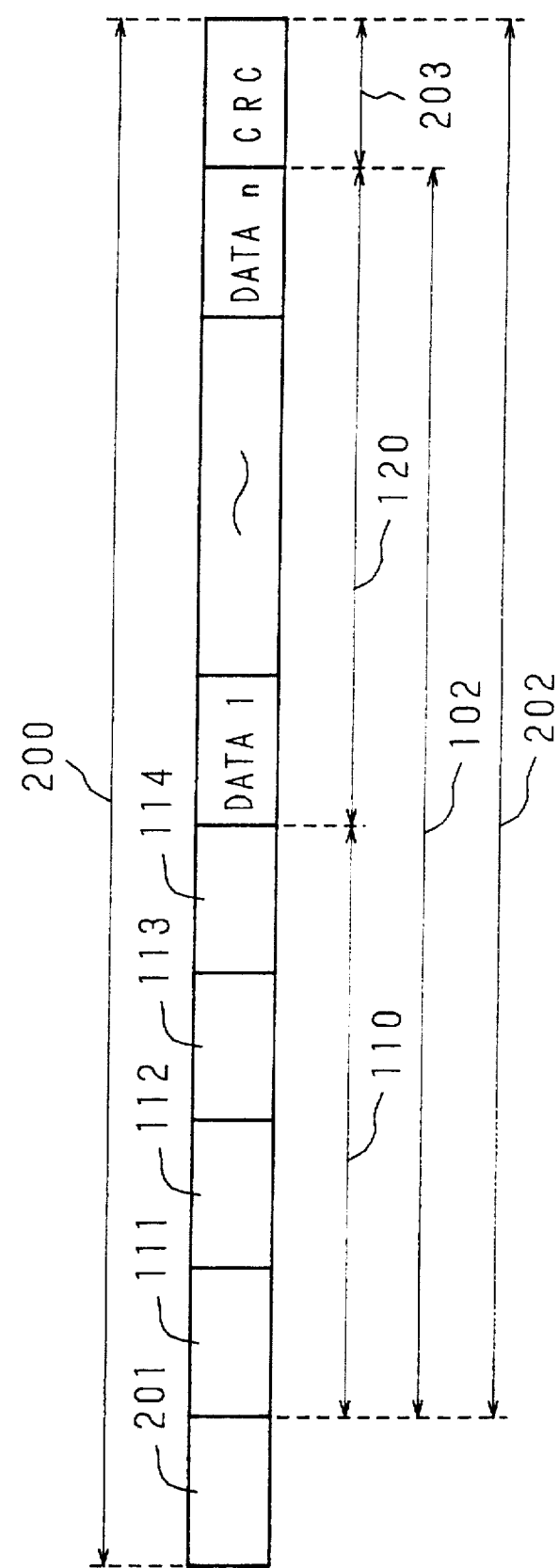
FIG. 11 is a schematic chart showing data and data order of a receiving frame stored in a receiving buffer.

Next, data and their order of the receiving frames stored in the receiving buffers 2a and 2b are described with reference to a schematic chart of FIG. 11 showing its configuration.

In FIG. 11, range designated by reference numeral 200 is a data group which are to be stored in the receiving buffers 2a and 2b. This data group is constituted by adding a message length field 201 indicating a message length of a receiving frame 202, to the receiving frame 202 which is constituted by the message field 102 and a CRC field 203 in which CRC byte data are stored.

The message field 102 is constituted by the 4-byte communication control data group field 110 and the communication data group field 120 of maximum 10 bytes which is an original field storing the communication data. Each of the 1-byte fields of the communication control data group-field 110 is constituted by fields 111, 112, 113 and 114 in which respective data of the priority code, destination address, source address and type format/diagnostic mode are stored.

The number of bytes of the communication data group field 120 of the receiving frames 2a and 2b differs with the receiving frames, thus a message length of the overall transmission frame is not fixed. Therefore, the number of bytes obtained by adding the number of bytes of the CRC field 203 to that of the message field 102 is stored in the message length field 201 of the receiving data group 200. However, different from the message length field 101 of the transmission data group, the maximum number of bytes is 15, because the CRC field 203 is added in the receiving frame.

Though such receiving data group are stored in either or both of the receiving buffers 2a and 2b, specifically, they are stored in the following manner.

The message length field 201 is stored in a 1-byte area of "10" of the addresses 2aWA and 2aRA of the first receiving buffer 2a. In a 4-byte area of addresses "11" to "14", 4-byte data constituting the communication control data group 110 are stored respectively. That is, respective data of the communication control data group 110 respectively stored such that, the priority code field 111 is stored in the first byte of the address "11", the destination address field 112 is stored in the second byte of the address "12", the source address field 113 is stored in the third byte of the address "13", and the type format/diagnostic mode field 114 is stored in the fourth byte of the address "14". Respective fields of the communication data group field 120 constituted by n-communication data groups (n ranges from 1 to 10) are stored in a 10-byte area of the addresses from "15" to "1G". For example, in the case where the communication data group field 120 is constituted by up to 10 communication data, the CRC field 203 is stored in a 1-byte area of the address "1F".

The second receiving buffer 2b, basically, similar to the first receiving buffer 2a, except the point that higher order sides of the addresses 2bWA and 2bRA are "2", instead of "1" in the case of first receiving buffer 2a.

When summarizing the above, a difference between the transmission data group 100 stored in the transmission buffer 1 and the receiving data group 200 stored in the receiving buffers 2a and 2b is only a sixteenth byte, which is stored in an area where the lower 4-byte sides of the addresses of the transmission buffer 1 or the receiving buffers 2a and 2b are "F". That is, the sixteenth byte is not used in the transmission data group 100, and in the receiving data group 200, for example, in the case where the communication data group field 120 is constituted by up to 10 communication data, the sixteenth byte is used as the CRC field 203. And, higher 4 bits of the addresses 1WA and 1RA allocated to the transmission buffer 1 are fixed to "0" in a hexadecimal notation, and when the lower 4 bits are changed in order from "0" to "F" (actually, to "G"), it is possible to designate a peculiar address in the 16-byte transmission buffer 1.

Upper 4 bits of the addresses 2aWA and 2aRA allocated to the first receiving buffer 2a are fixed to "1" in a hexadecimal notation, and when the lower 4 bits are changed in order from "0" to "F", it is possible to designate a peculiar address in the 16-byte first receiving buffer 2a.

Moreover, higher 4 bits of the address 2bWA and 2bRA allocated to the second receiving buffer 2b are fixed to "2" in a hexadecimal notation, and when the lower 4 bits are changed in order from "0" to "F", it is possible to designate a peculiar address in the 16-byte second receiving buffer 2b.

That is, address designation for the buffer memory block 9 is performed such that, either of the transmission buffer 1, or the first receiving buffer 2a or second receiving buffer 2b is designated by the higher 4 bits in the 8-bit address, and respective areas of one byte are designated by the lower 4 bits.

Next, a configuration for generating addresses of the transmission buffer 1 and the receiving buffer group 2 having such an address configuration is described.

Figure 12:
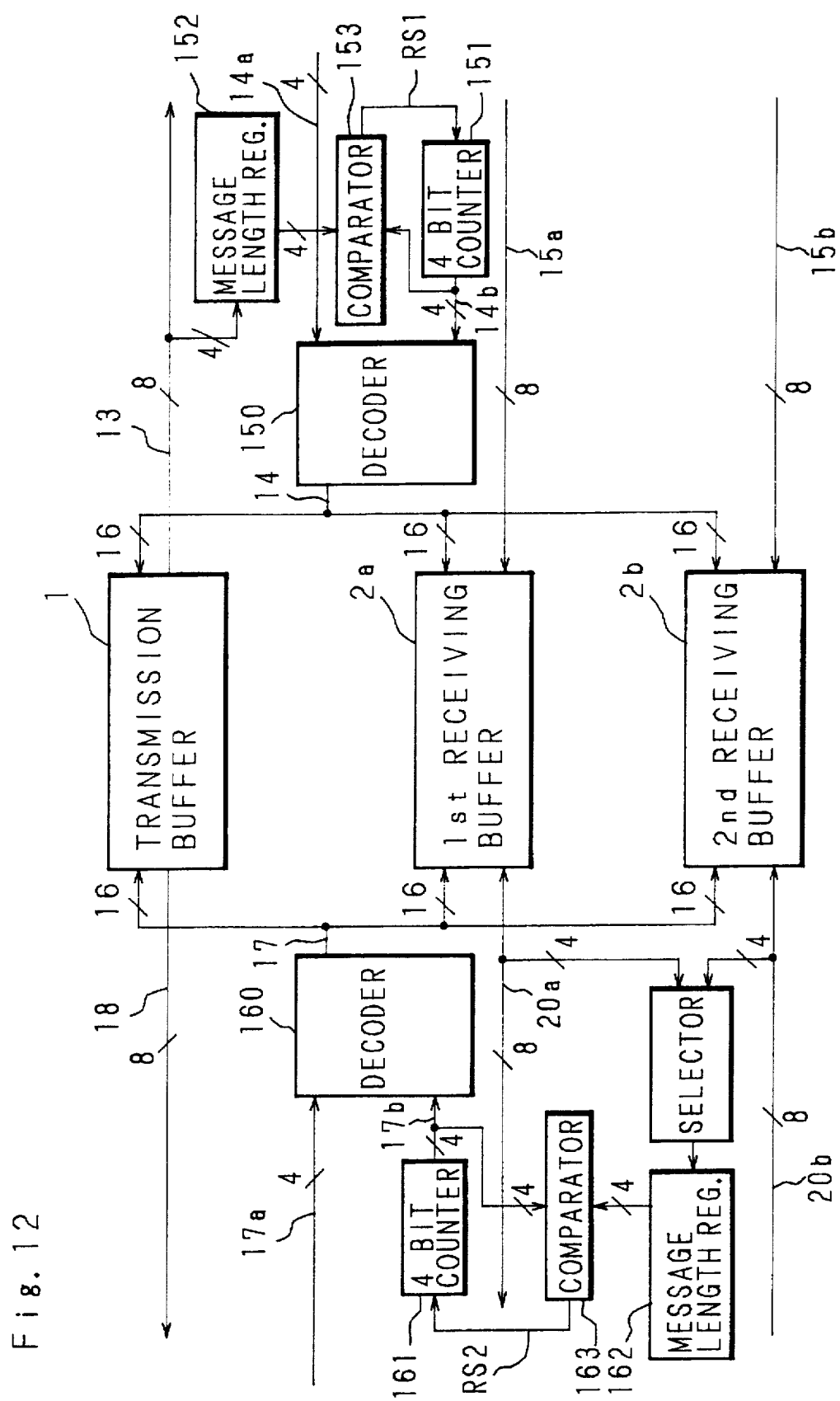
FIG. 12 is a block diagram showing a configuration of essential portions of an address generating mechanism for a transmission buffer and a receiving buffer group.

FIG. 12 is a block diagram showing the configuration of essential portions of an address generating mechanism for the transmission buffer 1 and the receiving buffer group 2. In addition, the LAN IF block 10 and the microcomputer IF block 11 positioned respectively on the right side and on the left side in FIG. 12.

In FIG. 12, reference numeral 14a designates a 4-bit address signal given from the LAN IF block 10 and inputted to a decoder 150. To the decoder 150, a 4-bit counter 151 is connected, and its count value output signal 14b is inputted to the decoder 150. The decoder 150 generates an 8-bit address signal 14, in which the address signal 14a given from the LAN IF block 10 is the higher 4 bits, and the output signal 14b of the counter 151 is the lower 4 bits, and gives it respectively to the transmission buffer 1, first receiving buffer 2a and second receiving buffer 2b.

The output signal 14b of the counter 151 is also given to a comparator 153, from which a reset signal RS1 is given to the counter 151.

Reference numerals 15a and 15b respectively designate input data signals to the first receiving buffer 2a and the second receiving buffer 2b from the LAN IF block 10, and reference numeral 13 designates an output data signal from the transmission buffer 1. The output data signal 13 from the transmission buffer 1 is also given to a message length register 152, and when the transmission data group stored in the transmission buffer 1 is outputted to the LAN IF block 10, message length data located at the head is stored in the message length register 152.

The message length data stored in the message length register 152 is given to the comparator 153. The comparator 153 compares the message length data given from the message length register 152 with the count value output signal 14b of the counter 151, and when they are coincided, activates the afore-mentioned reset signal RS1 which is outputted to the counter 151.

Meanwhile, reference numeral 17a designates a 4-bit address signal given from the microcomputer IF block 11 and inputted to a decoder 160. To the decoder 160 a 4-bit counter 161 is connected, and its count value output signal 17b is inputted to the decoder 160. The decoder 160 generates an 8-bit address signal 17, in which the address signal 17a given from the microcomputer IF block 11 is the higher 4 bits and the output signal 17b of the counter 161 is the lower 4 bits, and gives it to the transmission buffer 1, first receiving buffer 2a and second receiving buffer 2b.

The output signal 17b of the counter 161 is also given to a comparator 163, from which a reset signal RS2 is given to the counter 161.

Reference numerals 20a and 20b respectively designate output data signals to the microcomputer IF block 11 from the first receiving buffer 2a and the second receiving buffer 2b, and reference numeral 18 designates an input data signal to the transmission buffer 1 from the microcomputer IF block 11. And, the output data signals 20a and 20b to the microcomputer IF block 11 from the first receiving buffer 2a and the second receiving buffer 2b are given to a message length register 162 via a selector 164, and when the receiving data groups stored in the receiving buffers 2a and 2b are outputted to the microcomputer IF block 11, message length data located at the head is stored in the message length register 162.

The message length data stored in the message length register 162 is given to the comparator 163. The comparator 163 compares the message length data given from the message length register 162 with the count value output signal 17b of the counter 161, and when they are coincided, activates the afore-mentioned reset signal RS2 which is outputted to the counter 161.

Figure 13:
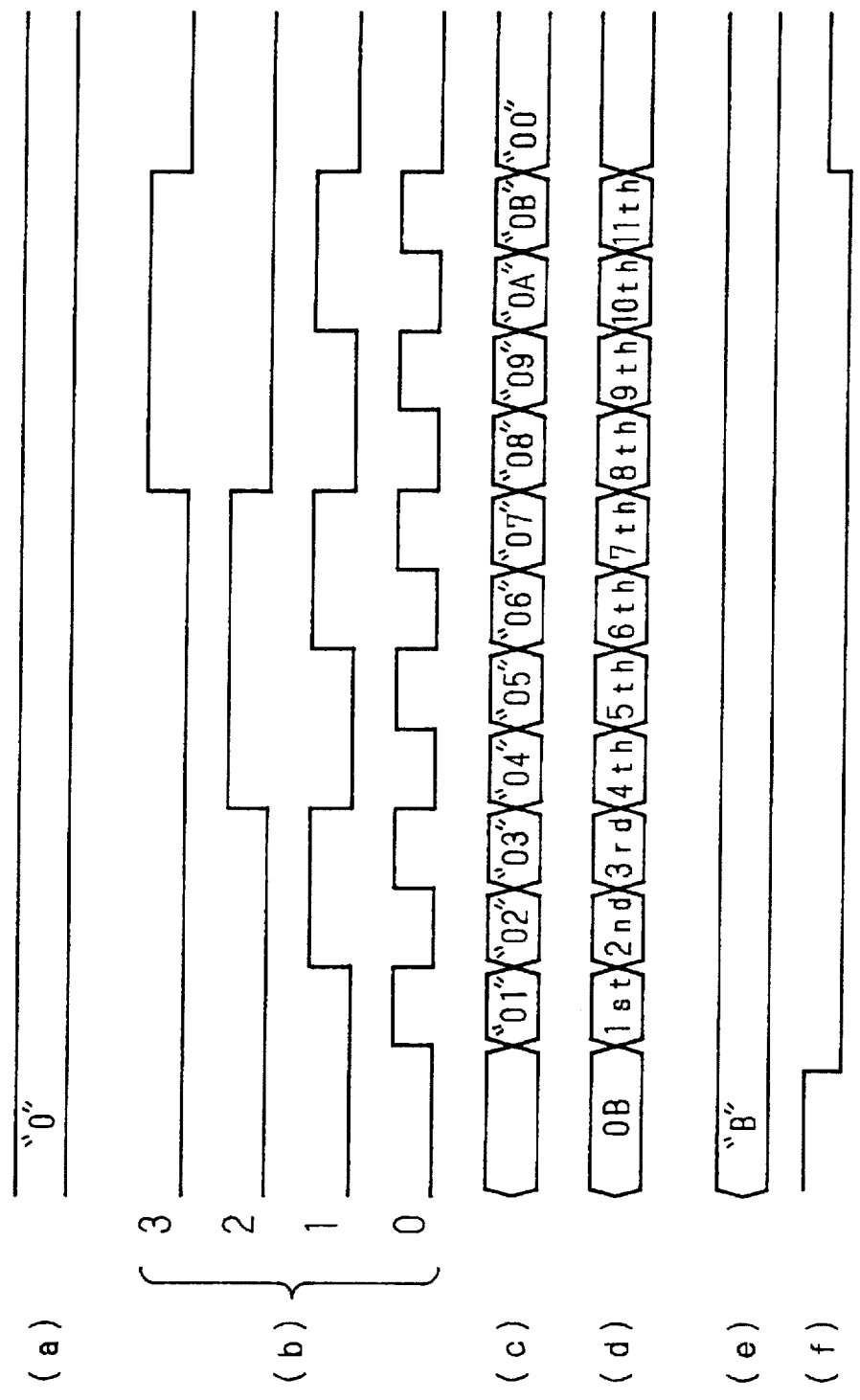
FIG. 13 is a timing chart showing the state of output signals of component elements in the block diagram of FIG. 12 and a state of writing data to a transmission buffer.
Figure 14:
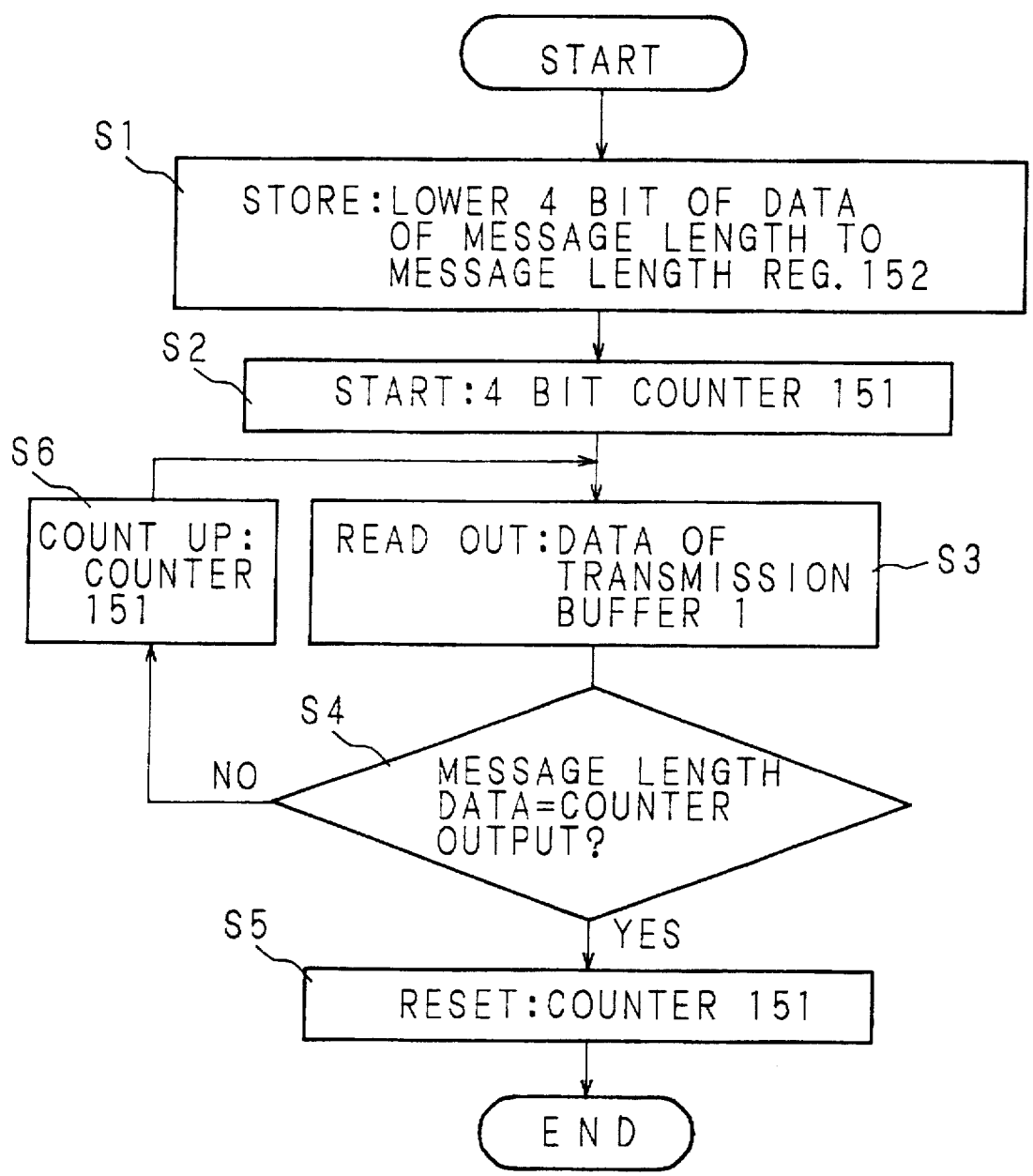
FIG. 14 is a flow chart showing the state of output signals of component elements in the block diagram of FIG. 12 and procedures of writing data to a transmission buffer.

Next, as an example of the operation of an address generating mechanism having the configuration shown in a block diagram of FIG. 12 as stated above, the case where the transmission frame, whose message length of the message field 102 is 11 bytes (message length is "0B") and 1-byte message length field 101 is added thereto, is stored in the transmission buffer 1 and read out to the LAN IF block 10 is described. Here, FIG. 13 is a timing chart showing the state of output signals of component elements in FIG. 12 stated above and the writing state of data to the transmission buffer 1 in that case, and FIG. 14 is a flow chart showing its procedures. Component elements shown in a block diagram of FIG. 12 are designed to operate in synchronism with a clock not shown.

First, as shown in FIG. 13(a), a 4-bit address signal 14 is outputted from the LAN IF block 10. The 4-bit value of the address signal 14a is fixed to "0" in a hexadecimal notation. At this time point, since the counter 151 is not started, the output signal 14b is "0" in a hexadecimal notation as shown in FIG. 13(b). Thus, the address signal 14 outputted from the decoder 150 becomes "00" in a hexadecimal notation, in which the address signal 14a is the higher 4 bits and the output signal 14b of the counter 151 is the lower bits as shown in FIG. 13(c). By this address signal "00", the address "00" of the transmission buffer 1 is accessed and the message length data "0B" stored in the address is outputted to the LAN IF block 10 side as the output data signal 13, and at the same time, the lower 4-bit data "B" is stored in the message length register 152 as shown in FIG. 13(e) (Steps S1 in FIG. 14).

By data stored newly in the message length register 152, as shown in FIG. 13(f), the reset signal RS1 given to the counter 152 from the comparator 153 is inactivated, whereby the counter 151 starts to count (Step S2 in FIG. 14). The count value output signal 14b of the counter 151 counts up in order from "0" to "1", "2" in a hexadecimal notation by its 4 bits as shown in FIG. 13(b). Thus, the address signal 14 outputted from the decoder 150 is also incremented in order as is as "00", "01", "02" ... in a hexadecimal notation as shown in FIG. 13(c). And hence, by accessing respective addresses of the transmission buffer 1 in order, data of 1-byte each stored in the respective addresses are read out in order from the transmission buffer 1 by a clock synchronization, and outputted to the LAN IF block 10 as the output data signal 13 (Step S3 in FIG. 14).

By the counter 151 which counts up in order while address signal 14a is fixed to "0", in the manner stated above, respective addresses of the transmission buffer 1 are accessed in order and respective byte data of the transmission frame are outputted to the LAN IF block 10 side, but during this period, the comparator 153 compares data "B" the message length stored in the message length register 152 with the count value output signal 14b of the counter 151 (Step S4 in FIG. 14). Then, while the comparison result by the comparator 153 is not coincided, the counter 151 continues to count up as stated above (Step S6 in FIG. 14). Since the comparison results by the comparator 153 is coincided soon at the time point when the output signal of the counter 151 becomes "B", the comparator 153 activates the reset signal RS1 outputted to the counter 151 (Step S5 in FIG. 14). Thereby, the counter 151 stops connecting up and reading the transmission frame from the transmission buffer 1 is completed.

The operations of a decoder 160, a 4-bit counter 161, a message length register 162 and a comparator 163 on the microcomputer IF block 11 side are basically same as those of the decoder 150, 4-bit counter 151, message length register 152 and comparator 153 on the aforesaid LAN IF block 10 side. However, since the receiving frames are outputted to the microcomputer IF block 11 side from the receiving buffers 2a and 2b, the message length data input to the message length register 162 is designated to be selected by the selector 164.

Accordingly, by fixing the address signal 17a inputted to the decoder 160 to either "1" or "2" and counting up the counter 161, as same as the operation of the aforesaid LAN IF block 10 side, it is possible to access either the first receiving buffer 2a or the second receiving buffer 2b to read receiving data stored therein by the microcomputer IF block 11.

Next, a CRC byte which is the last 1 byte of the transmission frame and stored in the CRC field 203 is described.

Figure 15:
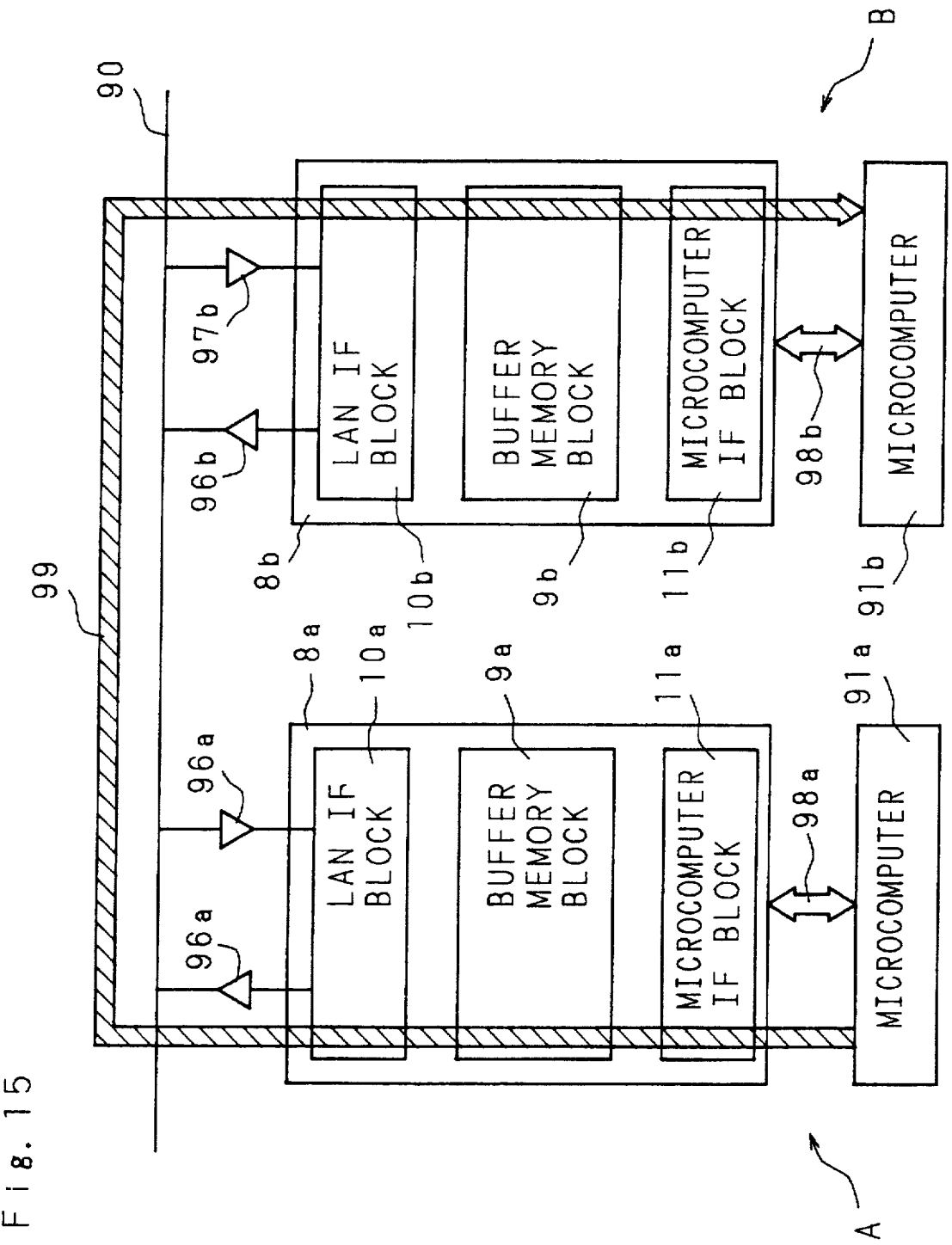
FIG. 15 is a block diagram showing a configuration when two sets of communication apparatus are connected to a LAN transmission line for communication therebetween.

FIG. 15 is a block diagram showing a configuration in the case where two sets of communication apparatus of the present invention are connected to the LAN transmission line 90 for communication therebetween.

In FIG. 15, reference numeral 8a and 8b respectively designate the communication apparatus of the present invention, to which microcomputers 91a and 91b are connected. The communication apparatus 8a and 8b are connected respectively to the LAN transmission line 90 via transmission drivers 96a, 96b and receiving drivers 97a, 97b.

In the on-board transmission processors 8a and 8b, LAN IF blocks 10a, 10b, buffer memory blocks 9a, 9b and microcomputer IF blocks 11a, 11b are provided respectively as stated above; a unit constituted by the communication apparatus 8a and the microcomputer 91a, in which a character a is added to respective numerals, is defined as a node A, and a unit constituted by the communication apparatus 8b and the microcomputer 9b, in which a character b is added to respective reference numerals, in defined as a node B.

Here, as an example, communication performed from the node A to node B is described. In this case, communicating data flow is a direction as indicated by the arrow 99 in FIG. 15.

First, the transmission frame in data order as aforementioned is stored in the transmission buffer 1 in the buffer memory block 9a from the microcomputer 91 via the microcomputer IF block 11a in the node A, according to the address allocation as afore-mentioned.

Next, the transmission frame stored in the transmission buffer 1 is transferred to the LAN IF block 10a, wherein the CRC operation is performed for the message field 102. The CRC operation result is added to an end of the transmission frame, when the transmission frame stored in the transmission buffer 1 is sent out to the LAN transmission line 90 through the transmission driver 96a.

In the node B, the transmission frame sent out from the node A is received from the LAN transmission line 90 as the receiving frame via the receiving driver 97b. The LAN IF block 10b performs CRC operation for the message field 102 and the CRC field 203 of the receiving frame, and at the same time, counts the number of bytes of the message field 102 and CRC field 203 and writes the result into the first receiving buffer 2a or second receiving buffer 2b as data of the receiving frame message length field 201, according to the aforementioned data order and address allocation.

Figure 16:
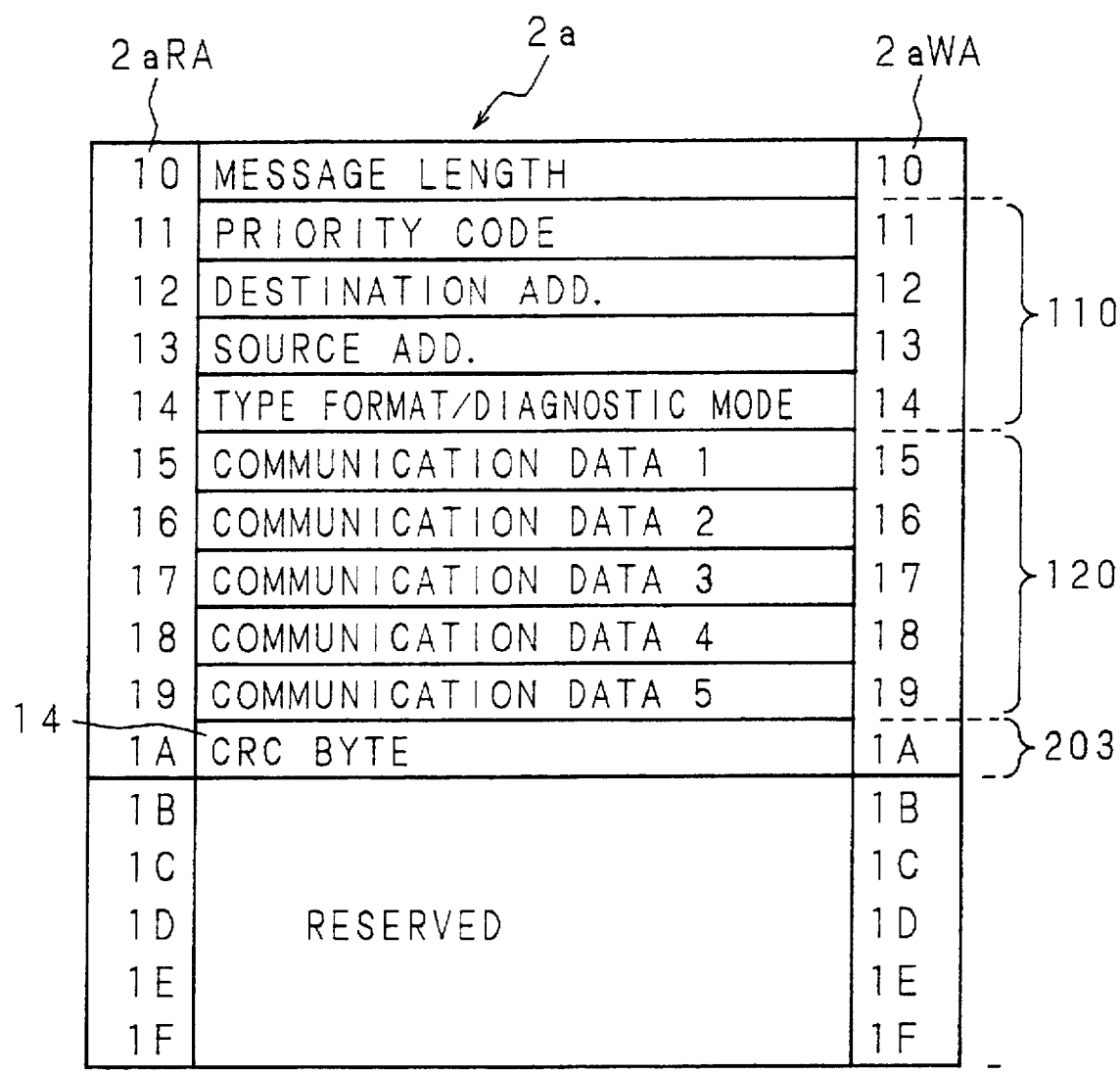
FIG. 16 is a schematic chart showing a state when a receiving frame whose communication data group is 5 bytes is stored in a first receiving buffer.

Here, as an example, a state in the case where the receiving frame, in which communication data group stored in the communication data group field 120 of the frame transmitted to the node B from the node A is 5 bytes, is stored in the first receiving buffer 2a is shown in a schematic chart of FIG. 16.

As shown in FIG. 16, the CRC byte is stored in the address "1A" of the first receiving buffer 2a, and is located at the end of a series of data string of the transmission frame. In this case, areas from the addresses "1B" to "1F" are not used. In the case, for example, where the communication data group is up to 10 bytes, the CRC byte is to be stored in the address "1F".

Next, a specific control of the buffer memory of the communication apparatus of the present invention is described with reference to the drawings.

Figure 17:
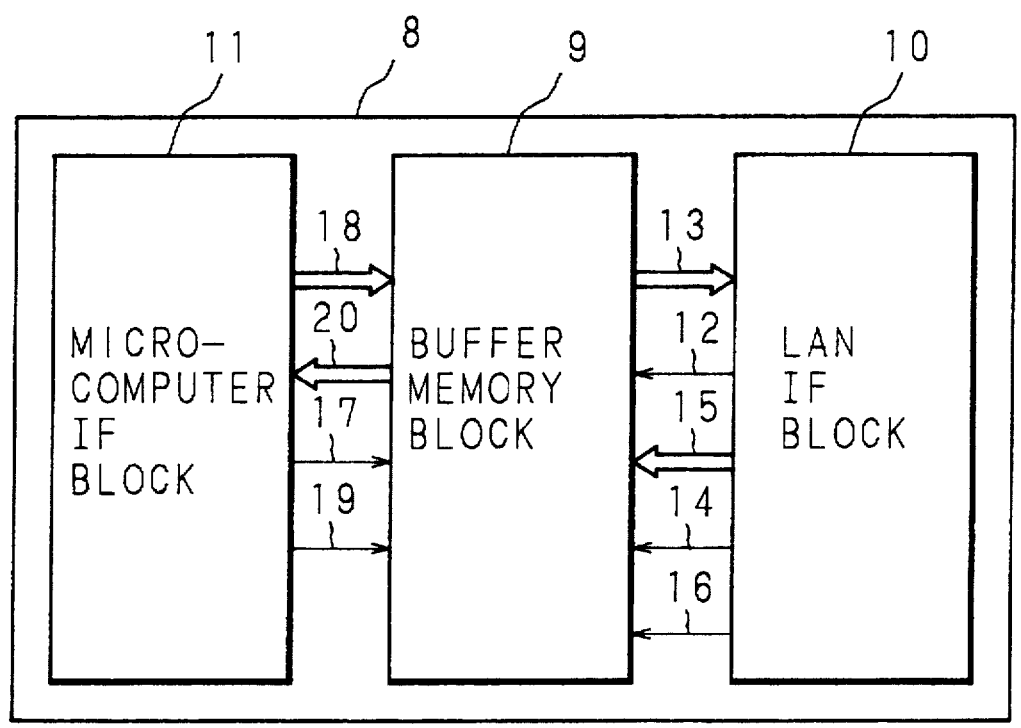
FIG. 17 is a schematic chart showing the input and output relationship of an address signal and a data signal in a communication apparatus of the present invention.
Figure 18:
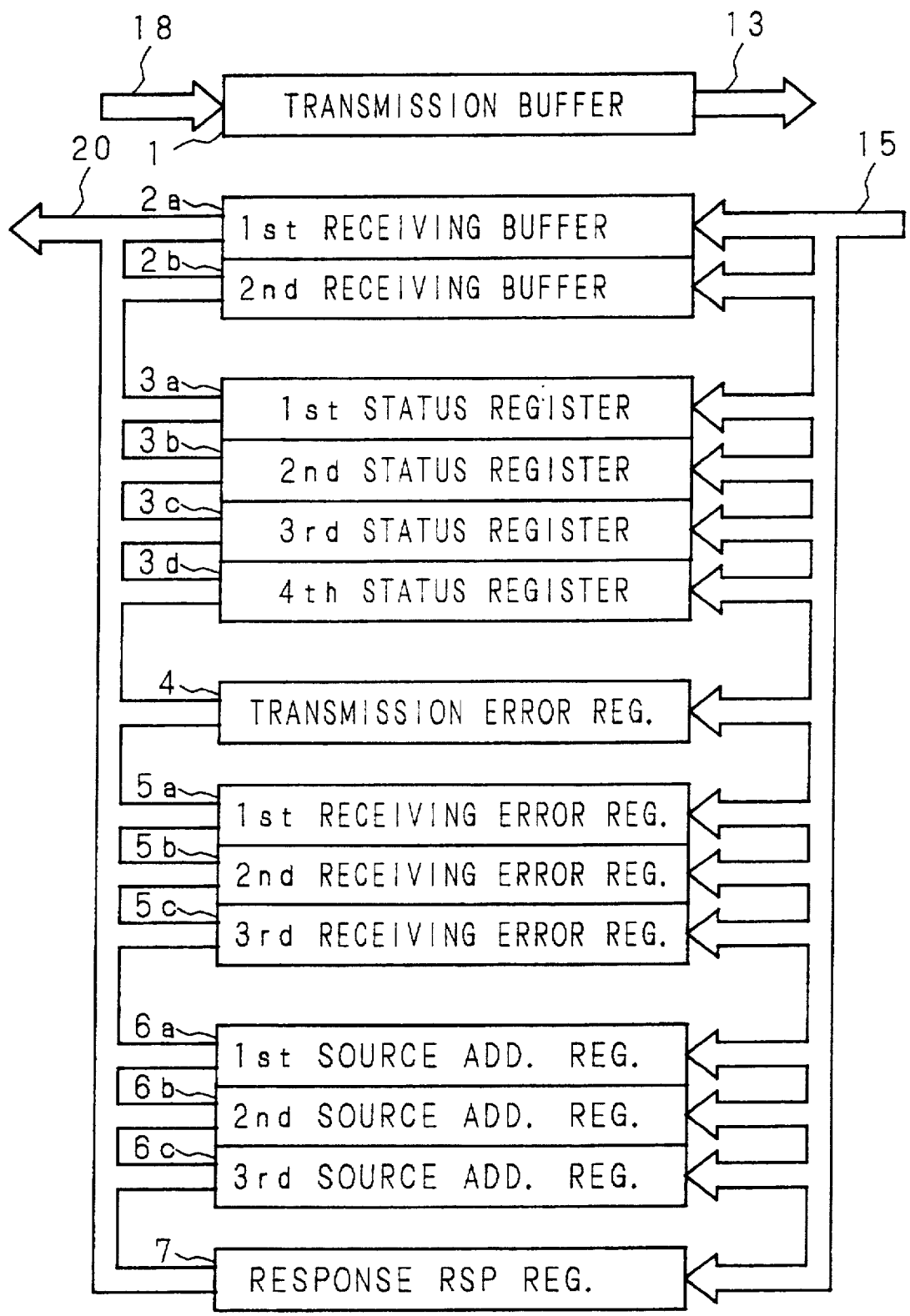
FIG. 18 is a schematic chart showing the input and output relationship of data for buffer memories.
Figure 19:
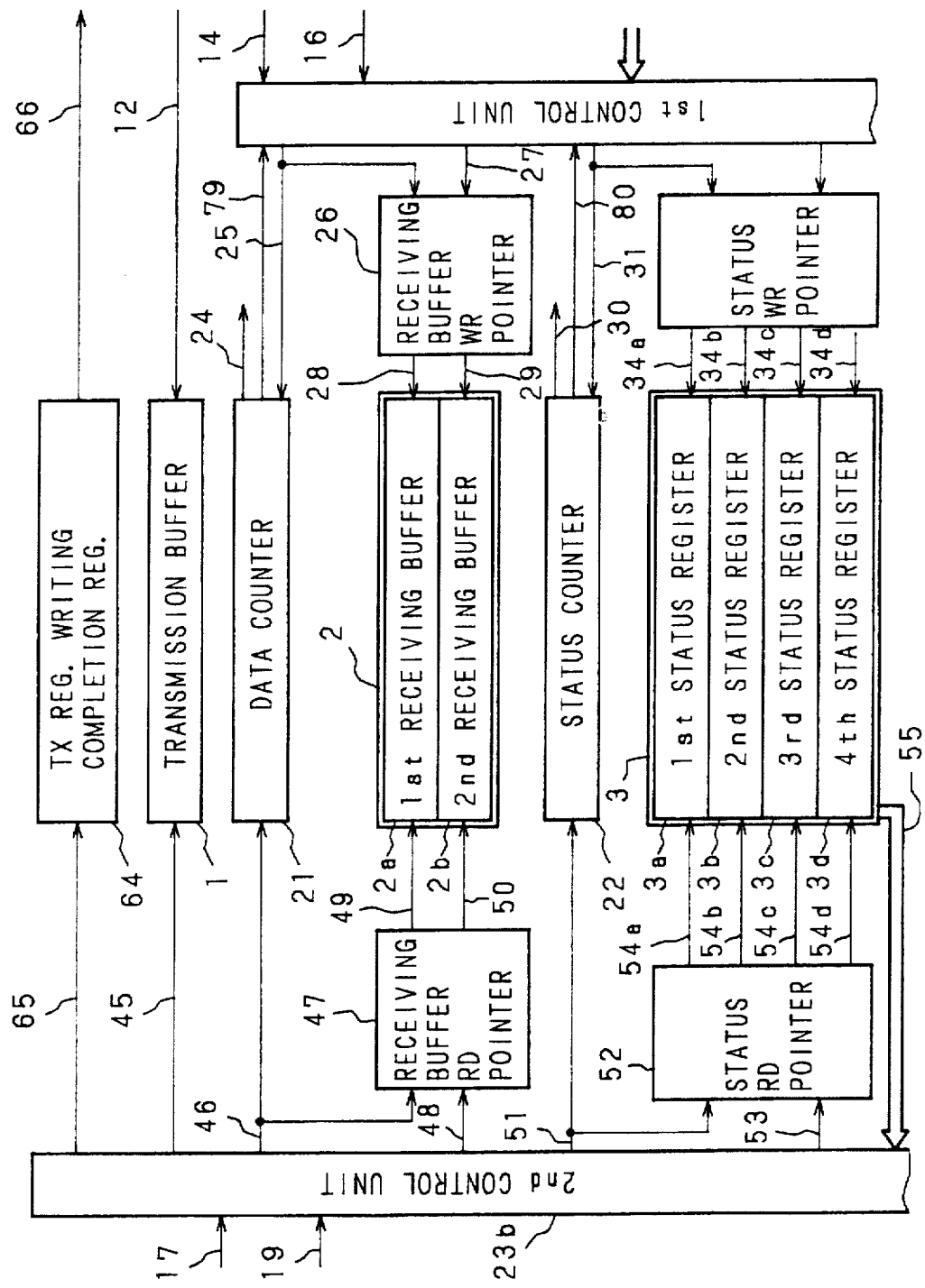
FIG. 19 is a schematic chart showing mainly the input and output relationship of control signals and address signals of the buffer memories.
Figure 20:
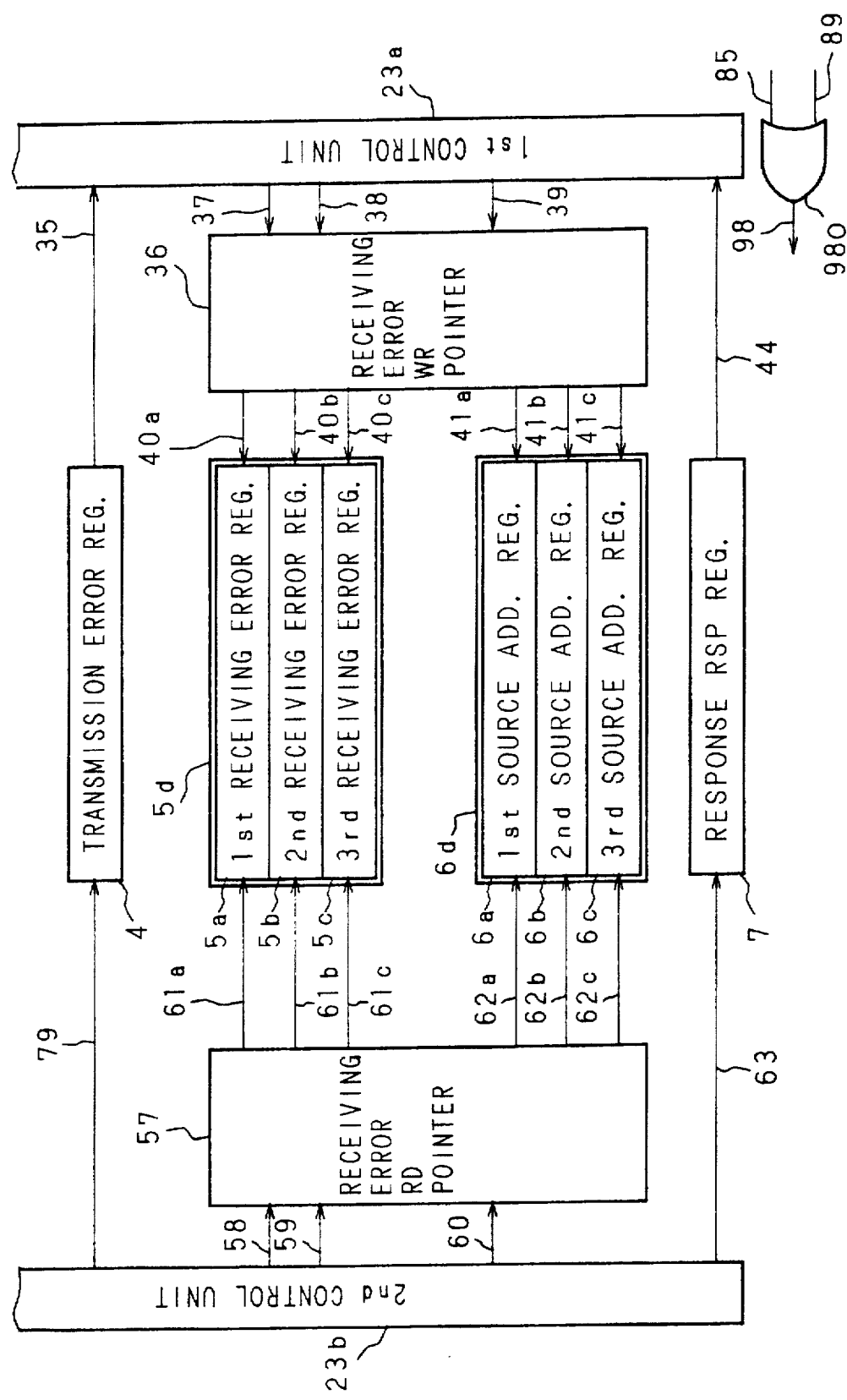
FIG. 20 is a schematic chart showing mainly the input and output relationship of control signals and address signals of the buffer memories.

FIG. 17 is a schematic chart showing the relationship of input and output address signals and data signals in the communication apparatus of the present invention. FIG. 18 is a schematic chart showing the relationship of input and output data for the buffer memory, and FIG. 19 and FIG. 20 are schematic charts showing the relationship, mainly, of the input and output of control signal and address signal of the buffer memory. The bottom side of FIG. 19 is continued to the top side of FIG. 20.

Reference numeral 12 of FIG. 17 and FIG. 19 designates an address signal given to the buffer memory block 9 from the LAN IF block 10, which is, as shown in FIG. 19, a read address signal (hereinafter, referred to as a transmission read address signal) of the transmission buffer 1. The transmission read address signal 12 is, more specifically, the address signal in the case where the address signal 14 generated by the aforesaid address generating mechanism designates the transmission buffer 1.

Reference numeral 13 of FIG. 17 and FIG. 18 designates a data output signal outputted to the LAN IF block 10 from the transmission buffer 1, and transmission frame data stored in the address of the transmission buffer 1 designated by the transmission read address signal 12 is outputted.

Reference numeral 14 of FIG. 17 and FIG. 19 designates an address signal (hereinafter, referred to as a receiving write address signal) given to the buffer memory block 9 from the LAN IF block 10. The receiving write address signal 14 is, more specifically, the write address signal to the receiving buffer group 2, status register group 3, transmission error register 4, receiving error register 5d, source address register group 6d and response RSP register 7.

Reference numeral 15 of FIG. 17 and FIG. 18 designates a receiving frame data signal (hereinafter, referred to as a receiving write data signal) inputted to the buffer memory block 9 from the LAN IF block 10.

Reference numeral 16 of FIG. 17 and FIG. 9, designates a signal (hereinafter, referred to as a receiving write signal) which writes the receiving write data signal 15 into the buffer and register group designated by the receiving write address signal 14 which is given from the LAN IF block 10.

Reference numeral 17 of FIG. 16 and FIG. 19 designates an address signal (hereinafter, referred to as the address signal from the microcomputer IF block 11) given to the buffer memory block 9 from the microcomputer IF block 11. The address signal 17 is, more specifically, the write address signal to the transmission buffer 1 and the read address signal which reads the receiving buffer group 2, status register group 3, transmission error register 4, receiving error register group 5d, source address register group 6d and response RSP register 7.

Reference numeral 18 of FIG. 17 and FIG. 18 designates a transmission frame data signal given to the buffer memory block 9 from the microcomputer IF block 11, which is the write data signal (hereinafter, referred to as a transmission write data signal) to transmission buffer 1 as shown in FIG. 18.

Reference numeral 19 of FIG. 17 and FIG. 19 designates a signal (hereinafter, referred to as a write signal from the microcomputer IF block 11), which writes the transmission write data signal 18 into the address of the transmission buffer 1 designated by the address signal 17 from the microcomputer IF block 11.

Reference numeral 20 of FIG. 17 and FIG. 18 designates a read data signal (hereinafter, referred to as a receiving read data signal) of the receiving buffer group 2, status register group 3, transmission error register 4, receiving error register group 5d, source address register group 6d and response RSP register 7, which is the receiving frame data output signal to the microcomputer IF block 11 from the buffer memory block 9 as shown in FIG. 17.

Reference numeral 21 of FIG. 19 designates a data counter constituted by a ternary up-down counter. The data counter 21 counts up when writing to the receiving buffer group 2 is completed, and counts down when reading from the receiving buffer group 2 is completed, thereby counting the number of frames in the receiving buffer group 2 to output its count value output signal 24.

Similarly, reference numeral 22 designates a status counter constituted by a quinary up-down counter. The status counter 22 counts up when writing to the status register group 3 is completed, and counts down when reading is completed, thereby counting the number of data in the status register group 3 to output its count value output signal 30.

Next, a configuration and general operation of a block which controls the writing to the receiving buffer group 2, status register group 3, transmission error register 4, receiving error register group 5d, source address register group 6d and response RSP register 7 is described.

Reference numeral 23a designates a first control unit which controls data input and output to the buffer memory block 9 from the LAN IF block 10 side, and generates the write signal to the receiving buffer group 2, status register group 3, transmission error register 4, receiving error register group 5d, source address register group 6d and response RSP register 7, by the receiving write address signal 14, receiving write signal 16 and further, by the receiving write data signal 15. A specific configuration of the first control unit 23a is shown in a block diagram of FIG. 21.

The first control unit 23a is constituted by an address decoder 68, a first control circuit 70, a second control circuit 71, a third control circuit 72, AND gates 35a, 44a and overrun detecting circuit 69.

The address decoder 68 decodes the receiving write address signal 14 given from the LAN IF block 10, and outputs as a write address signal 68a to the receiving buffer group 2, a write address signal 68b to the transmission error register 4, a write address signal 68c to the receiving error register group 5d, a write address signal 68d to the source address register group 6d and a write address signal 68e to the response RSP register 7.

The first control circuit 70 generates a write signal (hereinafter, referred to as a receiving buffer write signal) 27 to the receiving buffer group 2, according to the write address signal 68a and the receiving write signal 16 to the receiving buffer group 2. The receiving buffer write signal 27 is not generated in the case where the count value of the data counter 21 is "2", or the case showing a state where data are written into either of the receiving buffers 2a, 2b and are not read out (hereinafter, this state is referred to as a receiving bufferful state). And hence, to the first control circuit 70, a signal (hereinafter, referred to as a receiving bufferful flag) 79 which is set at the receiving bufferful state is given from the data counter 21.

The second control circuit 71 generates a write signal (hereinafter referred to as a status write signal) 33 to the status register group 3, according to the write address signal 68c to the receiving error register group 5d, write address signal 68b to the transmission error register 4 and the receiving write signal 16. The status write signal 33 is not generated, in the case where the count value of the status counter 22 is "4", or the case showing a state where data are written into all of the status registers 3a, 3b, 3c and 3d and are not read (hereinafter, this state is referred to as a statusful state). And hence, to the second control circuit 71, a signal (hereinafter, referred to as a statusful flag) 80 which is set at the statusful state is given from the status counter 22.

In the second control circuit 71, signal which informs that the writing to the status register group 3 is completed after generating the status write signal 33, or a status write completion signal 31 is also generated. Meanwhile, this status write completion signal 31 is given to the status counter 22 as its up-count clock.

Reference numeral 35 designates a write signal (hereinafter, referred to as a transmission error write signal) to the transmission error register 4, which is generated by AND-operating the write address signal 68b and the receiving write signal 16 to the transmission error register 4 from the address decoder 68 by the AND gate 35A.

The overrun detecting circuit 69 detects overrun data in the receiving write data signal 15, and generates an overrun detecting flag 81 after the overrun data is stored in the buffer memory.

The third control circuit 72 generates a write signal (hereinafter, referred to as a receiving error write signal) 37 to the receiving error register group 5d, according to the above-mentioned write address signal 68c and the receiving write signal 16 to the receiving error register, and generates a write signal (hereinafter, referred to as a source address write signal) 38 to the source address register group 6d, according to the write address signal 68d and the receiving write signal 16. The write signal 38 is not generated in the case where the above-mentioned overrun detecting flag 81 and the receiving bufferful flag 79 are generated. And hence, to the third control circuit 72, the above-mentioned overrun detecting flag 81 and the receiving bufferful flag 79 are given.

The third control circuit 72 also generates a signal, which informs that, the writing to the receiving error register group 5d and the source address register group 6d is completed after the aforesaid receiving error write signal 37 is generated, or a receiving error write completion signal 39.

Moreover, the third control circuit 72 also generates the receiving buffer write finish signal 25 after the receiving error write signal 37 is generated, but the receiving buffer write completion signal 25 is not generated when the above-mentioned receiving bufferful flag 79 is generated. The above-mentioned receiving buffer write completion signal 25 is given to the data counter 21 as its up-count clock.

Reference numeral 44 designates a write signal (hereinafter, referred to as a response RSP write signal) to the response RSP register 7, which is generated by AND-operating the write address signal 68e and the receiving write signal 16 to the response RSP register 7 by the AND gate 44A.

Reference numeral 26 of FIG. 19 designates a receiving buffer write pointer (hereinafter, referred to as a receiving buffer WR pointer), into which a receiving buffer write signal 27 and a receiving buffer write completion signal 25 generated by the first control unit 23a are inputted. The receiving buffer WR pointer 26 has a function as a receiving buffer group write signal switching control block, which switches the receiving buffer write signal 27 into a write signal 28 (hereinafter, referred to as a first receiving buffer write signal) to the first receiving buffer 2a and a write signal 29 (hereinafter, referred to as a second receiving buffer write signal) to the second receiving buffer 2b by the receiving buffer write completion signal 25.

Reference numeral 32 of FIG. 19 designates a status WR pointer into which a status write completion signal 31 and a status write signal 33 generated by the first control unit 23a are inputted. The status WR pointer 32 has a function as a status register group write signal switching control block, which switches the status write signal 33 into a write signal (hereinafter, referred to as a first status write signal) 34a to the first status register 3a, a write signal (hereinafter, referred to as a second status write signal) 34b to the second status register 3b, a write signal (hereinafter, referred to as a third status write signal) 34c to the third status register 3c and a write signal (hereinafter, referred to as a fourth status write signal) 34d to the fourth status register 3d, by the status write completion signal 31.

Reference numeral 36 of FIG. 20 designates a receiving error WR pointer into which a receiving error write completion signal 39, a receiving error write signal 37 and a source address write signal 38 generated by the first control unit 23a are inputted. The receiving error WR pointer 36 has two functions as a receiving error register group address switching control block and a source address register group write address switching control block, which respectively switch the receiving error write signal 37 into a write signal (hereinafter, referred to as a first receiving error write signal) 40a to the first receiving error register 3a, a write signal (hereinafter, referred to as a second receiving error write signal) 40b to the second receiving error register 5b and a write signal (hereinafter, referred to as a third receiving error write signal) 40c to the third receiving error register 5c by the receiving error write completion signal 39, and switch the source address write signal 38 into a write signal (hereinafter, referred to as a first source address write signal) 41a to the first source address register 6a and a write signal (hereinafter, referred to as a second source address write signal) 41b to the second source address register 6b and a write signal (hereinafter, referred to as a third source address write signal) 41c to the third source address register 6c, by the receiving error write completion signal 39.

Next, the configuration and general operation of the blocks, which performs writing control to the transmission buffer 1 and reading control from the receiving buffer group 2, status register group 3, transmission error register 4, receiving error register group 5d, source address register group 6d and response RSP register 7 are described.

Reference numeral 23b designates the second control unit which controls data input and output to the buffer memory block 9 from the microcomputer IF block 11 side, and generates the write signal to the transmission buffer 1 and the read signals from the receiving buffer group 2, status register group 3, transmission error register 4, receiving error register group 5d, source address register group 6d and response RSP register 7, by the address signal 17 and the write signal 19 from the microcomputer IF block 11 and read data (hereinafter, referred to as status read data) 55 from the status register group 3.

Figure 22:
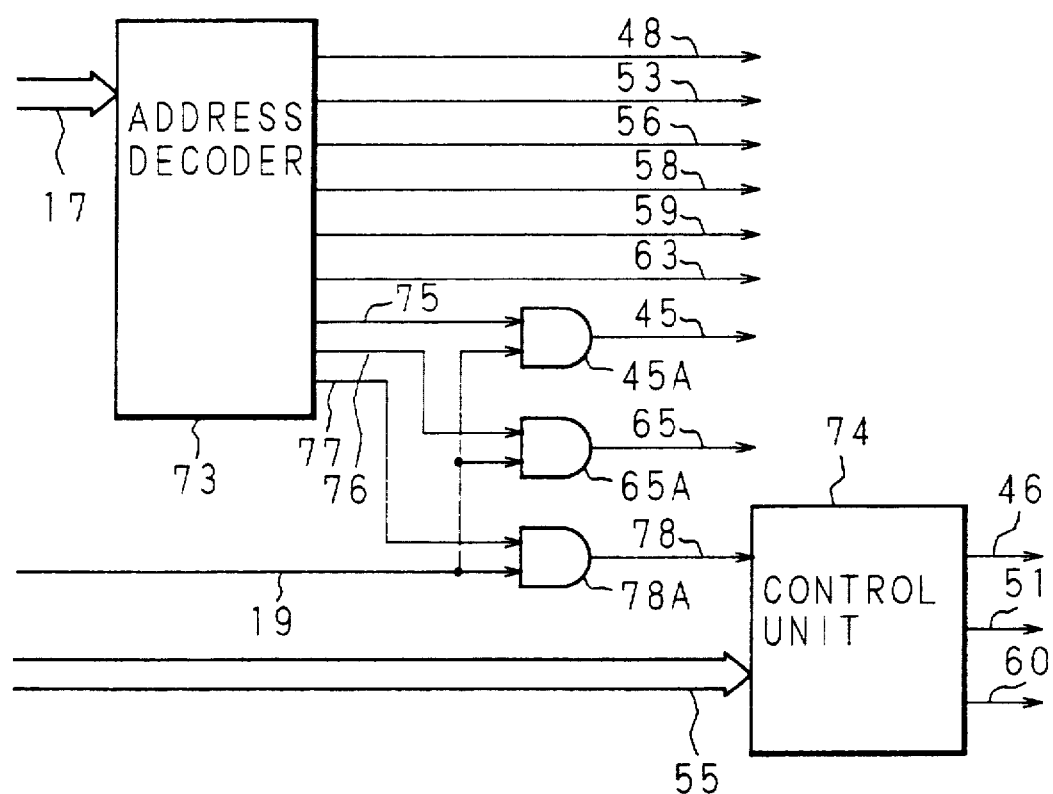
FIG. 22 is a block diagram showing a specific configuration of a second control unit.

A specific configuration of the second control unit 23b is shown in a block diagram of FIG. 22.

The second control unit 23b is constituted by an address decoder 73, a control circuit 74, AND gates 45A, 65A, 78A and so on.

The address decoder 73 decodes the address signal 17 given from the microcomputer IF block 11 to output as a read address signal 48 of the receiving buffer group 2, a read address signal 53 of the status register group 3, a read address signal 56 of the transmission error register 4, a read address signal 58 of the receiving error register group 5d, a read address signal 59 of the source address register group 6d and a read address signal 63 of the response RSP register 7.

Reference numeral 45 designates a write signal to the transmission buffer 1, which is generated by AND-operating a write address signal 75 which is outputted from the address decoder 73 to the transmission buffer 1 and the write signal 19 outputted from the microcomputer IF block 11 by the AND gate 45A.

In this buffer memory, a TX register writing completion register 64 which detects the completion of writing to the transmission buffer 1 is included. The TX register writing completion register 64 stores the completion of writing to the transmission buffer 1 by receiving a TX register write completion signal 65 to be described later, and outputs a transmission bufferful flag 66 to the LAN IF block 10.

When the transmission bufferful flag 66 is inputted, the LAN IF block 10 monitors the state of LAN transmission line, and by outputting the transmission read address signal 12 for reading data strings in the transmission buffer 1 at a certain timing, reads out the data strings in the transmission buffer 1 in order.

The TX register write completion signal 65 given to the TX register writing completion register 64 generates the write signal to the TX register writing completion register 64, or the TX register write completion signal 65, by AND-operating a write address signal 76 outputted from the address decoder 73 and the write signal 19 outputted from the microcomputer IF block 11 by the AND gate 65A.

In the buffer memory, an RX register reading completion register 67 (refer to FIG. 9, not shown in FIG. 18) which stores, the completion of reading from the receiving buffer group 2, status register group 3, transmission error register 4, receiving error register group 5d, source address register group 6d and response RSP register 7 is included, and a write signal (hereinafter, referred to as an RX register read completion signal) 78 to the RX register reading completion register 67 is generated by AND-operating a write address signal 77 which is outputted from the address decoder 73 to the RX register reading completion register 67 and the write signal 19 from the microcomputer IF block 11 by an AND gate 78A.

A control circuit 74 generates, according to the content of the data signal 55 of the status registers inputted from the status register group 3, in the case where the RX register read completion signal 78 is inputted, a receiving buffer read completion signal 46 which shows that reading of the receiving buffer is completed, a status read completion signal 51 which shows that reading of the status registers is completed and a receiving error read completion signal 60 which shows that reading of the receiving error register and source address register is completed.

The receiving buffer read completion signal 46 is given to the data counter 21 as its down-clock, and the status read completion signal 51 is given to the status counter 22 as its down-clock.

In FIG. 19, reference numeral 47 designates a receiving buffer read pointer (hereinafter, referred to as a receiving buffer RD pointer) into which the receiving buffer read completion signal 46 and the read address signal 48 to the receiving buffer group 2, which are generated from the second control unit 23b are inputted. The receiving buffer RD pointer 47 has a function as a receiving buffer group read address switching control block, which switches the read address signal 48 to the receiving buffer group 2 into a read address signal 49 (hereinafter, referred to as a first receiving buffer read address signal) to the first receiving buffer 2a, and a read address signal 50 (hereinafter, referred to as a second receiving buffer read address signal) to the second receiving buffer 2b, by the receiving buffer read completion signal 46.

Reference numeral 52 designates a status RD pointer, into which a read address signal 53 of the status registers and a status read completion signal 51, which are generated by the second control unit 23b are inputted. The status RD pointer 52 has a function as a status register group read address switching control block, which switches the read address signal 53 of the status registers into a read address (hereinafter, referred to as a first status read address signal) 54a to the first status register 3a, a read address signal (hereinafter, referred to as a second status read address signal) 54b to the second status register 3b, a read address signal (hereinafter, referred to as a third status read address signal) 54c to the third status register 3c and a read address signal (hereinafter, referred to as a fourth status read address signal) 54d to the fourth status register 3d, by the status read completion signal 51.

Referred numeral 57 designates a receiving error RD pointer into which a receiving error read completion signal 60, a receiving error read address signal 58 and a source address read address signal 59 which are generated by the second control unit 23b are inputted. The receiving error RD pointer 57 has functions as a receiving error register group read address switching control block and a source address register group read address switching control block, which respectively switch the receiving error read address signal 58 into a read address signal (hereinafter, referred to as a first receiving error read address signal) 61a to the first receiving error register 5a, a read address signal (hereinafter, referred to as a second receiving error read address signal) 61b to the second receiving error register 5b, and a read address signal (hereinafter, referred to as a third receiving error read address signal) 61c to the third receiving error register 5c by a receiving error read completion signal 60, and the source address read address signal 59 into a read address signal (hereinafter, referred to as a first source address read address signal) 62a to the first source address register 6a, a read address signal (hereinafter, referred to as a second source address read address signal) 62b to the second source address register 6b and a write address signal (hereinafter, referred to as a third source address read address signal) 62 to the third source address register 6c, by the receiving error read completion signal 60.

In FIG. 20, reference numeral 980 designates an OR gate, into which an output signal 85 of a status managing unit 82 and an output signal 89 of a data number managing unit 86 to be described later are inputted, and from which the OR of two input signals is outputted as a reset signal 98 of the overall buffer memories.

Next, the operation of storing data of identical attribute by a specific buffer and register in the buffer memory consisting of a plurality of buffers and registers, by a buffer memory control system having control means comprising the aforementioned configuration, is described specifically for some communication examples with reference to the drawings.

Figure 23:
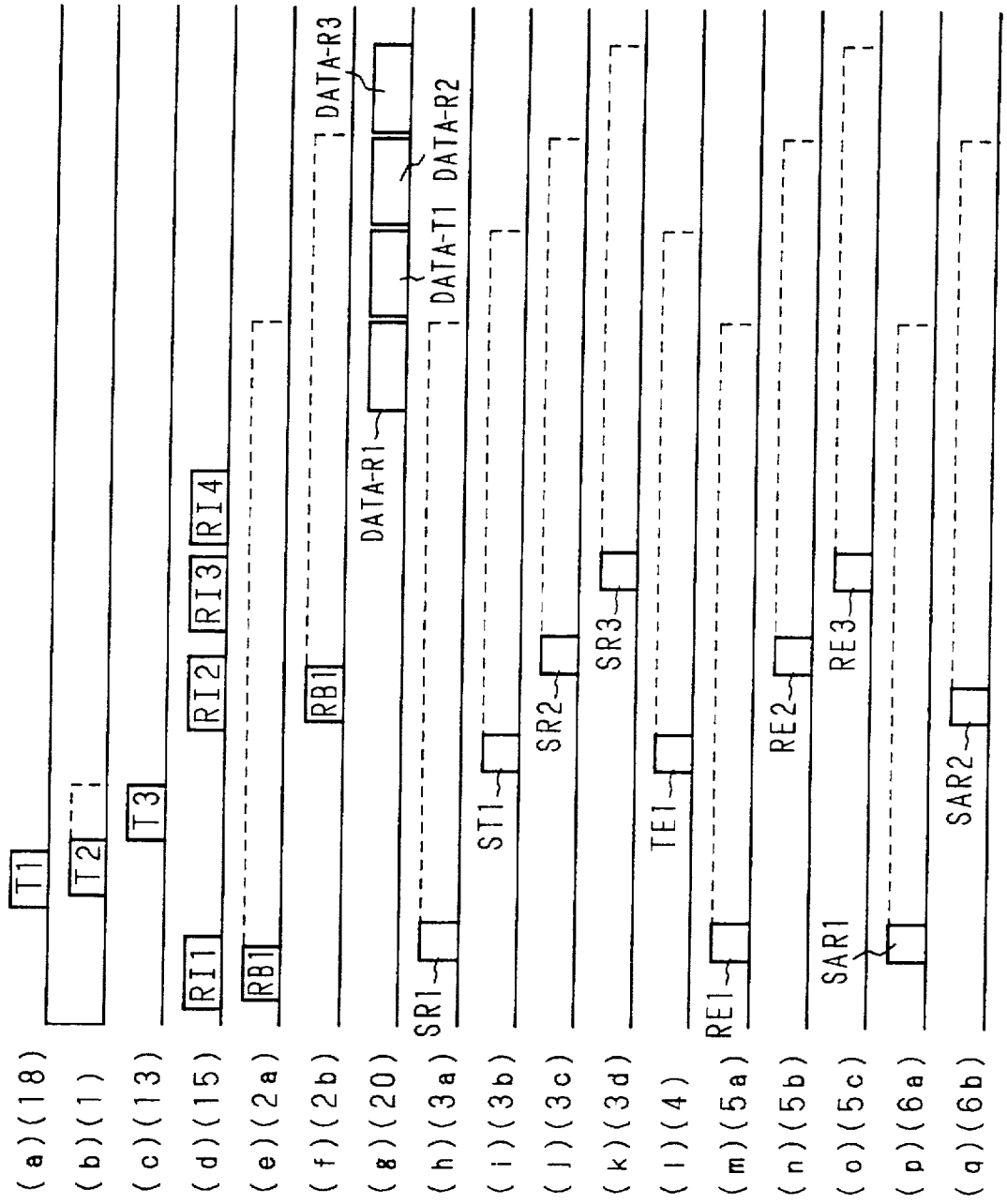
FIG. 23 is a timing chart showing data flows in the buffer memory, and data stored in the buffers and registers in the buffer memory in a time series, at communication by a communication apparatus of the present invention.
Figure 24:
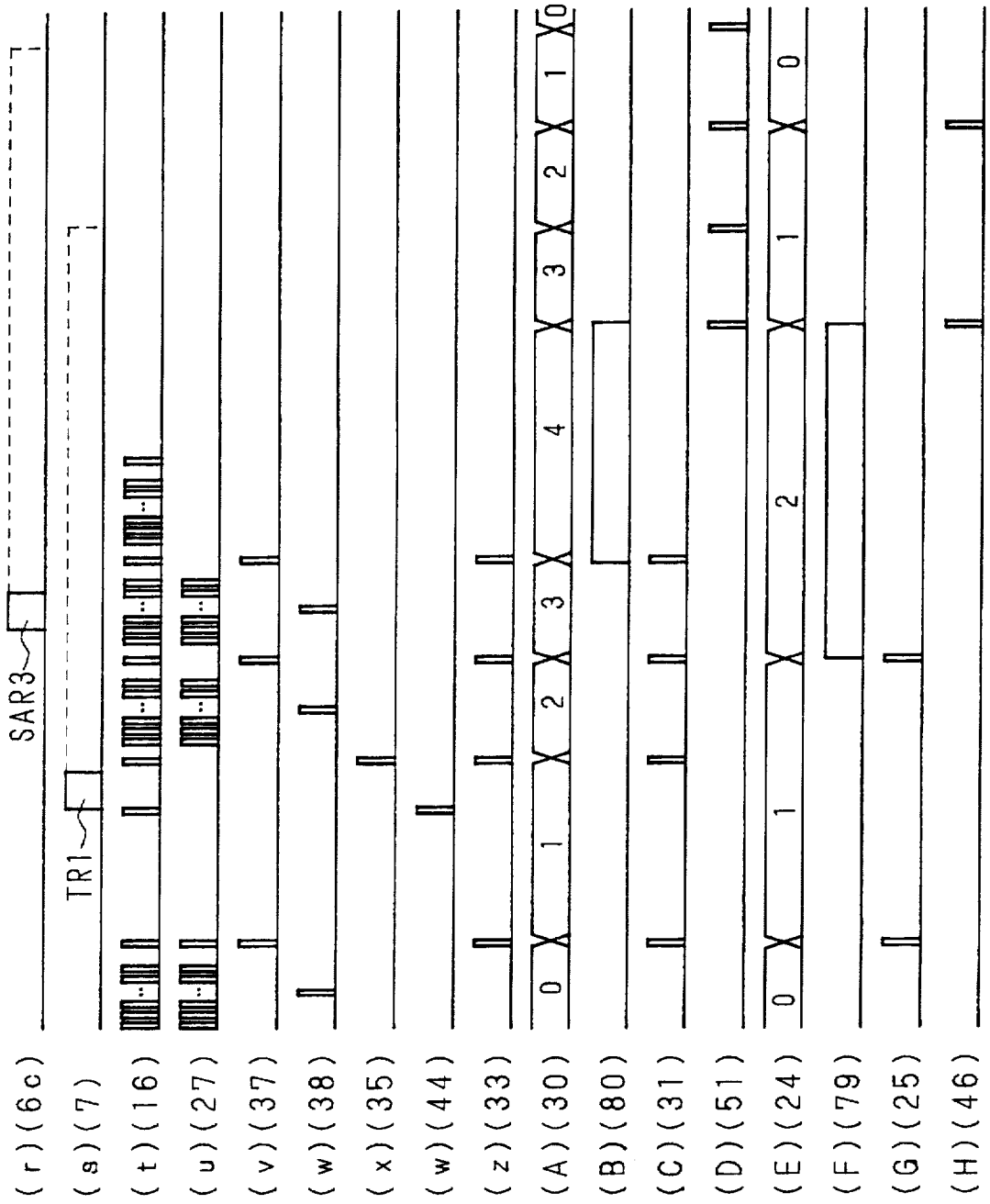
FIG. 24 is a timing chart showing data flows in the buffer memory, and data stored in the buffers and registers in the buffer memory in a time series, at communication by a communication apparatus of the present invention.
Figure 25:
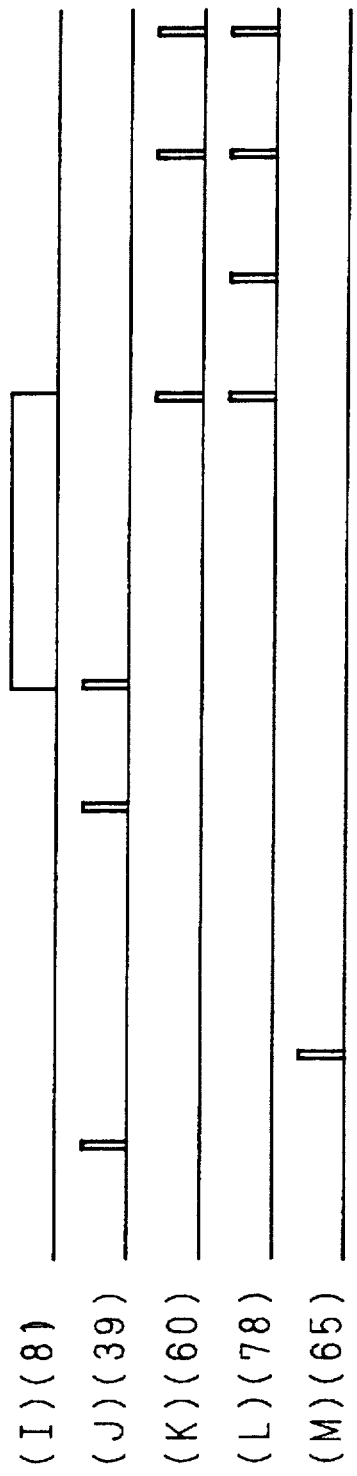
FIG. 25 is a timing chart showing data flows in the buffer memory, and data stored in the buffers and registers in the buffer memory in a time series, at communication by a communication apparatus of the present invention.
Figure 26:
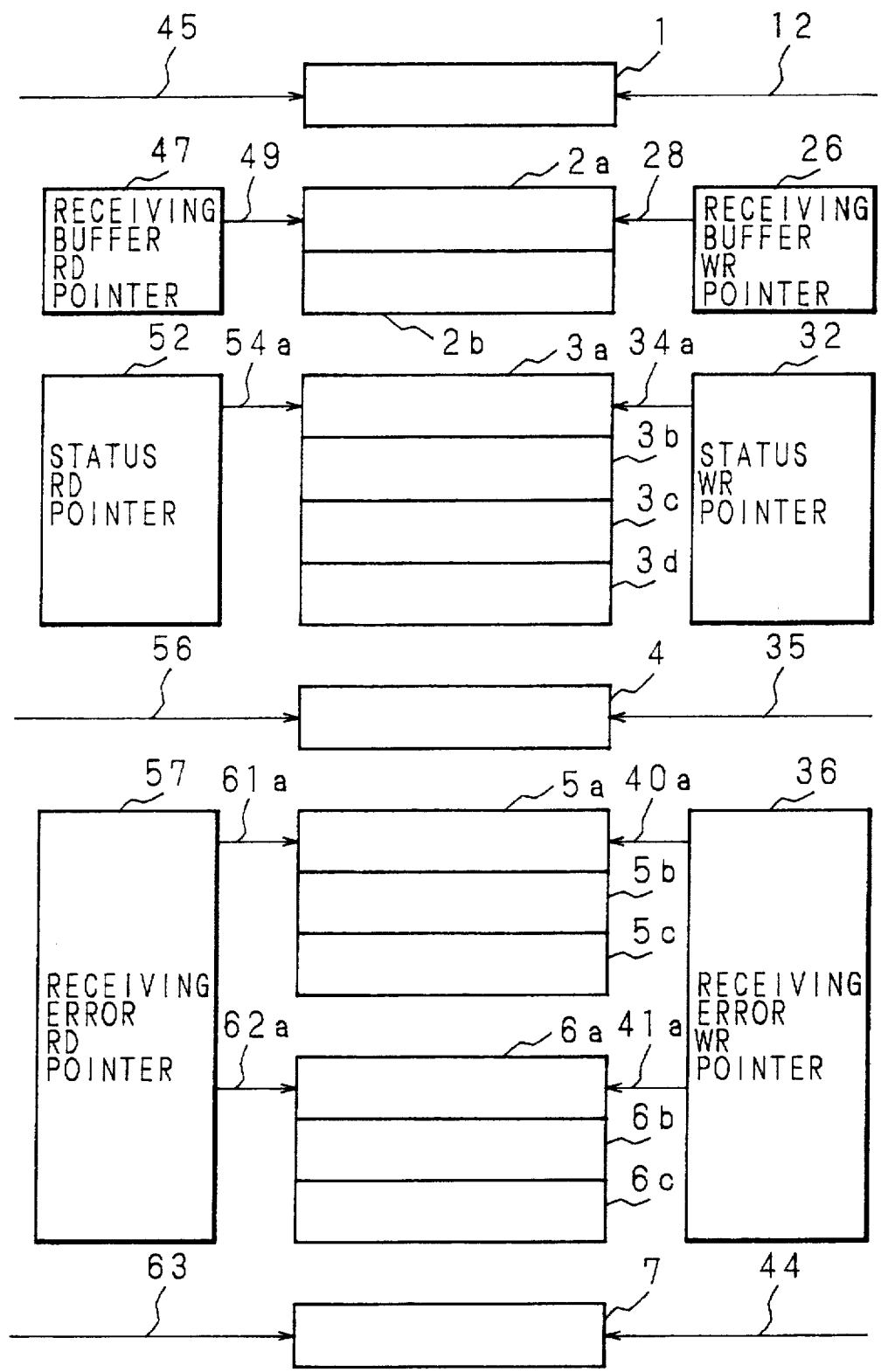
FIG. 26 is a schematic chart showing a state where respective data strings are stored in the buffers and registers, and the state of WR pointer and an RD pointer showing the writing and reading destinations in communication.

FIG. 23, FIG. 24 and FIG. 25 are timing charts showing the data flow in the buffer memory and data stored in the buffers and registers in the buffer memory in time series, at communication by the communication apparatus of the present invention. In these communication examples, the state of storing the data strings in the buffers and registers, and the state of WR pointer and RD pointer showing the writing destination and reading destination are shown in FIG. 26, FIG. 27, FIG. 28, FIG. 29, FIG. 30, FIG. 31, FIG. 32, FIG. 33 and FIG. 34. FIG. 26 among these figures shows the state of buffer memory in the initial state. The bottom side of FIG. 23 is continued to the top side of FIG. 24, and the bottom side of FIG. 24 is continued to the top side of FIG. 25.

Figure 21:
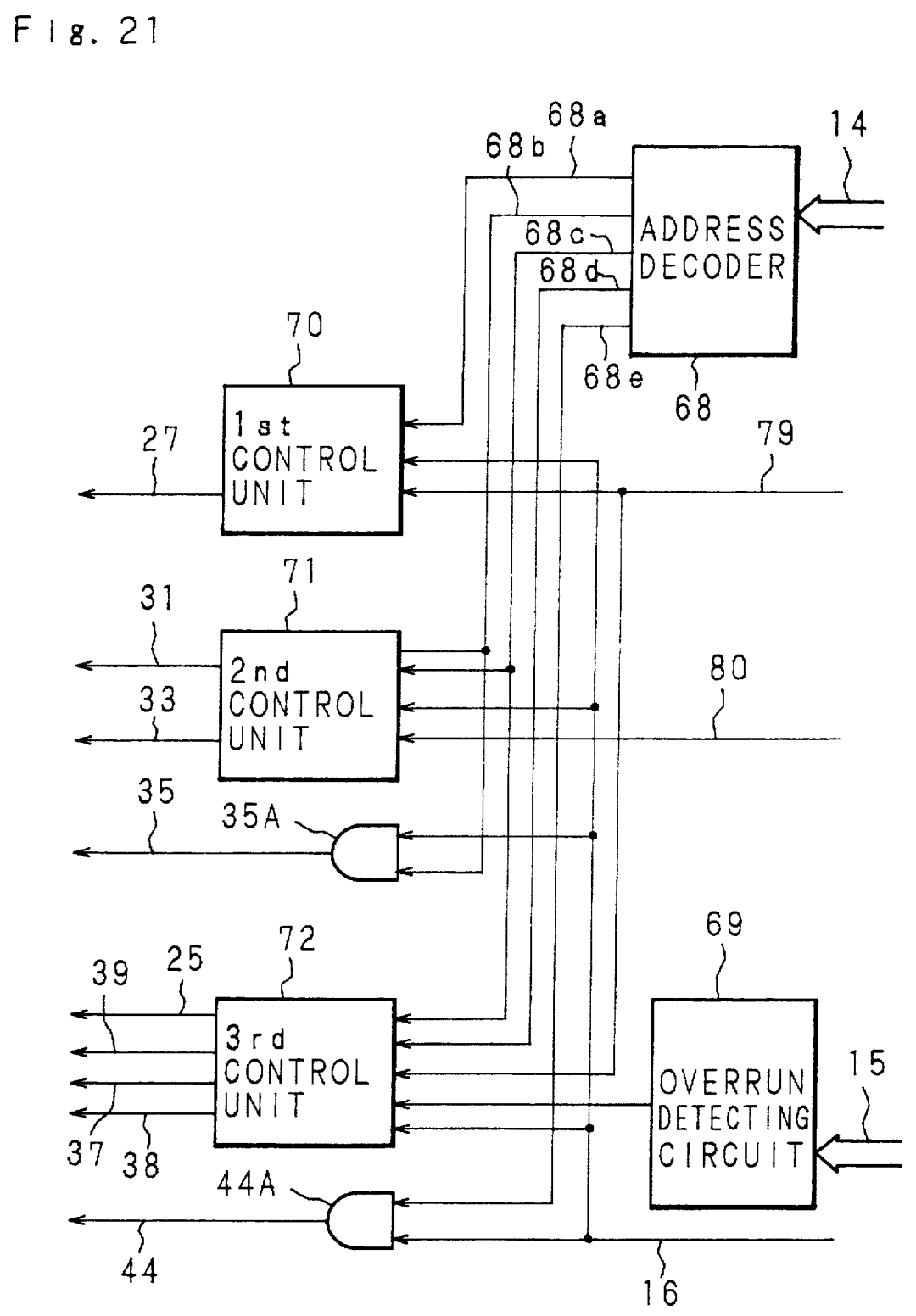

The communication examples shown in the timing charts of FIG. 23, FIG. 21 and FIG. 25 show the states where the receiving write data input signal 15 for one frame is inputted from the LAN IF block 10, the transmission write data input signal 18 and transmission data output signal 13 for one frame are inputted from the microcomputer IF block 11, and further the receiving write data input signal 15 for three frames are inputted, and thereafter, the receiving read data signal 20 of respective frames are outputted in order of inputting.

First, as shown in FIG. 23(d), suppose that a data string RI1 is inputted as the receiving write data signal 15.

A data group RB1 of the receiving frame in the data string RI1 is inputted to the first receiving buffer 2a as shown in FIG. 23(e), only source address data SAR1 is stored in the first source address register 6a as shown in FIG. 23(p), data RE1 showing the receiving state in the data string RI1 is inputted to the first receiving error register 5a as shown in FIG. 23(m), and status data SR1 is written into the first status register 3a as shown in FIG. 23(h) to complete receiving.

By completing receiving of the data string RI1, as shown respectively in FIG. 24(G), FIG. 24(C) and FIG. 25(J), the receiving buffer write completion flag 25, status write completion signal 31 and receiving error write completion signal 39 are outputted. Moreover, the receiving buffer WR pointer 26, status WR pointer 32 and receiving error WR pointer 36 are switched, and as shown in FIG. 24(E) and FIG. 24(A), the count value output signal 24 of the data counter 21 turns into "1" and the count value output signal 30 of the status counter 22 turns into "1".

Figure 27:
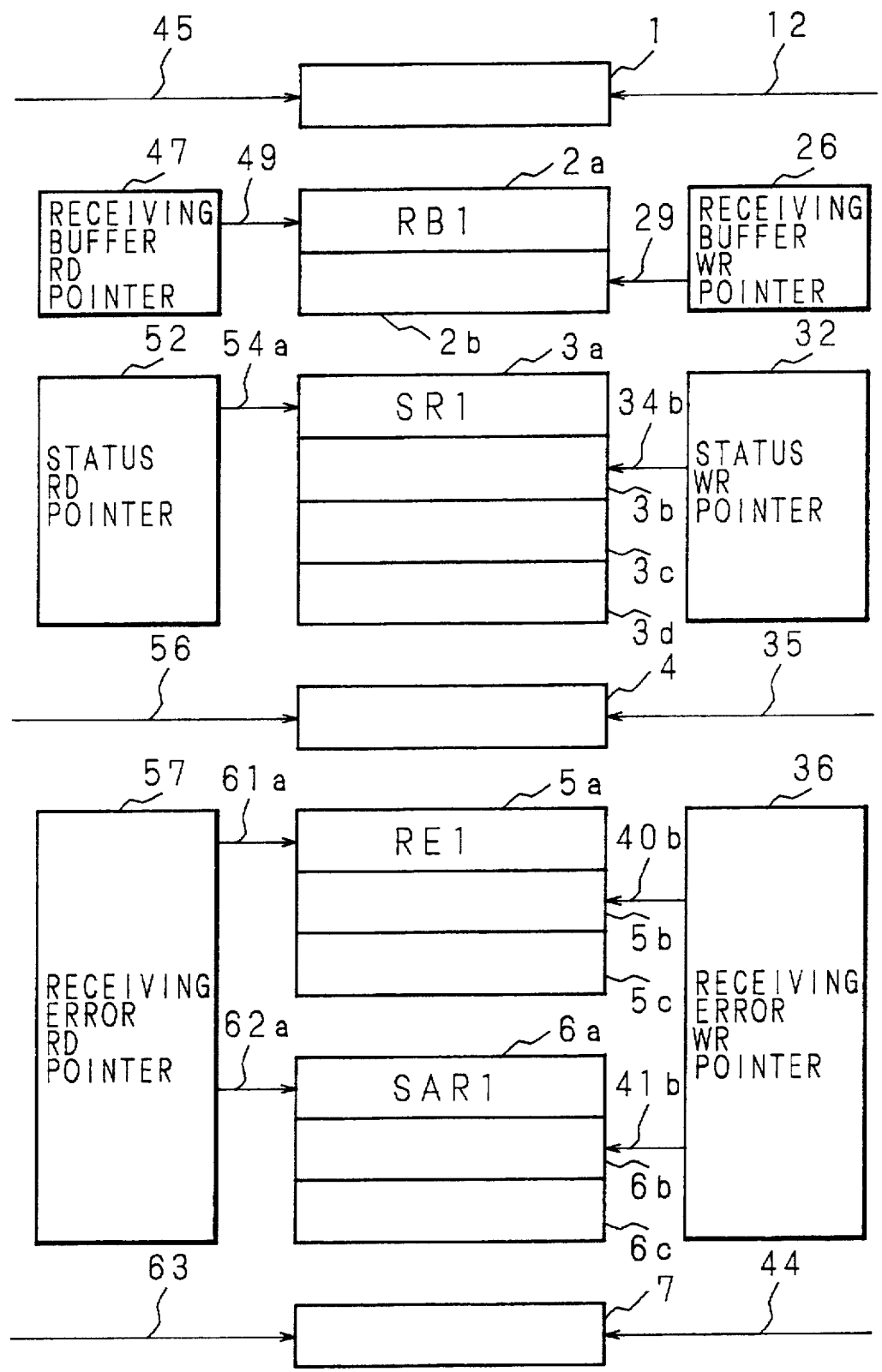
FIG. 27 is a schematic chart showing a state where respective data strings are stored in the buffers and registers, and the state of a WR pointer and an RD pointer showing the writing and reading destination in communication.

The data storing state of the buffer memory at this time point is as shown in FIG. 27.

Next, a data string T1 is inputted as the transmission write data signal 18 as shown in FIG. 23(a), and T1 is stored in the transmission buffer 1 as shown in FIG. 23(b).

The data string T1 is transmitted to the LAN transmission line via the LAN IF block 10 as shown in FIG. 23(c). Thereafter, by the receiving write signal 16 shown in FIG. 24(t), data TE1 showing the transmission state of the data string T1 is written into the transmission error register 4 as shown in FIG. 23(l), RSP data TR1 responded from the communication apparatus which receives the data string T1 is written into the response RSP register 7 as shown in FIG. 24(s), and finally, data ST1 which shows the frame managing state or the transmission completion is written into the second status register 3b as shown in FIG. 23(i) to complete transmission.

By completing transmission of the data string T1, as shown in FIG. 24(C), the status write completion signal 31 is outputted and the status WR pointer 32 is switched, then, as shown in FIG. 24(A), the count value output signal 30 of the status counter 22 turns into "2".

Figure 28:
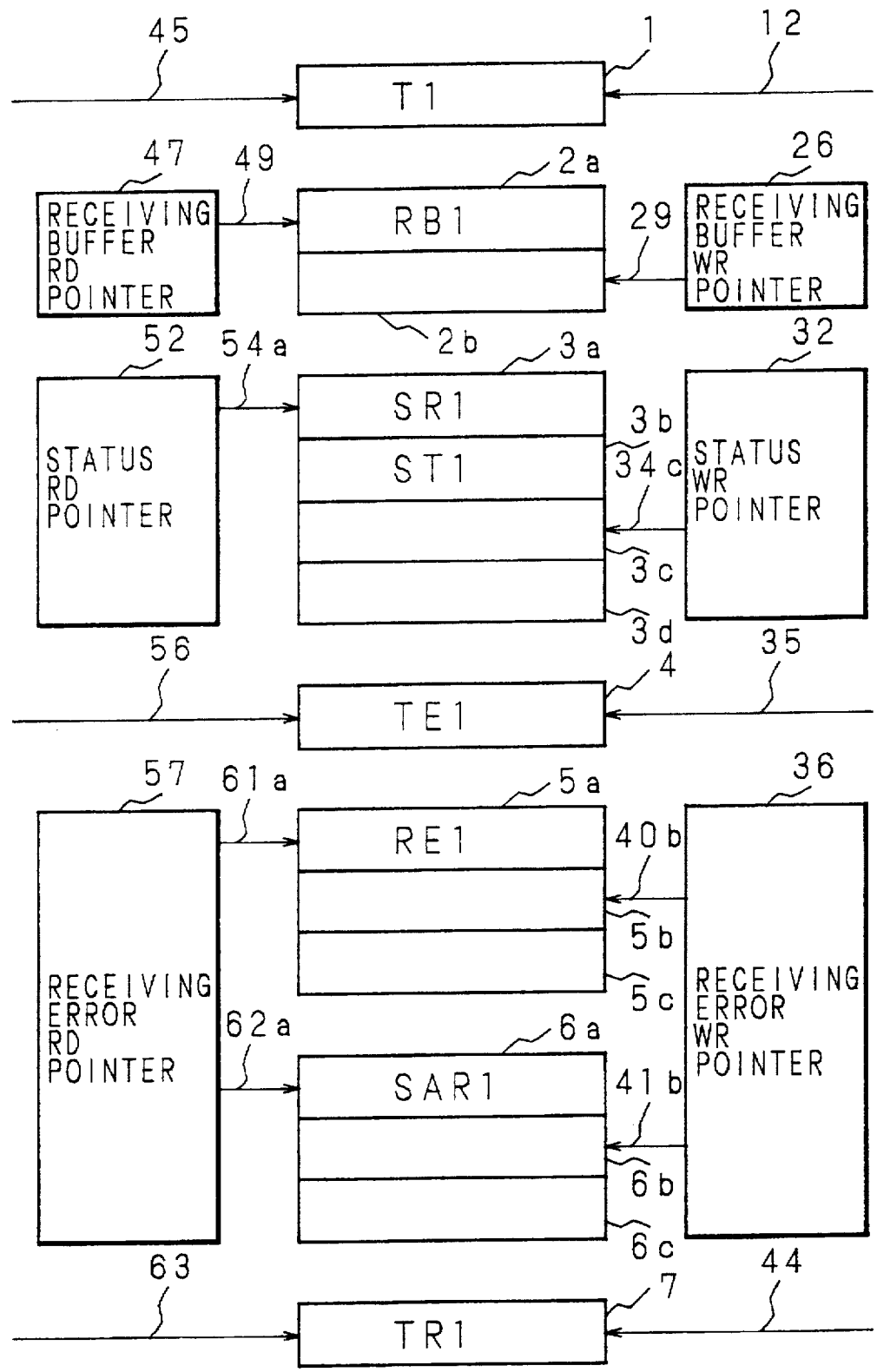
FIG. 28 is a schematic chart showing a state where respective data strings are stored in the buffers and registers, and the state of a WR pointer and an RD pointer showing the writing and reading destinations in communication.

The data storing state of the buffer memory at this time point is as shown in FIG. 28.

Next, as shown in FIG. 23(d), suppose that a data string RI2 is inputted as the receiving write data signal 15.

A data group RB2 of the receiving frame in the data string RI1 is inputted to the second receiving buffer 2b as shown in FIG. 23(f), only source address data SAR2 is inputted to the second source address register 6b as shown in FIG. 23(g), data RE2 showing the receiving state in the data string RI2 is inputted to the second receiving error register 5b as shown in FIG. 23(n), and status data SR2 is inputted to the third status register 3c as shown in FIG. 23(j) to completing receiving.

By completing receiving of the data string RI2, as shown respectively in FIG. 24(G), FIG. 24(C) and FIG. 25(J), the receiving buffer write completion signal 25, status write completion signal 31 and receiving error write completion signal 39 are outputted. Meanwhile, the receiving buffer WR pointer 26, status WR pointer 32 and receiving error WR pointer 36 are switched, and as shown in FIG. 24(E) and FIG. 24(F), the count value output signal 24 of the data counter 21 turns into "2" to raise the receiving bufferful flag 79. Moreover, as shown in FIG. 24(A), the count value output signal 30 of the status counter 22 turns into "3".

Figure 29:
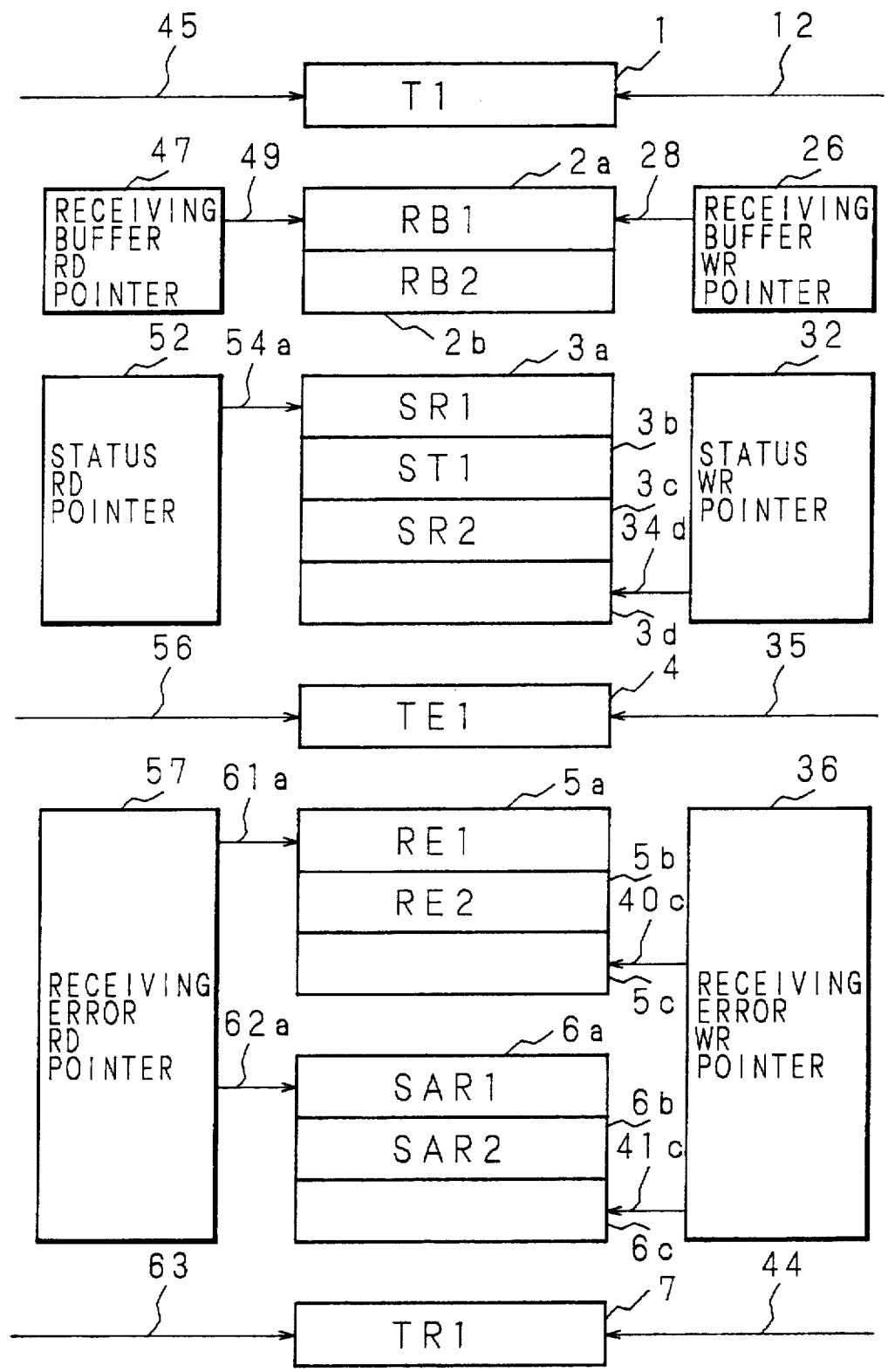
FIG. 29 is a schematic chart showing a state where respective data strings are stored in the buffers and registers, and the state of a WR pointer and an RD pointer showing the writing and reading destinations in communication.

The data storing state of the buffer memory at this time point is as shown in FIG. 29.

Next, as shown in FIG. 23(d), a data string RI3 is inputted as receiving write data.

In this case, in the receiving buffers 2a and 2b of the receiving buffer group 2, data are already stored as shown in FIG. 23(e), and FIG. 23(f) and are not read out. And hence, as shown in FIG. 24(F), the receiving bufferful flag 79 is set and the data string RI3 can not be written into the receiving buffers 20a and 20b. However, as respectively shown in FIG. 24(r), FIG. 23(o) and FIG. 23(k), data SAR3 in the data string RI3 is inputted to the third source address register 6c, data RE3 is inputted to the third receiving error register 5c, and data SR3 is inputted to the fourth status register 3d to completing receiving of the data string RI3.

By completing receiving of the data string RI3, as shown in FIG. 24(C) and FIG. 25(J), the status write completion signal 31 and the receiving error write completion signal 39 are outputted. The status WR pointer 32 and the receiving error WR pointer 36 are switched, and as shown in FIG. 24(E) and FIG. 24(B), the count value output signal 24 of the status counter 24 turns into "4" and a statusful flag 80 is set. Since the receiving bufferful flag 79 is set before inputting the data string RI3 as shown in FIG. 24(F), overrun data showing that the data string RI3 itself is in the overrun state is written into the data string RI3, and an overrun detecting flag 81 is set as shown in FIG. 25(I) at completing the writing of the data string RI3.

Figure 30:
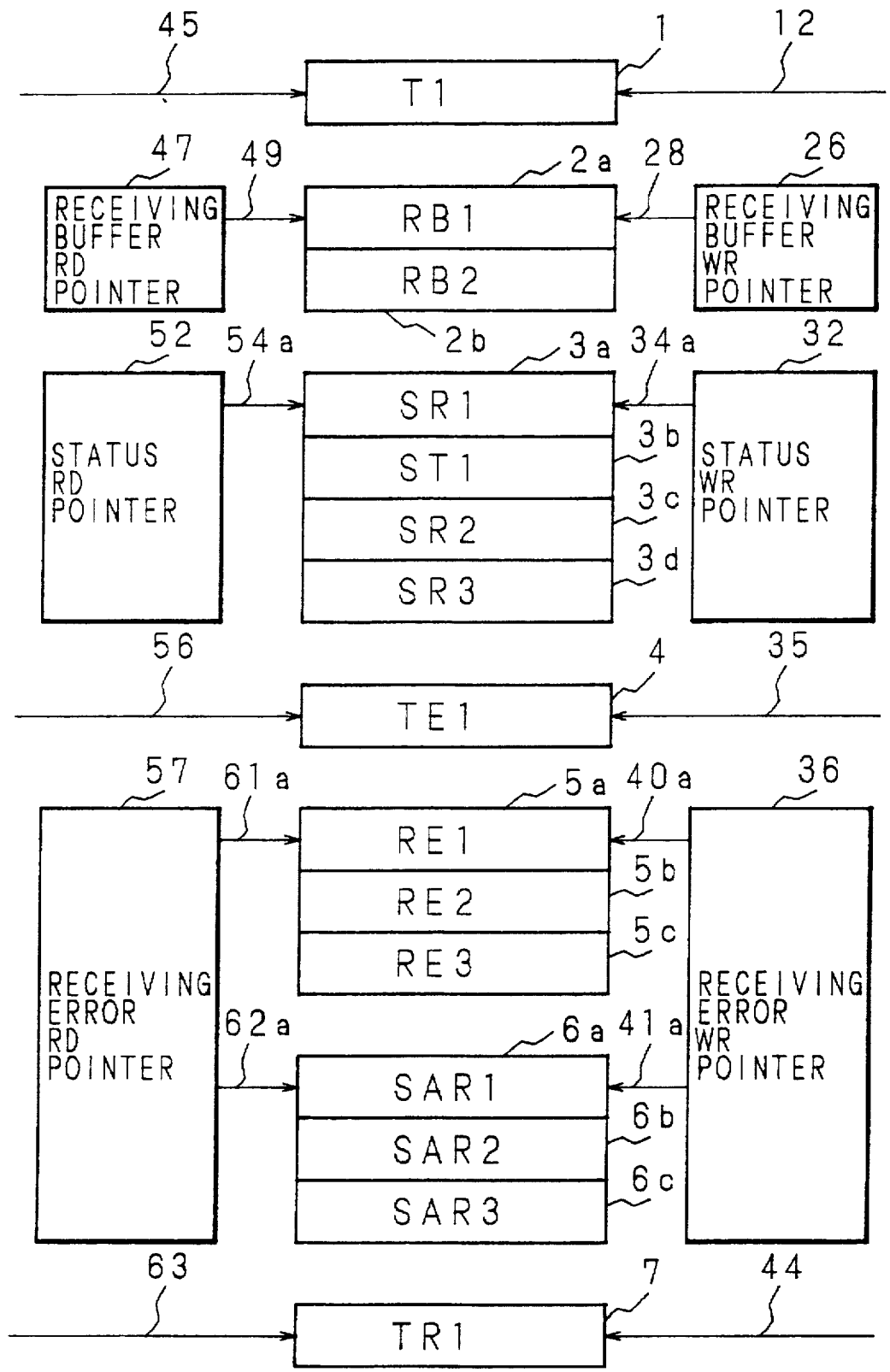
FIG. 30 is a schematic chart showing a state where respective data strings are stored in the buffers and registers, and the state of a WR pointer and an RD pointer showing the writing and reading destinations in communication.

The data storing state of the buffer memory at this time point is as shown in FIG. 30.

Suppose that a data string RI4 is further inputted as the receiving write data as shown in FIG. 23(e) from the state shown in FIG. 30.

In this case, as same as the aforesaid time point when the data string RI3 is inputted, data are already stored in the receiving buffers 2a and 2b of the receiving buffer group 2 and are not read out. And hence, as the receiving bufferful flag 79 is set, the data string RI4 is not written into the receiving buffers 2a and 2b. Meanwhile, since the overrun is detected in the data string RI3 and the overrun detecting flag 81 is set, at the time point when receiving of the data string RI3 is completed, the data string RI4 is written into neither the source register nor the receiving error register, and further as data are stored in all status registers and the statusful flag 80 is set, it is written into neither of the status registers. Thus, receiving of the data string RI4 is not completed and the receiving buffer write completion signal 25, status write completion signal 31 and receiving error write completion signal 39 are not outputted, and the receiving buffer WR pointer 26, status WR pointer 32 and receiving error WR pointer 36 are not switched.

The storing state of data of the buffer memory at this time point is as shown in FIG. 30.

As mentioned above, just by designating the address for the buffer group and register group and without designating the address to the individual buffer and register, for the receiving buffer group 2, status register group 3, receiving error register group 5d and source address register group 6d, which are the buffer group and the register group constituted respectively by a plural number of buffers and registers, the addresses for the individual buffer and register are switched in order and a predetermined data are stored therein, every time the receiving frame is inputted.

Meanwhile, by the write destination which is switched in order at every receiving frame, in the case of communication example shown in timing charts of FIG. 23, FIG. 23 and FIG. 25, data of identical attribute are stored as a set in the first receiving buffer 2a, first receiving error register 5a, first source address register 6a and first status register 3a, data of identical attribute are stored as a set in the transmission buffer 1, transmission error register 4, response RSP register 7 and second status register 3b, data of identical attribute are stored as a set in the second receiving buffer 2b, second receiving error register 5b, second source address register 6b and third status register 3c, and data of identical attribute are stored as a set in the third receiving error register 5c, third source address register 6c and fourth status register 3d. And hence, after making the above-mentioned correspondence between the buffers and registers, the data of identical attribute are always stored therein respectively.

In the case where a new-receiving data group is inputted and data are already stored and not read out from the buffer and register in which the data group is to be stored, thanks to the management as described above, the data are not overwritten and a set of data can always be stored as the data of identical attribute.

Next, suppose that a series of data string DATA-R1 showing the identical attribute as the 1 frame receiving buffer data input 11 is read out to the receiving read data signal 20 as shown in FIG. 23(g).

After reading this series of data string DATA-R1, an RX register read completion flag 78 which is a write signal to the RX register reading completion register 67 showing the completing of the reading is outputted as shown in FIG. 25(L), and it is judged that the data has the identical attribute as the receiving write data R11 by the content of status data in the DATA-R1, and as shown in FIG. 24(H), FIG. 24(D) and FIG. 25(K), the receiving buffer read completion signal 46, status read completion signal 51 and receiving error read completion signal 60 are outputted, and the receiving buffer RD pointer 47, status RD pointer 52 and receiving error RD pointer 57 are switched.

Simultaneously, the count value output signal 24 of the data counter 21 becomes "1" as shown in FIG. 24(E), and the count value output signal 30 of the status counter 22 becomes "3" as shown in FIG. 24(A). As shown respectively in FIG. 24(F) and FIG. 24(B), the receiving bufferful flag 79 and the statusful flag 80 are reset. And hence, it is possible to write into the first receiving buffer 2a, first status register 3a, first receiving error register 5a and first source address register 6a, as shown respectively in FIG. 23(e), FIG. 23(h), FIG. 23(m) and FIG. 23(p).

Figure 31:
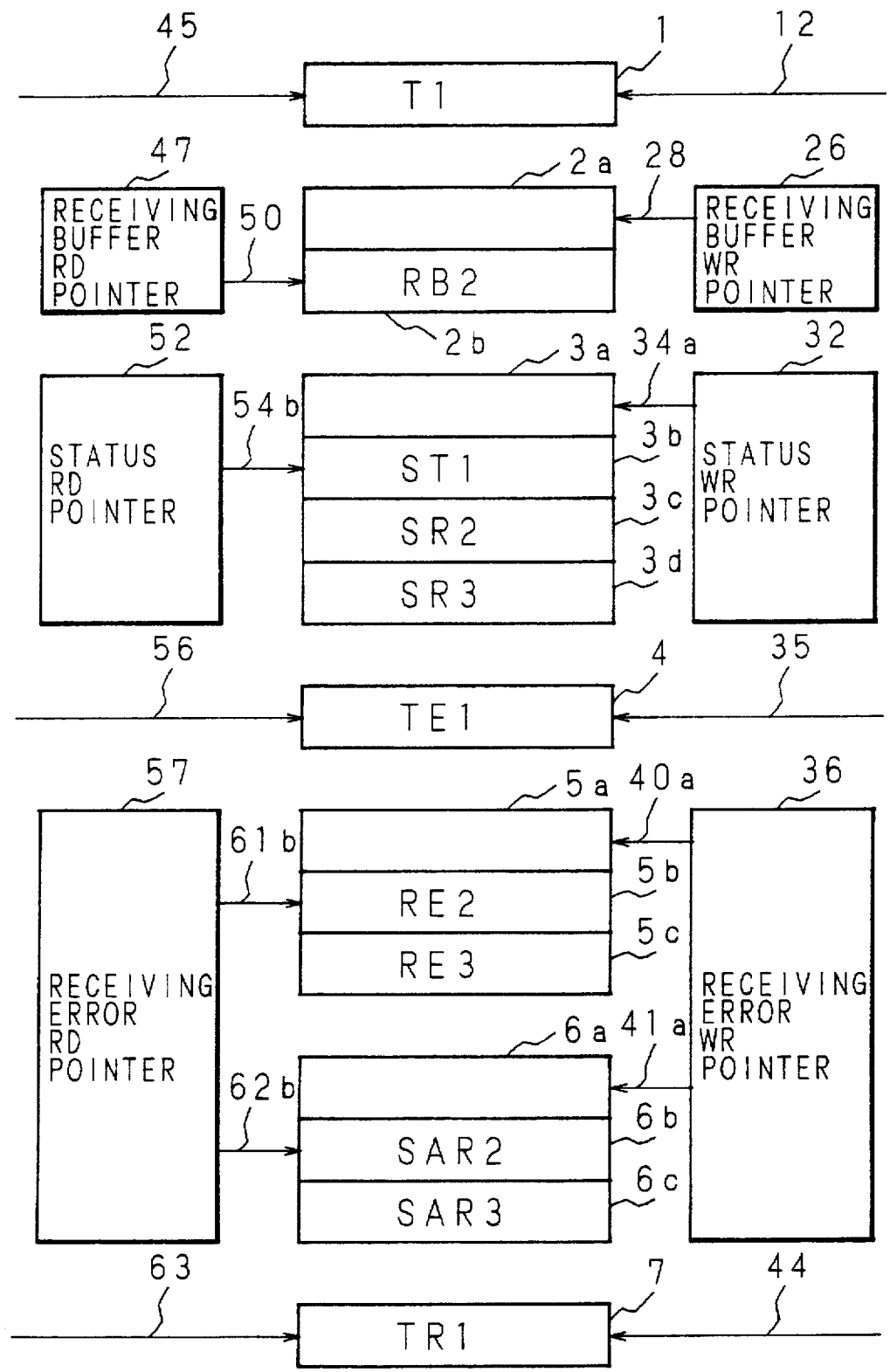
FIG. 31 is a schematic chart showing a state where respective data strings are stored in the buffers and registers, and the state of a WR pointer and an RD pointer showing the writing and reading destination in communication.

The storing state of data of the buffer memory at this time point is as shown in FIG. 31.

Next, suppose that a series of data string DATA-T1 showing the identical attribute as the 1 frame transmission write data input T1 is read out.

After reading this data string DATA-T1, the RX register read completion flag 78 is outputted as shown in FIG. 25(L), and it is judged that the data shows the identical attribute as the transmission write data T1 by the content of the DATA-T1, and only the status read completion signal 51 is outputted as shown in FIG. 24(D). Then, the status RD pointer 35 is switched and it is possible to write into the second status register 3b as shown in FIG. 23(i). Simultaneously, the count value output signal 30 of the status counter 22 becomes "2" as shown in FIG. 24(A).

Figure 32:
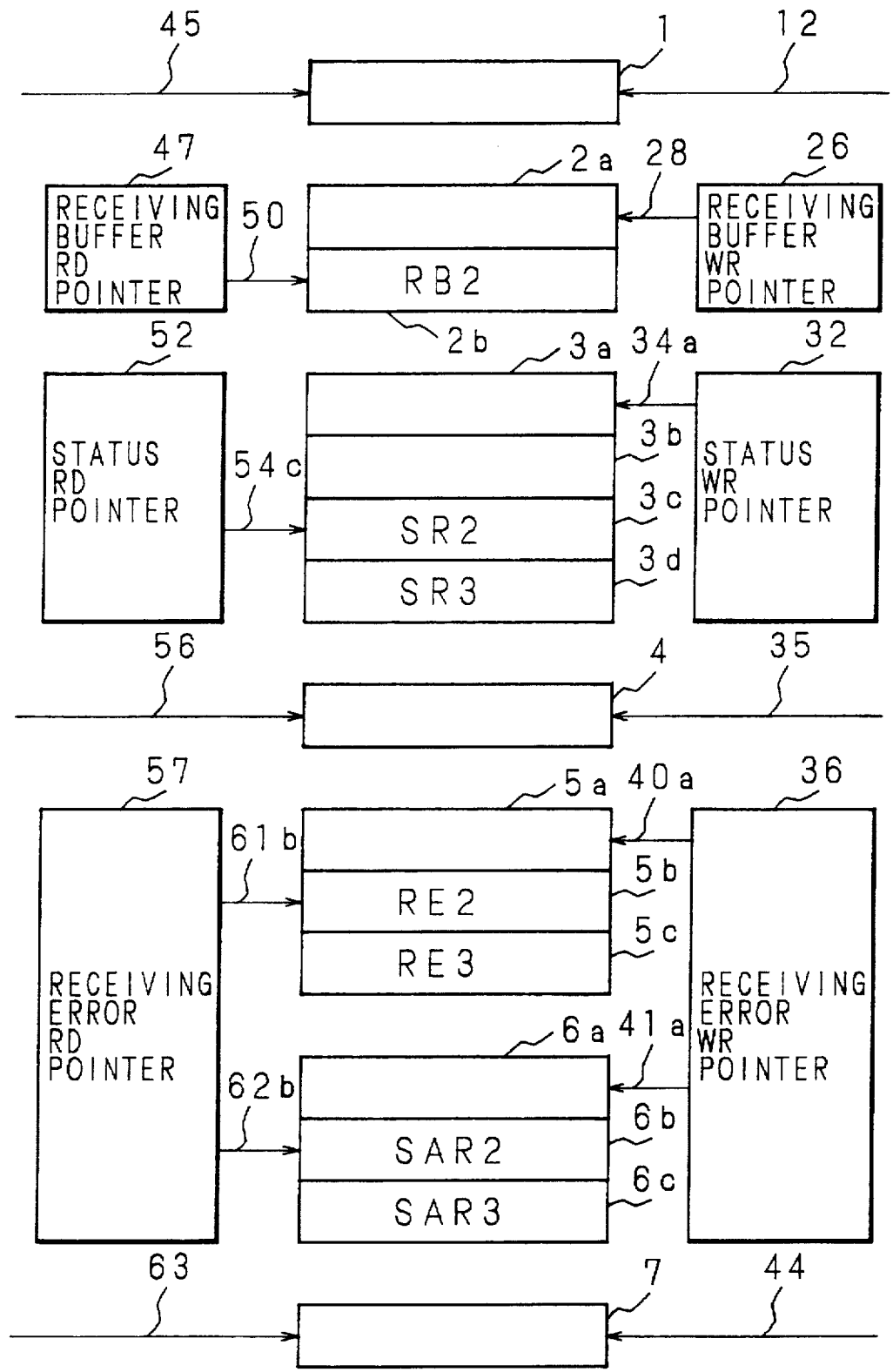
FIG. 32 is a schematic chart showing a state where respective data strings are stored in the buffers and registers, and the state of a WR pointer and an RD pointer showing the writing and reading destination in communication.

The storing status of data of the buffer memory at this time point is as shown in FIG. 32.

Next, suppose that a series of data string DATA-R2 showing the identical attribute as the 1 frame receiving buffer data input R12 is read out to the receiving read data signal 20 as shown in FIG. 23(g).

After reading the the data string DATA-R2, the RX register read completion flag 78 is outputted as shown in FIG. 25(L), and it is judged that the data shows the identical attribute as the receiving write data RI2 by the content of the DATA-R2, thereby, as respectively shown in FIG. 24(H), FIG. 24(D) and FIG. 25(K), the receiving buffer read completion signal 46, status read completion signal 51 and receiving error read completion signal 60 are outputted. Then, the receiving buffer RD pointer 47, status RD pointer 52 and receiving error RD pointer 57 are switched, and as respectively shown in FIG. 23(f), FIG. 23(j), FIG. 23(n) and FIG. 23(q), it is possible to write into the second receiving buffer 2b, third status register 3c, second receiving error register 5b and second source address register 6b. Simultaneously, the count value output signal 24 of the data counter 21 becomes "0" as shown in FIG. 24(E), and the count value output signal 30 of the status counter 22 becomes "1" as shown in FIG. 24(A).

Figure 33:
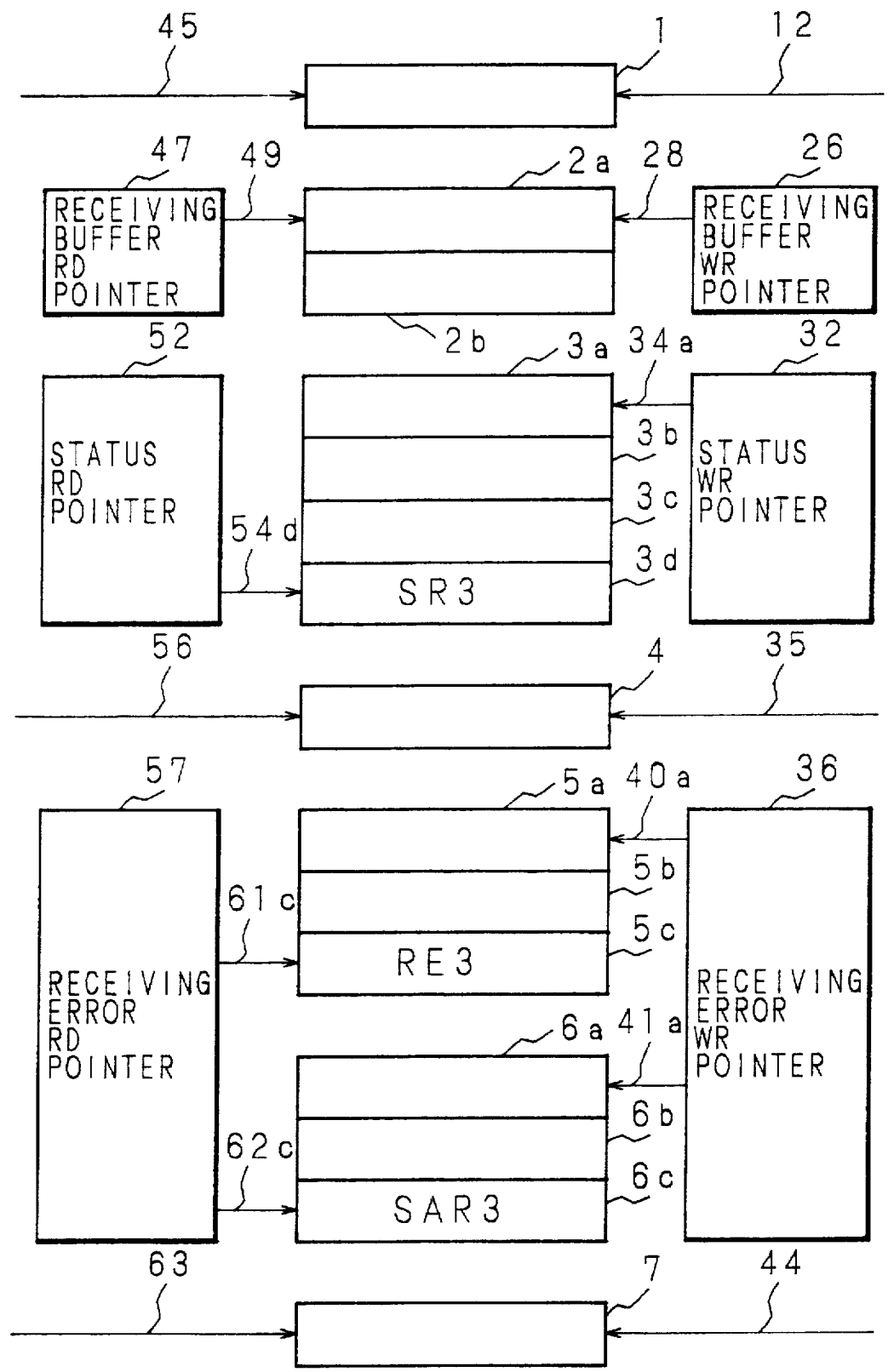
FIG. 33 is a schematic chart showing a state where respective data strings are stored in the buffers and registers, and the state of a WR pointer and an RD pointer showing the writing and reading destinations in communication.

The storing state of data of the buffer memory at this time point is as shown in FIG. 33.

Meanwhile, as shown in FIG. 23(g), a series of data string DATA-R3 showing the identical attribute as the 1 frame receiving buffer data input R1 is read out to the receiving read data signal 20 as same as mentioned above.

After outputting the data string DATA-R3, the RX register read completion flag 78 is set as shown in FIG. 25(M), and it is judged that the data shows the identical attribute as the receiving write data RI3 by the content of DATA-R3. Meanwhile, since there is data showing that it was overrun in data of the data string RI3, as shown in FIG. 24(D) and FIG. 25(K), only the status read completion signal 51 and the receiving error read completion signal 60 are outputted. Then, the status RD pointer 52 and the receiving error RD pointer 57 are switched, and as respectively shown in FIG. 23(k), FIG. 23(o) and FIG. 24(r), it is possible to write into the fourth status register 3d, third receiving error register 5c and third source address register 6c. Simultaneously, the count value output signal 30 of the status counter 22 becomes "0" as shown in FIG. 24(A).

Figure 34:
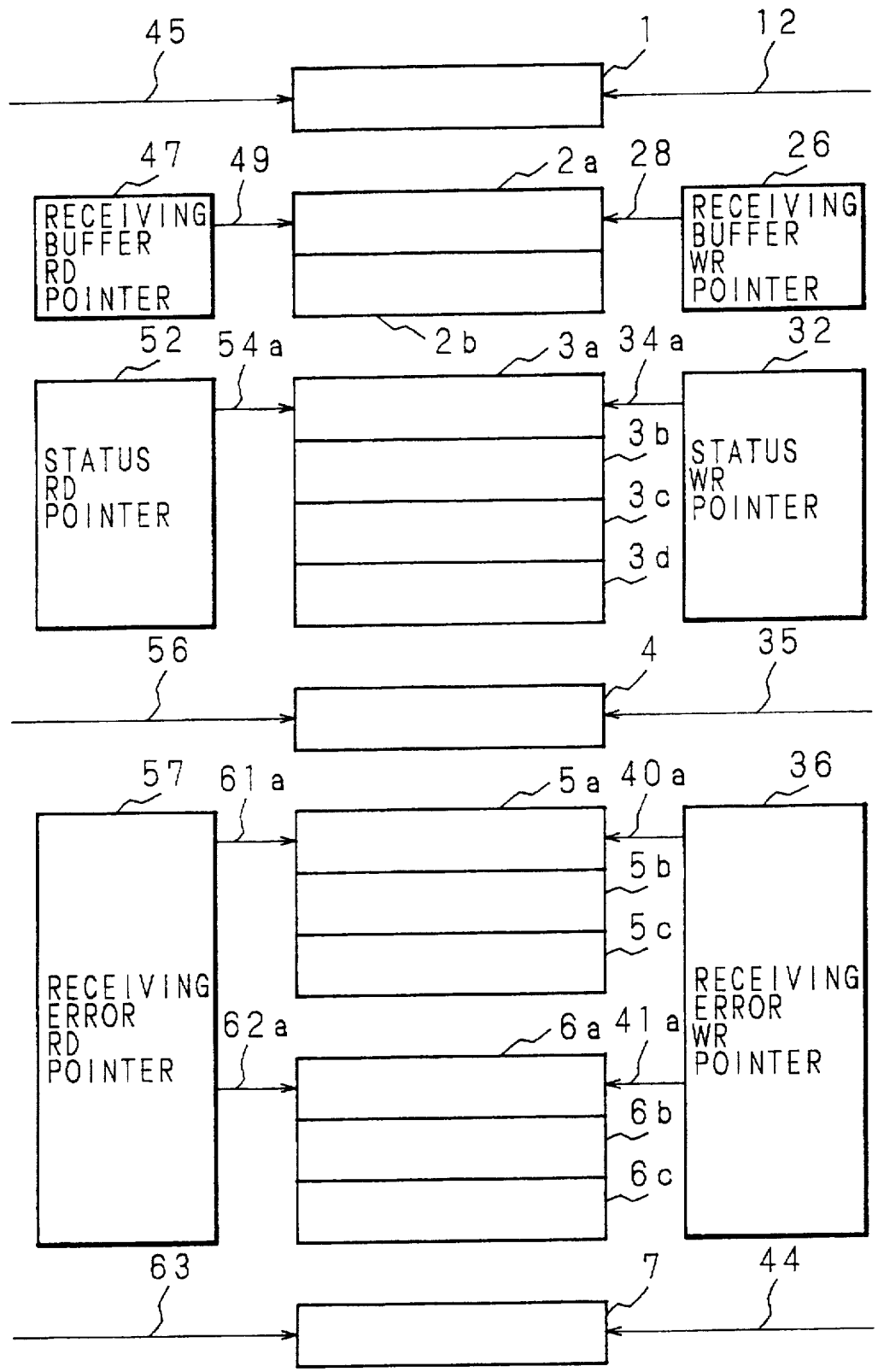
FIG. 34 is a schematic chart showing a state where respective data strings are stored in the buffers and registers, and the state of a WR pointer and an RD pointer showing the writing and reading destination in communication.

The storing state of data of the buffer memory at this time point is as shown in FIG. 34.

As mentioned above, just by designating the address for the buffer group and register group and without designating the address to the individual buffer and register, for the receiving buffer group 2, status register group 3, receiving error register group 5d and source address register group 6d, which are the buffer group and the register group constituted respectively by a plural number of buffers and registers, the addresses for the individual buffer and register are switched at every frame.

Meanwhile, since the read destination is switched at every frame, in the case of the communication example shown in the timing charts of FIG. 23, FIG. 24 and FIG. 25, data are read out in a set as the identical attribute data from the first receiving buffer 2a, first receiving error register 5a, first source address register 6a and first status register 3a, data are read out in a set as the identical attribute data from the transmission buffer 1, transmission error register 4, response RSP register 7 and second status register 3b, data are read out in a set as the identical attribute data from the second receiving buffer 2b, second receiving error register 5b, second source address register 6b and third status register 3c, and data are read out in a set as the identical attribute data from the third receiving error register 5c, third source address register 6c and fourth status register 3d. That is, after making the correspondence between data stored in the buffers and registers, it is read out as a set of identical attribute data.

By the control and management of the buffer memory as stated above, a specific buffer and register in the buffer memory consisting of a plurality of buffers and registers, serve as the buffer and register storing the identical attribute data.

Next, the control of buffer memory by the aforementioned status counter 22 is described.

Figure 35:
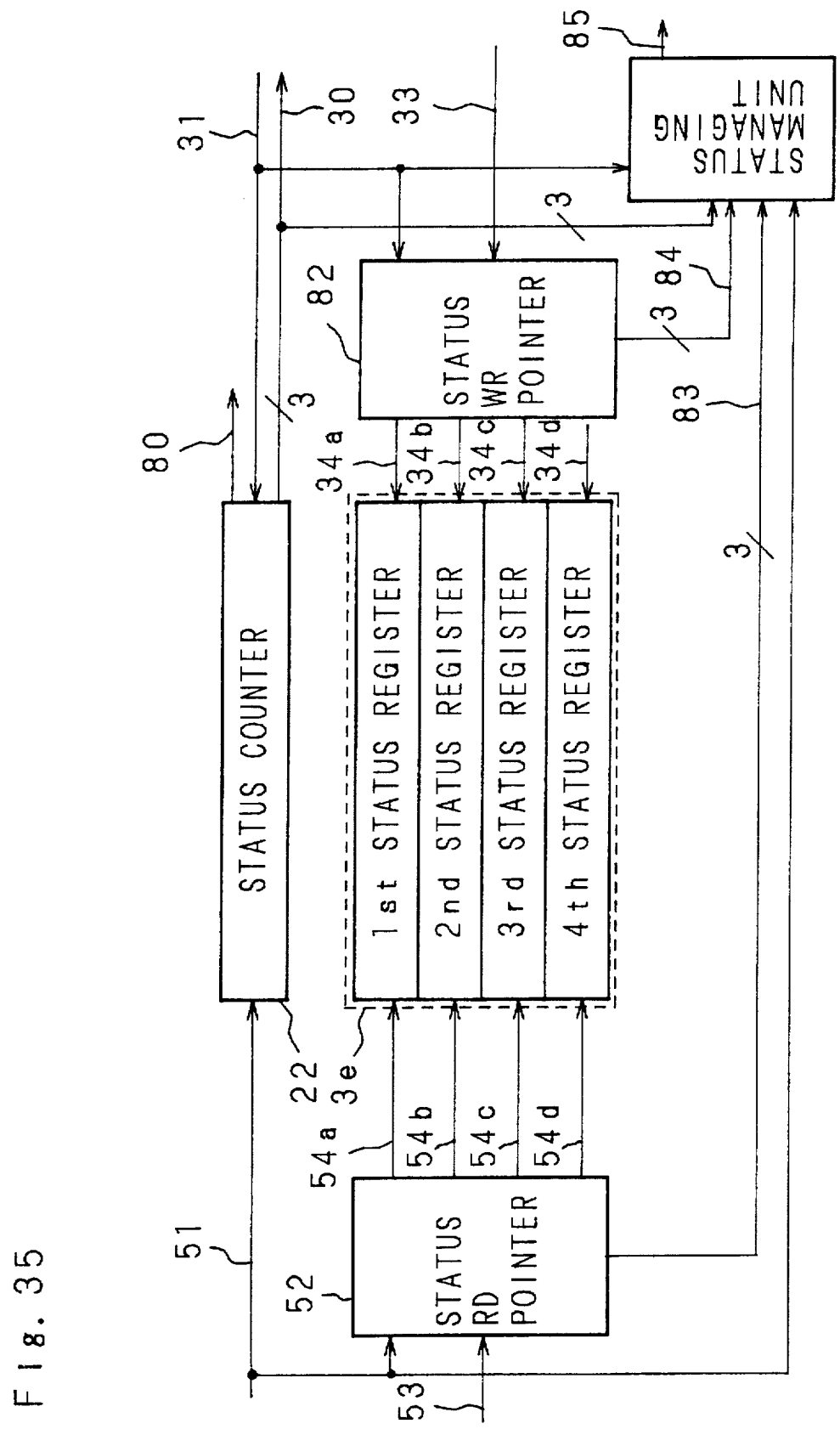
FIG. 35 is a block diagram showing a configuration for controlling a status counter and a status register group.

FIG. 35 is a block diagram showing a configuration for controlling the status counter 22 and the status register group 3.

Reference numeral 82 designates a status managing unit into which the count value output signal 30 of the status counter 22, status write completion signal 31, status read completion signal 51, an output signal 83 of the status RD pointer 52 which is a ternary counter and an output signal 84 of the status WR pointer 32 which is a ternary counter are inputted. The status managing unit 82 outputs a status number managing output signal 85 to the aforesaid OR gate 980.

The status managing unit 82 judged whether, $$N+M=L$$

when, $$N+M \leq 4$$

In the case where the output signal 84 of the status WR pointer 32 is "L", the output signal 83 of the status RD pointer 52 is "M" and the count value output signal 30 of the status counter 22 is "N". It is also judges whether, $$N+M-4=L$$

when, $$N+M \geq 5$$

In either case, when an equality sign is realized, "0" is outputted as the status number managing output signal 85, and "1" is outputted when it is not realized.

In describing the present embodiment, for the purpose of simplicity thereof, values of N and M are explained by adding "1" to the output values of the status WR pointer 32 and the status RD pointer 52.

In the following, the operation of the status managing unit 82 is described with reference to a timing chart of FIG. 36.

Whenever the data writing to the status register group 3 is complete, the status write completion signal 31 shown in FIG. 36(a) is outputted. After the status write completion signal 31 is outputted, "1" is added to the output signal 84 (=L) of the status WR pointer 32 shown in FIG. 36(c). However, since the value of the output signal 84 of the status WR pointer 32 is "4" or less, after the status write completion signal 31 of the multiple of "4" is outputted from the initial state, it returns to "1" of the initial state.

Similarly, every time the data reading from the status register group 3 is completed, the status read completion signal 51 shown in FIG. 36(b) is outputted. After the status read completion signal 51 is outputted, "1" is added to the output signal 83 (=M) of the status RD pointer 52. However, since the value of the output signal 83 of the status RD pointer 52 is "4" or less, after the status read completion signal 51 of the multiple of "4" is outputted from the initial state, it returns to "1" of the initial state.

"1" is added to the count value output signal 30 (=N) of the status counter 22 shown in FIG. 36(e) by output of the aforesaid status write completion signal 31, and "1" is deducted by output of the status read completion signal 51.

From the above relationship, between the count value output signal 30 (="N") of the status counter 22, the output signal 84 (="L") of the status WR pointer 32 and the output signal 83 (="M") of the status RD pointer 52, the following relations (1) and (2) are realized.

$$M+N=L(M+N \leq 4) \qquad (1)$$

$$M+N-4=L(M+N \geq 4) \qquad (2)$$

Figure 36:
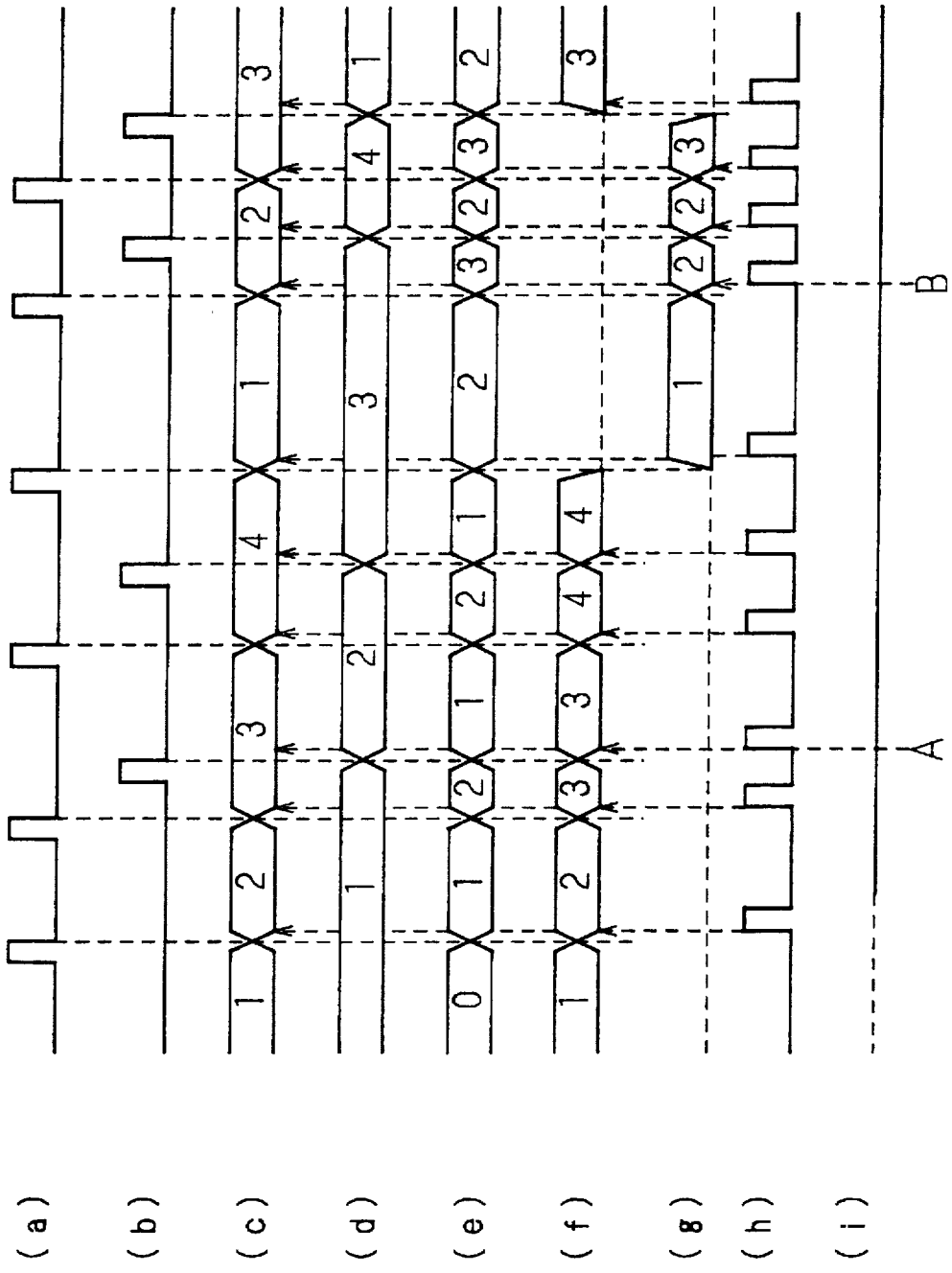
FIG. 36 is a timing chart for explaining the operation of a status managing unit.

For example, when considering the time point A in FIG. 36, since the status write completion signal 31 is already generated twice, the value "L" of the output signal 84 of the status WR pointer 32 is "3", and since the status read completion signal 51 is already generated once, the value "M" of the output signal 83 of the status RD pointer 52 is "2".

Since addition is made twice and deduction is made once to and from the count value output signal 30 of the status counter 22 at this time point, its value "N" is "1". Thus, "L", "M" and "N" are respectively "3", "2" and "1", satisfying the above equation (1).

Next, when considering the time point B of FIG. 36, since the status write completion signal 31 is already generated five times, the value "L" of the output signal 84 of the status WR pointer 32 is "2", and since the status read completion signal 51 is already generated twice, the value "M" of the output signal 83 of the status RD pointer 52 is "3". Since addition is made five times and deduction is made twice to and from the count value output signal 30 of the status counter 22 at this time point, its value "N" is "3". Thus "L", "M" and "N" are respectively "2", "3" and "3", satisfying the equation (2).

Though the status managing unit 32 judges as stated above, more specifically, it operates as follows.

Reference numeral 82C of FIG. 36 designates a clock, which is generated by the status managing unit 82 when either the status write completion signal 31 or the status read completion signal 51 is inputted to the status managing unit 82. The status managing unit 82 judges whether values of the signals 30, 83 and 84 satisfy the equations (1) and (2), in synchronism with the generation of the clock 82C, and outputs "0" when satisfying and outputs "1" when not satisfying as the status number managing output signal 85.

The status number managing output signal 85 is sent to the OR gate 980 for generating a reset signal 98 of the buffer memory as stated before.

Next, control of the buffer memory by the data counter 21 is described.

Figure 37:
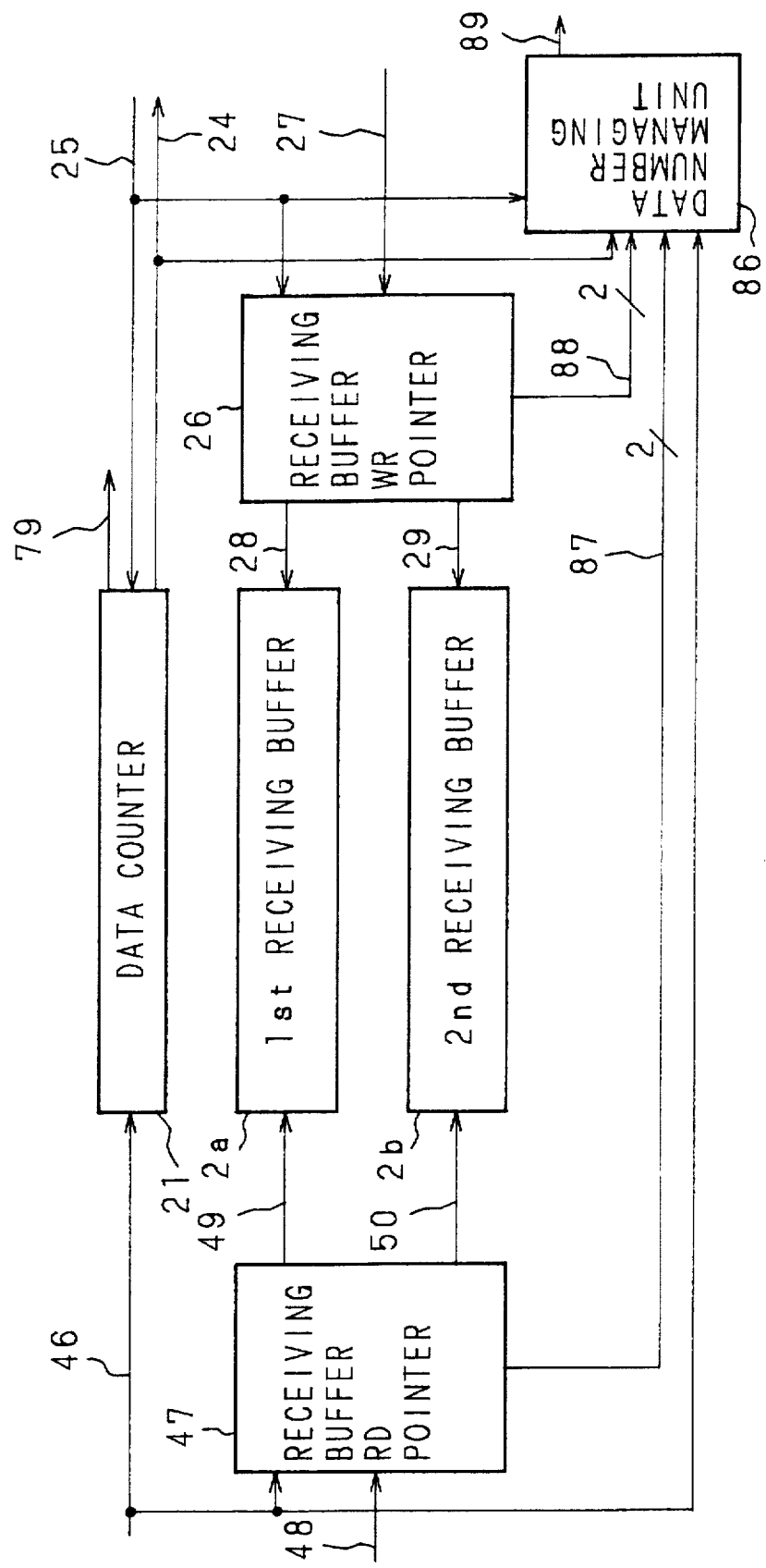
FIG. 37 is a block diagram showing a configuration for controlling data counter and a receiving buffer group.

FIG. 37 is a block diagram showing a configuration for controlling the data counter 21 and the receiving buffer group 2.

Reference numeral 86 designates a data number managing unit, into which the count value output signal 24 of the data counter 21, receiving buffer write completion signal 25, receiving buffer read completion signal 46, the output signal 87 of the receiving buffer RD pointer 47 which is a binary counter and the output signal 88 of the receiving buffer WR pointer 26 which is a binary counter are inputted. The data number managing unit 86 outputs the data number managing output signal 89 to the aforementioned OR gate 980.

The data number managing unit 86 judges whether, $$J+K=1$$

when, $$J+K \leq 2$$

in the case where the value of output signal 88 of the receiving buffer WR pointer 26 is "T", the value of output signal 87 of the receiving buffer RD pointer 47 is "J" and the value of the count value output signal 24 of the data counter 21 is "K". It also judges whether, $$J+K-2=1$$

when, $$J+K \geq 3$$

In either case when an equality sign is realized, "0" is outputted as the data number managing output signal 89, and "1" is outputted when it is not realized.

In describing the present embodiment, for the purpose of simplicity thereof, values of I and J are explained by adding "1" to the output values of the receiving buffer RD pointer 47 and of the receiving buffer WR pointer 26.

In the following, the operation of the data number managing unit 86 is described with reference to a timing chart of FIG. 38.

Every time data writing to the receiving buffer group 2 is completed, the receiving buffer write completion signal 25 shown in FIG. 38(a) is outputted. After the receiving buffer write completion signal 25 is outputted, "1" is added to the output signal 88 (=L) of the receiving buffer WR pointer 26 shown in FIG. 38(c). However, since the output signal 88 of the receiving buffer WR pointer 26 is "2" or less, after the receiving buffer write completion signal 25 of the multiple of "2" is outputted from the initial state, it returns to "1" of the initial state.

Similarly, every time the data writing to the receiving buffer group 2 is completed, the receiving buffer read completion signal 46 shown in FIG. 38(b) is outputted. After the receiving buffer read completion signal 46 is outputted, "1" is added to the output signal 87 (=J) of the receiving buffer RD pointer 47 shown in FIG. 38(d). However, since the output signal 87 of the receiving buffer RD pointer 47 is "2" or less, after the receiving buffer read completion signal 46 of the multiple of "2" is outputted from the initial state, it returns to "1" of the initial state. "1" is added to the count value output signal 24 (=K) of the data counter 21 shown in FIG. 38(e) by output of the aforesaid receiving buffer write completion signal 25, and "1" is deducted therefrom by the output of the receiving buffer read completion signal 46.

From the above relationship, between the count value output signal 24 (="K") of the data counter 21, the output signal 88 (="T") of the receiving buffer WR pointer 26 and the output signal 87 (="J") of the receiving buffer RD pointer 47, the following relations are realized.

$$J+K=1 (J+K \leq 2) \qquad (3)$$

$$J+K-2=1 (J+K \leq 2) \qquad (4)$$

Figure 38:
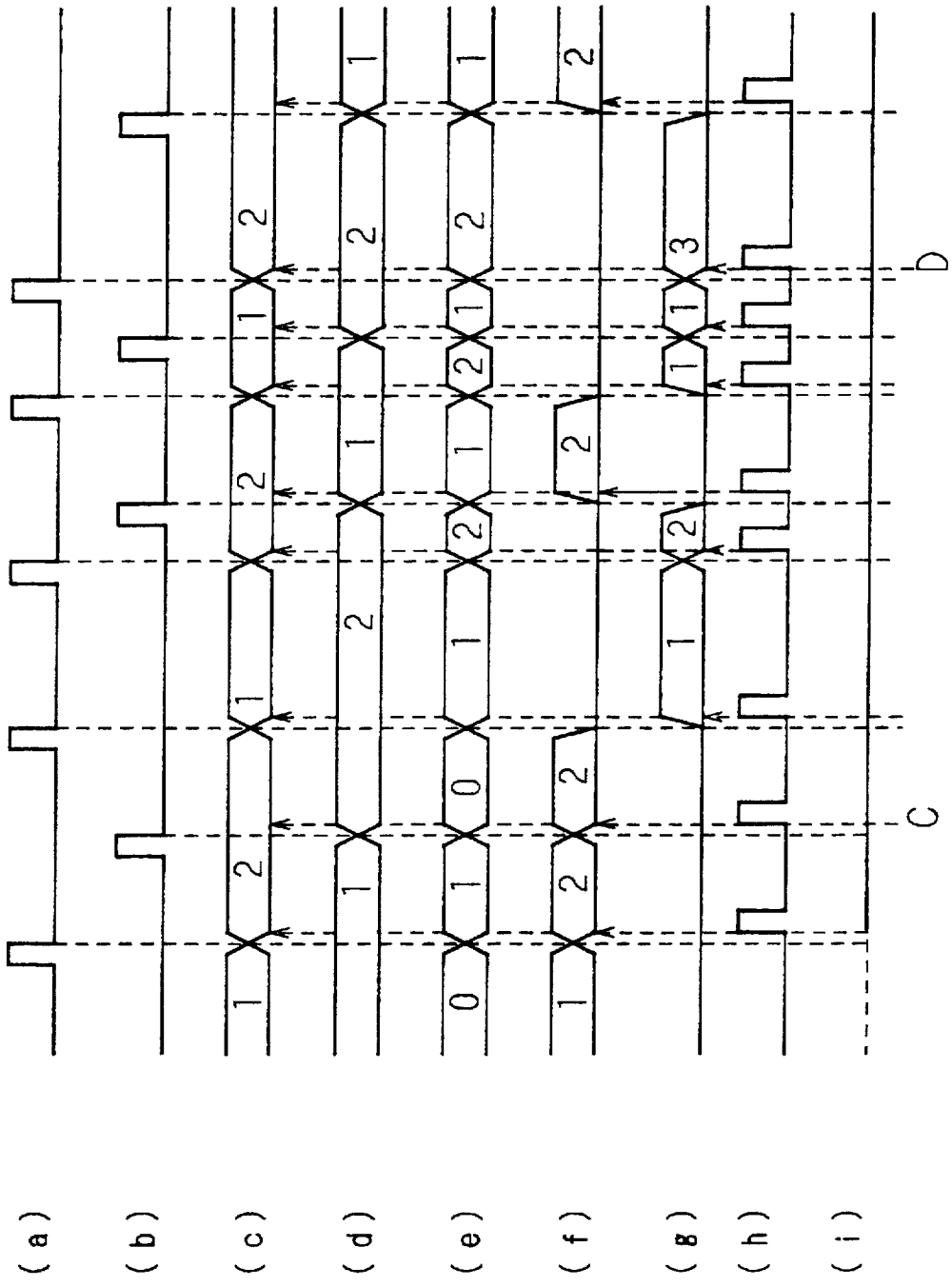
FIG. 38 is a timing chart for explaining the operation of a data number managing unit.

For example, when considering the time point C of FIG. 38, since the receiving buffer write completion signal 25 is already generated once, the value "T" of output signal 88 of the receiving buffer WR pointer 26 is "2", and since the receiving buffer read completion signal 46 is already generated once, the value "J" of output signal 87 of the receiving buffer RD pointer 47 is "2".

Since addition is made once and deduction is made once to and from the count value output signal 24 of the data counter 21 at this time point, its value "K" is "0". Thus, "T", "J" and "K" are respectively "1", "1" and "0", satisfying the equation (3).

Next, when considering the time point D of FIG. 38, since the receiving buffer write completion signal 25 is already generated five times, the value "T" of output signal 88 of the receiving buffer WR pointer 26 is "2", and since the receiving buffer read completion signal 46 is already generated three times, the value "J" of output signal 87 of the receiving buffer RD pointer 47 is "2".

Since addition is made five times and deduction is made three times to and from the count value output signal 24 of the data counter 21 at this time point, its value "K" is "2". Thus, "T", "J" and "K" are respectively "2", "2" and "2", satisfying the equation (3).

Though the data number managing unit 86 judges as stated above, more specifically, it operates as follows.

Reference numeral 86C in FIG. 38 designates a clock, which is generated by the data number managing unit 86 when either the receiving buffer write completion signal 25 or the receiving buffer read completion signal 46 is inputted to the data number managing unit 86. The data number managing unit 86 judges whether values of the signals 24, 87 and 88 satisfy the equations (3) and (4), in synchronism with the generation of the clock 86C, and outputs "0" when satisfying and outputs "1" when not satisfying as the data number managing output signal 89.

The data number managing output signal 89 is sent to the OR gate 980 for generating the reset signal 98 of the buffer memory as stated before.

Thus, the reset signal 98 of the buffer memory becomes "1" which is an active level to reset the overall buffer memories, in the case where either the status number managing output signal 85 or the data number managing output signal 89 is "1" or the count value of the status counter 22 or the data counter 21 is not correct, or the both count values are not correct.

Next, the case where the buffer memory having the above-mentioned configuration is connected to a microcomputer by parallel buses is described.

Figure 39:
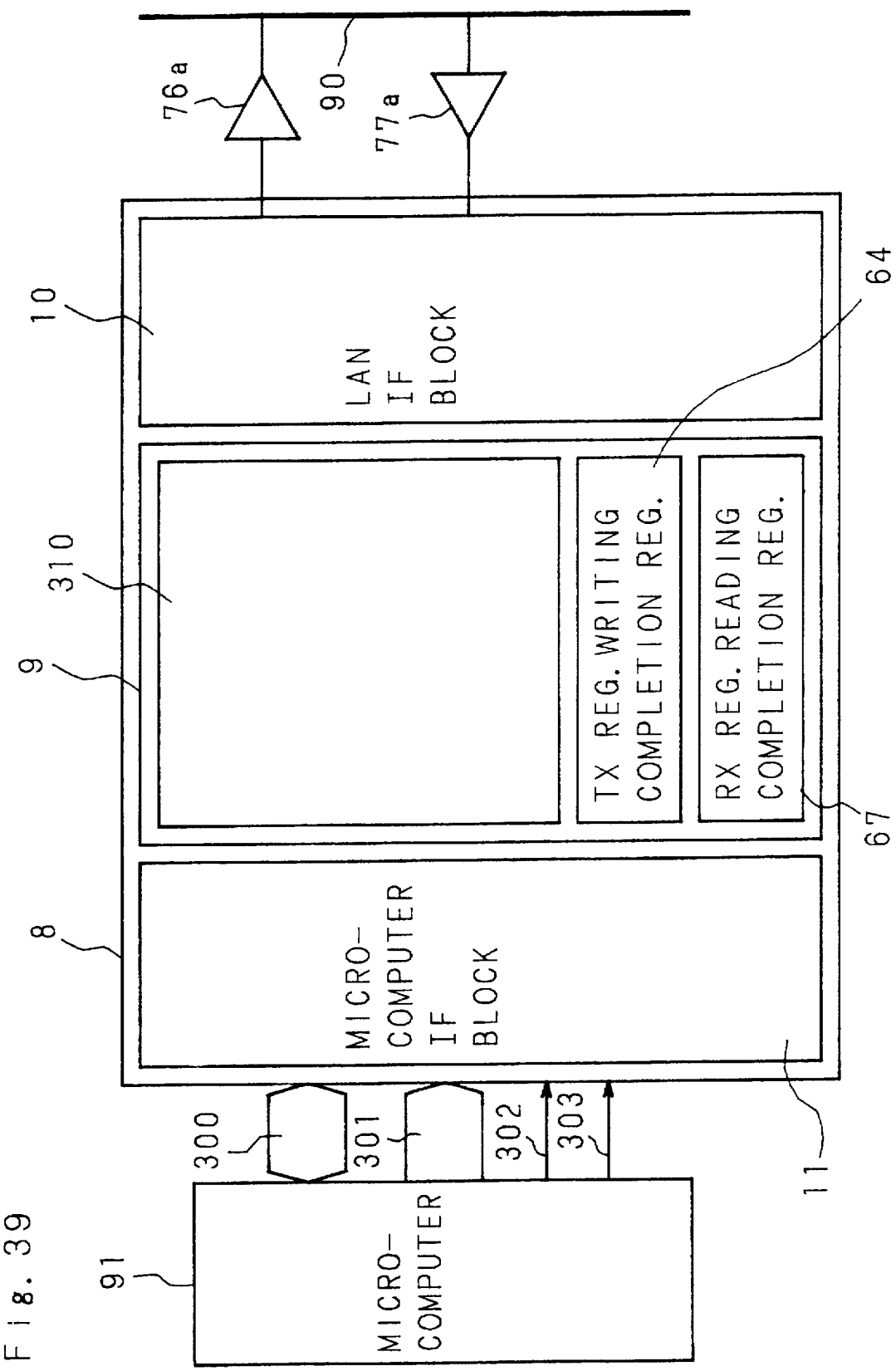
FIG. 39 is a block diagram showing a configuration in the case where a communication apparatus of the present invention is connected to a microcomputer by parallel buses.

FIG. 39 is a block diagram showing the configuration when the communication apparatus of the present invention and the microcomputer 91 are connected by the parallel buses.

In FIG. 39, reference numeral 300 designates a data bus, reference numeral 301 designates an address bus, reference numeral 302 designates a write strove signal, reference numeral 303 designates a read strove signal and reference numeral 310 designates an area except the TX register writing completion register 64 and the RX register reading completion register 67 in the buffer memory block 9.

FIG. 40 is a timing chart showing the states of data and signal when writing the data to the buffer memory block 9 from the microcomputer 91.

To the data bus 300, data strings "03", "F2", "01", "AA", "55" and "FF" outputted from the microcomputer 91 to the buffer memory block 9 as shown in FIG. 40(a). These data are stored in the areas of the buffer memory corresponding to addresses "00", "01", "02", "03", "04" and "7E" outputted to the address bus 310 as shown in FIG. 40(b), in synchronism with the timing of the write strove signal 302 shown in FIG. 40(d).

In this example, the addresses "00", "01", "02", "03" and "04" outputted to the address bus 301 are allocated to the transmission buffer 1 in the area 310 in the buffer memory block 9. Thus, the data "03", "F2", "01", "AA" and "55" corresponding to the respective address signals are stored in the address areas of the transmission buffer 1. Since the address "7E" is allocated to the TX register writing completion register 64, data "FF" corresponding to the address signal "7E" is stored in the TX register writing completion register 64.

That is, when respective data of the transmission data string are stored in the areas of the transmission buffer 1, by data which shows the completing of writing of the transmission data string being written to the TX register writing completion register 64 lastly, the writing processing of the transmission data string to the buffer memory block 9 from the microcomputer 91 is completed. The operations in the buffer memory block 9 after writing data to the address "7E" are as aforementioned.

FIG. 41 is a time chart showing the states of data and signal when reading the receiving data group stored in the buffer memory block 9 to the microcomputer 91.

To the data bus 300, addresses "30", "10", "11", "12", "13", "14" and "7F" outputted to the address bus 301 as shown in FIG. 41(b) from the microcomputer 91 to the buffer memory block 9 are outputted. Data stored in the areas of the buffer memory corresponding to these address signals are read in order of "0C", "03", "F2", "01", "AA" and "55" as shown in FIG. 41(a), in synchronism with the timing of the read strove signal 303 shown in FIG. 41(c), and are read into the microcomputer 91. In this case, the read strove signal 303 is outputted responsive to and till the address signal "55", and responsive to the address signal "7F" the write strove signal 302 is outputted. At the same time, since the microcomputer 91 outputs the data "FF" to the data bus 300, the data "FF" is stored in the RX register reading completion register 67 to which the address "7F" is allocated.

That is, by data which shows the completing of the reading of the receiving data string being written into the RX register reading completion register 67, after respective data of the receiving data string are read from the areas of either of the receiving buffers 2a or 2b of the receiving buffer group 2, the reading processing of the receiving data string from the buffer memory block 9 to the microcomputer 91 is completing. The operations in the buffer memory block 9 after writing data into the address "7F" are as same as aforementioned.

As particularly described heretofore, in the communication apparatus of the present invention: the status registers which store information associated with the states of information to be transmitted and received are provided, at least, one more than the number of buffers which store the information to be transmitted and received; the transmission error registers which store information associated with the transmitting state of information to be transmitted are provided, at least, as the same number as the buffers storing information to be transmitted; the receiving error registers which store information associated with the receiving state of information to be received are provided, at least, one more than the buffers storing information to be received; the source address registers which store information associated with the other communication apparatus which has transmitted respective information to be received are provided, at least, one more than the buffers storing information to be received; and the response information registers which store information being responded from the communication apparatus which is to receive the information in the case where information to be transmitted is transmitted are provided, at least, as the same number as the buffers storing information to be transmitted. And hence, even in the case where information to be received are present further in the state, wherein information to be transmitted and received are stored in all the buffers, it is possible to store information associated with the state of information to be received, information associated with the receiving state of the information and information associated with the other communication apparatus which has sent the information, and it is possible to receive again immediately when there is enough room in the buffers.

Since respective transmission buffers are made correspondence with one of the status registers, one of the transmission error registers and one of the response information registers, a set of information associated with information to be transmitted and being stored in the respective transmission buffers, or information of the identical attribute can be operated simply.

Moreover, since the respective receiving buffers are made correspondence with one of the status registers, one of the receiving error registers and one of the source address registers, a set of information associated with information to be received and stored in the respective receiving buffers, or information of the identical attribute can be operated simply.

As particularly described heretofore, in the second invention of the communication apparatus of the present invention, the address of its buffer memory is allocated so as to designate either of the plural transmission buffers and receiving buffers by the higher bits, and to designate the memory areas in the respective buffers by the lower bits in order, and since address generating means capable of accessing the memory areas of a buffer in the above-mentioned address allocating buffer memory, by having a counter which automatically generates the lower bits in order when the higher bits of the address are given, and by outputting the higher bits given from the outside and the lower bits generated by the counter, just by giving the higher bits from the outside, respective buffers are designated and the memory areas in the buffers are accessed.

Furthermore, in the second invention of the communication apparatus of the present invention, in the case where information to be transmitted or received are stored in the buffers, since the number of memory areas used for storing the information is stored in the head memory area, when reading information from the buffers, the number of memory areas which are required to be read actually becomes clear at the time point when the first data of the information is read, and by comparing this value with the output value of the above-mentioned counter which outputs the lower bit address signal every time when information are read, reading of information is stopped when they are coincided.

Still further, in the second invention of the communication apparatus of the present invention, since CRC check data is stored in the next memory area of the end memory area used for storing information when storing the information to be received in the buffers, it is possible to compare the CRC data generated at transmission of the information, with CRC data generated again for the receiving data on the receiving side.

As particularly described heretofore, in the third invention of the communication apparatus of the present invention, since various information corresponding to information stored in the transmission buffer or the receiving buffer are stored in the registers which are mutually associated with the buffers in which respective original information are stored, these information are managed as information of the identical attribute.

Meanwhile, since it is possible to detect disorder of the register designating means, management of the registers is simple.

Furthermore, since a predetermined data is stored in the transmission information writing completion register, after data to be written is written when writing transmission information, and a predetermined data is stored in the receiving information reading completion register, after data to be read is read when reading receiving information, completion of writing the transmission information and reading the receiving information can be detected reliably by a simple configuration.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A communication apparatus which comprises a buffer memory having n number of transmitting buffers each storing one unit of information to be transmitted to other communication apparatus respectively and m number of receiving buffers each storing one unit of information to be received from other communication apparatus respectively, and which temporarily stores information to be transmitted to other communication apparatus in said transmitting buffer and thereafter transmits it, and temporarily stores information to be received from the other communication apparatus in said receiving buffer and thereafter receives it, wherein said buffer memory is provided with:
at least n+m+1 number of status registers each for storing information relating to status of said information in said buffers to be transmitted and received;
at least n number of transmitting error registers each for storing information relating to status of one unit of information in said buffers to be transmitted; and
at least m+1 number of receiving error registers each for storing information relating to status of said information in said buffers to be received.

2. A communication apparatus which comprises a buffer memory having n number of transmitting buffers each storing one unit of information to be transmitted to other communication apparatus respectively and m number of receiving buffers each storing one unit of information to be received from other communication apparatus respectively, and which temporarily stores information to be transmitted to the other communication apparatus in said transmitting buffer and thereafter transmits it, and temporarily stores information to be received from other communication apparatus in said receiving buffer and thereafter receives it, respectively, wherein said buffer memory is provided with at least m+1 number of storage areas, each for storing source address information relating to remote communication apparatus from which said information is transmitted to facilitate retransmission of data which could not be accommodated by said receiving buffers.

3. A communication apparatus which comprises a buffer memory having n number of transmitting buffers each storing one unit of information to be transmitted to other communication apparatus respectively and m number of receiving buffers each storing one unit of information to be received from other communication apparatus respectively, and which temporarily stores information to be transmitted to other communication apparatus in said transmitting buffer and thereafter transmits it, and temporarily stores information to be received from the other communication apparatus in said receiving buffer and thereafter receives it, wherein said buffer memory is provided with:
at least n+m+1 number of status registers each for storing information relating to status of said information in said buffers to be transmitted and received;
at least n number of transmitting error registers each for storing information relating to status of said information in said buffers to be transmitted;
at least m+1 number of receiving error registers each for storing information relating to status of said information in said buffers to be received;
at least m+1 number of source address registers each for storing information relating to another communication apparatus from which information to be received is transmitted; and
at least n number of returning information registers each for, when information to be transmitted is transmitted, storing information being returned from another communication apparatus by which additional information to be transmitted may be retrieved.

4. A communication apparatus as set forth in claim 3, wherein each of said n number of transmitting buffers corresponds to one of said at least n+m+1 number of status registers, one of said at least n number of transmitting error registers, and one of said at least n number of returning information registers respectively.

5. A communication apparatus as set forth in claim 3, wherein each of said m number of receiving buffers corresponds to one of said at least n+m+1 number of status registers, one of said at least m+1 number of receiving error registers, and one of said at least m+1 number of source address registers respectively.

6. A communication apparatus as set forth in claim 3, wherein each of said n number of transmitting buffers corresponds to one of said at least n+m+1 number of status registers, one of said at least n number of transmitting error registers, and one of said at least n number of returning information registers respectively, and each of said m number of receiving buffers corresponds to one of said at least n+m+1 number of status registers, one of said at least m+1 number of receiving error registers, and one of said at least m+1 number of source address registers respectively.

7. A communication apparatus which comprises:
a transmitting buffer group consisting of n number of transmitting buffers each of which store one unit of information in order to temporarily store information to be transmitted to other communication apparatus and thereafter output it;

a receiving buffer group consisting of m number of receiving buffers each of which stores one unit of information in order to temporarily store information to be received from other communication apparatus and thereafter receive it;

at least n+m+1 number of status registers, each of which stores information relating to status of said information in said buffers to be transmitted and received;

at least n number of transmitting error registers each of which stores information relating to transmitting status of said information in said buffers to be transmitted;

at least m+1 number of receiving error registers each of which stores information relating to receiving status of said information in said buffers to be received;

at least m+1 number of source address registers each of which stores information relating to other communication apparatus having transmitted information to be received; and at least n number of returning information registers each of which, when information to be transmitted is transmitted, stores information being returned from another communication apparatus to permit additional information to be transmitted;

further comprising:

transmitting buffer designating means for designating usable ones of said transmitting buffers in the case where the information to be transmitted to another communication apparatus is stored in one of transmitting buffers of said transmitting buffer group;

receiving buffer designating means for designating usable ones of said receiving buffers in the case where the information to be received from another communication apparatus is stored in one of receiving buffers to said receiving buffer group;

status register designating means for designating ones of said at least n+m+1 number of status registers corresponding to said designated transmitting buffers or receiving buffers in the case where any transmitting buffer or any receiving buffer is designated by said transmitting buffer designating means or receiving buffer designating means;

transmitting error register designating means for designating one of said at least n number of transmitting error registers corresponding to said designated transmitting buffer in the case where any transmitting buffer is designated by said transmitting buffer designating means;

returning information register designating means for designating one of said at least n number of returning information registers corresponding to said designated transmitting buffer in the case where any transmitting buffer is designated by said transmitting buffer designating means;

receiving error register designating means for designating one of said at least m+1 number of receiving error registers corresponding to said designated receiving buffer in the case where any receiving buffer is designated by said receiving buffer designating means; and source address register designating means for designating one of said at least m+1 number of source address registers corresponding to said designated receiving buffer in the case where any receiving buffer is designated by aid receiving buffer designating means.

8. A communication apparatus as set forth in claim 7, wherein said buffer memory further comprises:

a transmitting information counter for counting the number of buffers being used in said transmitting buffer group;

a receiving information counter for counting the number of buffers being used in said receiving buffer group;

means for detecting disagreement between said transmitting buffer designating means corresponding to the value of said transmitting information counter and designating value of said transmitting buffer designating means; and means for detecting disagreement between said receiving buffer designating means corresponding to the value of said receiving information counter and designating value of said receiving buffer designating means.

9. A communication apparatus as set forth in claim 7, wherein said buffer memory further comprising:

a status number counter for counting the number of registers being used among said at least n+m+1 number of status registers; and means for detecting disagreement between of said status register designating means corresponding to the counting value of said status number counter and designating value of said status register designating means.

10. A communication apparatus as set forth in claim 7, wherein said buffer memory further comprises:

transmitting information writing completion register to which addresses not allocated to each of said transmitting buffers may be allocated;

whereby, upon writing information to be transmitted in said buffer memory, each address allocated to said transmitting buffer is given to said buffer memory and predetermined information is outputted following the information to be transmitted, so that said predetermined information is stored in said transmitting information writing completion register.

11. A communication apparatus as set forth in claim 7, wherein said buffer memory further comprising:

receiving information reading completion register to which addresses not allocated to each said receiving buffer may be allocated;

whereby, upon reading information to be received in said buffer memory, each address allocated to said receiving buffer is given to said buffer memory and predetermined information is outputted, so that said predetermined information is stored in said receiving information reading completion register.

* * * * *